US009509988B2

United States Patent
Nakagawa et al.

(10) Patent No.: US 9,509,988 B2
(45) Date of Patent: Nov. 29, 2016

(54) MOTION VIDEO ENCODING APPARATUS, MOTION VIDEO ENCODING METHOD, MOTION VIDEO ENCODING COMPUTER PROGRAM, MOTION VIDEO DECODING APPARATUS, MOTION VIDEO DECODING METHOD, AND MOTION VIDEO DECODING COMPUTER PROGRAM

(71) Applicant: FUJITSU LIMITED, Kawasaki-shi, Kanagawa (JP)

(72) Inventors: Akira Nakagawa, Sagamihara (JP); Kimihiko Kazui, Kawasaki (JP); Hidenobu Miyoshi, Kawasaki (JP); Junpei Koyama, Shibuya (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 662 days.

(21) Appl. No.: 13/848,288

(22) Filed: Mar. 21, 2013

(65) Prior Publication Data

US 2013/0215961 A1 Aug. 22, 2013

Related U.S. Application Data

(63) Continuation of application No. PCT/JP2010/067135, filed on Sep. 30, 2010.

(51) Int. Cl.
*H04N 19/00* (2014.01)
*H04N 19/124* (2014.01)
(Continued)

(52) U.S. Cl.
CPC ........ *H04N 19/0009* (2013.01); *H04N 19/126* (2014.11); *H04N 19/14* (2014.11); *H04N 19/18* (2014.11); *H04N 19/48* (2014.11); *H04N 19/625* (2014.11)

(58) Field of Classification Search
CPC ............... H04N 19/00569; H04N 19/105; H04N 19/107; H04N 19/117; H04N 19/156; H04N 19/17; H04N 19/174; H04N 19/176; H04N 19/182; H04N 19/52; H04N 19/55; H04N 19/59; H04N 19/593; H04N 19/86
See application file for complete search history.

(56) References Cited

U.S. PATENT DOCUMENTS

2003/0103679 A1 6/2003 Etoh et al.
2006/0171599 A1* 8/2006 Fukuhara ........... G06K 9/00711
382/232

(Continued)

FOREIGN PATENT DOCUMENTS

| JP | 2001-16588 | 1/2001 |
|---|---|---|
| JP | 2002-314428 | 10/2002 |
| JP | 2007-116695 | 5/2007 |

OTHER PUBLICATIONS

Office Action mailed Apr. 1, 2014 in corresponding Japanese Patent Application No. 2012-536091.

(Continued)

*Primary Examiner* — Peter D Le
(74) *Attorney, Agent, or Firm* — Staas & Halsey LLP

(57) ABSTRACT

A motion video encoding apparatus includes: a prediction error image generating unit which computes a difference between a block being encoded and a predicted image for the block being encoded and thereby generates a prediction error image; a prediction error orthogonal-transforming unit which computes a plurality of first frequency coefficients by orthogonal-transforming the prediction error image; a predicted image orthogonal-transforming unit which computes a plurality of second frequency coefficients by orthogonal-transforming the predicted image; a sign judging unit which judges the positive/negative sign of each one of the plurality of second frequency coefficients; and an adaptive encoding unit which encodes each given one of the plurality of first frequency coefficients by using sign match/mismatch information that indicates a match or mismatch between the sign of the given first frequency coefficient and the sign of a corresponding one of the plurality of second frequency coefficients.

21 Claims, 32 Drawing Sheets

(51) Int. Cl.
*H04N 19/126* (2014.01)
*H04N 19/14* (2014.01)
*H04N 19/18* (2014.01)
*H04N 19/48* (2014.01)
*H04N 19/625* (2014.01)

(56) References Cited

U.S. PATENT DOCUMENTS

2007/0086516 A1   4/2007  Lee et al.
2007/0110327 A1*  5/2007  Han .................. H04N 19/115
                                          382/251
2010/0278266 A1* 11/2010  Daian ................ H04N 19/176
                                          375/240.15
2011/0200101 A1*  8/2011  Zan .................... H04N 19/147
                                          375/240.03

OTHER PUBLICATIONS

International Search Report of Corresponding PCT Application PCT/JP2010/067135 mailed Dec. 21, 2010.

M.D. Paez et al., "Minimum Mean-Squared-Error Quantization in Speech PCM an DPCM Systems", IEEE Transactions on Communications, Apr. 1972, pp. 225-230.

Matthew J. Noah, "Optimal Lloyd-Max Quantization of LPC Speech Parameters", Acoustics, Speech, and Signal Processing, IEEE International Conference on ICASSP, 1984, pp. 29-32.

* cited by examiner

| | | | | | | | | | |
|---|---|---|---|---|---|---|---|---|---|
| SIGNIFICANT COEFFICIENT IDENTIFICATION NUMBER | 1 | 1 | 2 | 3 | 4 | 5 | 6 | 7 | 8 |
| SIGNIFICANT COEFFICIENT POSITION INFORMATION | 1 | 2 | 3 | 3 | 4 | 5 | 6 | 7 | 10 |
| SIGNIFICANT COEFFICIENT ABSOLUTE VALUE INFORMATION | 3 | 3 | 2 | 0 | 1 | 1 | 1 | 1 | 1 |
| SIGNIFICANT COEFFICIENT SIGN INFORMATION (0:POSITIVE, 1:NEGATIVE) | 0 | 0 | 0 | 0 | 0 | 1 | 0 | 0 | 0 |

FIG. 10

| | | | | | | | |
|---|---|---|---|---|---|---|---|
| | 227.25 | −5.85 | 3.75 | 0.63 | | | |
| | 4.43 | −3.20 | −1.90 | −0.60 | | | |
| | 2.25 | −2.06 | −1.25 | −0.63 | | | |
| | 3.00 | −0.10 | −1.74 | −0.80 | | | |

| | | | | | | | |
|---|---|---|---|---|---|---|---|
| SIGNIFICANT COEFFICIENT IDENTIFICATION NUMBER | 1 | 2 | 3 | 4 | 5 | 6 | 7 | 8 |
| SIGNIFICANT COEFFICIENT POSITION INFORMATION | 1 | 2 | 3 | 4 | 5 | 7 | 9 | 10 |
| SIGNIFICANT COEFFICIENT ABSOLUTE VALUE INFORMATION | 3 | 3 | 2 | 1 | 1 | 1 | 1 | 1 |
| SIGNIFICANT COEFFICIENT SIGN INFORMATION (0:POSITIVE, 1:NEGATIVE) | 0 | 0 | 0 | 0 | 1 | 0 | 0 | 0 |
| FREQUENCY COEFFICIENT OF PREDICTED IMAGE | 227.25 | −5.85 | 4.43 | 2.25 | −3.20 | 0.63 | −2.06 | 3.00 |
| PREDICTION VALUE OF SIGNIFICANT COEFFICIENT SIGN INFORMATION (0:POSITIVE, 1:NEGATIVE) | 0 | 1 | 0 | 0 | 1 | 0 | 1 | 0 |
| SIGN MATCH/MISMATCH PREDICTION INFORMATION | 0 | 1 | 0 | 0 | 0 | 0 | 1 | 0 |

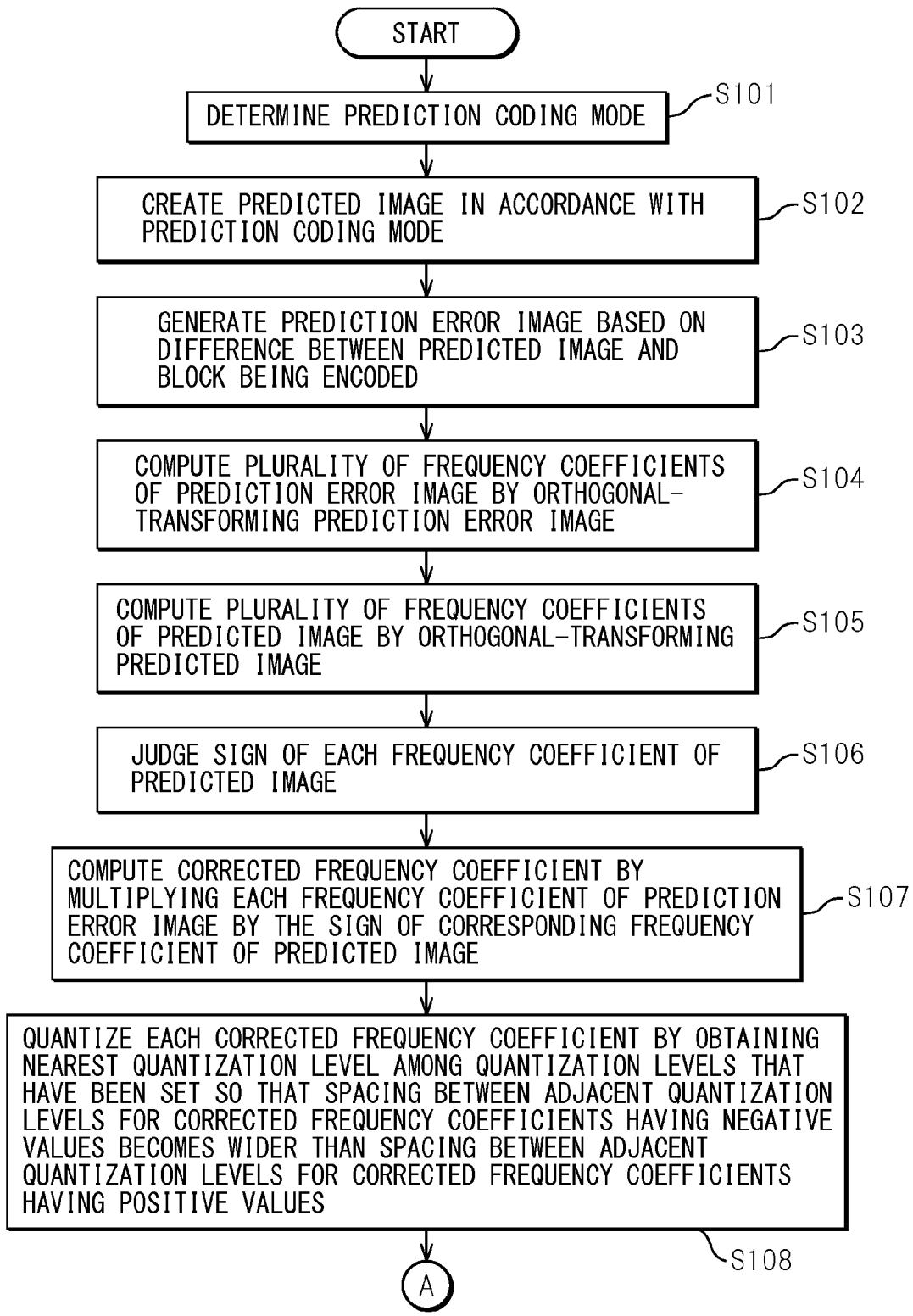

MOTION VIDEO ENCODING APPARATUS, MOTION VIDEO ENCODING METHOD, MOTION VIDEO ENCODING COMPUTER PROGRAM, MOTION VIDEO DECODING APPARATUS, MOTION VIDEO DECODING METHOD, AND MOTION VIDEO DECODING COMPUTER PROGRAM

CROSS-REFERENCE TO RELATED APPLICATION

This application is a continuation application and is based upon PCT/JP2010/67135, filed on Sep. 30, 2010, the entire contents of which are incorporated herein by reference.

FIELD

The present invention relates to a motion video encoding apparatus, motion video encoding method, and motion video encoding computer program for encoding motion video data by using, for example, predictive coding. The present invention also relates to a motion video decoding apparatus, motion video decoding method, and motion video decoding computer program for decoding motion video data encoded, for example, by predictive coding.

BACKGROUND

Generally, the amount of data used to represent motion video data is very large. Accordingly, an apparatus handling such motion video data compresses the motion video data by using high-efficiency coding before transmitting the motion video data to another apparatus or before storing the motion video data in a storage device. "High-efficiency coding" refers to a coding process that converts a certain data stream to another data stream and thereby compresses the amount of data of the original data stream.

Coding standards such as MPEG-2 (Moving Picture Experts Group Phase 2), MPEG-4, and H.264 MPEG-4 Advanced Video Coding (MPEG-4 AVC/H.264), devised by the International Standardization Organization/International Electrotechnical Commission (ISO/IEC), are typical motion video coding standards widely used today.

Predictive coding is employed in such coding standards. In predictive coding, each picture to be encoded is divided into a plurality of blocks. Then, a prediction error image representing pixel-by-pixel errors between the block being encoded among the plurality of blocks and the predicted image of that block is computed. The prediction error image is then orthogonal-transformed to obtain frequency coefficients representing the frequency components of the image. After that, quantized coefficients obtained by quantizing the frequency coefficients are entropy-coded. By applying such quantization and entropy coding, the amount of data needed to represent the motion video is reduced.

In order to reduce the amount of data as much as possible while minimizing the degradation of picture quality of motion video data due to coding, it is important that the quantization levels used to quantize the frequency coefficients be properly determined. For the frequency coefficients obtained by orthogonal-transforming the prediction error image, it is known that the distribution of the frequency coefficients having a positive sign and the distribution of the frequency coefficients having a negative sign become substantially symmetrical with respect to each other. A technique for properly setting the quantization levels for such a probability distribution symmetrical about the center, for example, a Laplacian distribution or a Gaussian distribution has been proposed (refer, for example, to M. D. Paez, T. H. Glisson, "Minimum Mean-Squared-Error Quantization in Speech PCM and DPCM systems," IEEE TRANSACTIONS ON COMMUNICATIONS, pp. 225-230, April 1972).

A technique that uses the Lloyd-Max algorithm in order to optimize the quantization levels used to quantize symbols having an arbitrary probability distribution has also been proposed (refer, for example, to Matthew I. Noah, "Optimal Lloyd-Max quantization of LPC speech parameters," Acoustics, Speech, and Signal Processing, IEEE International Conference on ICASSP, pp. 29-32, 1984).

SUMMARY

With the growing need for increased moving picture quality in recent years, the number of pixels constituting each picture contained in motion video data tends to increase, tending to increase the amount of data need to represent the motion video data. To address such trends, there is a need for video coding techniques that can achieve higher compression efficiency.

According to one embodiment, A motion video encoding apparatus for encoding motion video data is provided. The motion video encoding apparatus includes: a predicted image creating unit which, from an already encoded picture contained in the motion video data or from an already encoded region in a picture being encoded in the motion video data, creates a predicted image for a block being encoded in the picture being encoded; a prediction error image generating unit which computes a difference between the predicted image and the block being encoded and thereby generates a prediction error image for the block being encoded; a prediction error orthogonal-transforming unit which computes a plurality of first frequency coefficients by orthogonal-transforming the prediction error image; a predicted image orthogonal-transforming unit which computes a plurality of second frequency coefficients by orthogonal-transforming the predicted image; a sign judging unit which judges the positive/negative sign of each one of the plurality of second frequency coefficients; and an adaptive encoding unit which encodes each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient.

According to another embodiment, A motion video decoding apparatus for decoding encoded motion video data is provided. The motion video decoding apparatus includes: a predicted image creating unit which, from an already decoded picture contained in the encoded motion video data or from an already decoded region in a picture being decoded from the encoded motion video data, creates a predicted image for a block being decoded in the picture being decoded; a predicted image orthogonal-transforming unit which computes a plurality of second frequency coefficients by orthogonal-transforming the predicted image; a sign judging unit which judges the positive/negative sign of each one of the plurality of second frequency coefficients; an adaptive decoding unit which takes as input a plurality of first frequency coefficients obtained by orthogonal-transforming a prediction error image taken between the predicted image and the block being decoded, and decodes each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient; an inverse transforming unit which reconstructs the prediction error image by applying an inverse orthogonal transform to the plurality of first frequency coefficients; and an adder which adds the value of each pixel of the prediction error image to the value of a corresponding pixel in the predicted image, thereby reconstructing the block being decoded.

According to still another embodiment, A motion video encoding method for encoding motion video data is provided. The motion video encoding method includes: creating, from an already encoded picture contained in the motion video data or from an already encoded region in a picture being encoded in the motion video data, a predicted image for a block being encoded in the picture being encoded; computing a difference between the predicted image and the block being encoded and thereby generating a prediction error image for the block being encoded; computing a plurality of first frequency coefficients by orthogonal-transforming the prediction error image; computing a plurality of second frequency coefficients by orthogonal-transforming the predicted image; judging the positive/negative sign of each one of the plurality of second frequency coefficients; and encoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient.

According to yet another embodiment, A motion video decoding method for decoding encoded motion video data is provided. The motion video decoding method includes: creating, from an already decoded picture contained in the encoded motion video data or from an already decoded region in a picture being decoded from the encoded motion video data, a predicted image for a block being decoded in the picture being decoded; computing a plurality of second frequency coefficients by orthogonal-transforming the predicted image; judging the positive/negative sign of each one of the plurality of second frequency coefficients; taking as input a plurality of first frequency coefficients obtained by orthogonal-transforming a prediction error image taken between the predicted image and the block being decoded, and decoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient; reconstructing the prediction error image by applying an inverse orthogonal transform to the plurality of first frequency coefficients; and adding the value of each pixel of the prediction error image to the value of a corresponding pixel in the predicted image and thereby reconstructing the block being decoded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating sign match/mismatch prediction values along with the frequency coefficients of the predicted image in corresponding relationship to FIG. 9.

FIG. 11 is a diagram illustrating an operation flowchart of a motion video encoding process according to the first embodiment.

DESCRIPTION OF EMBODIMENTS

Motion video encoding apparatus and motion video decoding apparatus according to various embodiments will be described below with reference to the drawings. Generally, as shown by Shannon, the more skewed the probability distribution of the symbols to be encoded is, the smaller the amount of information with which the symbols can be transmitted. This means that the more skewed is the probability distribution of the symbols to be encoded, the more efficiently a data stream containing the symbols can be compressed.

In view of the above, the inventor studied encoding information whose probability distribution is skewed, rather than directly encoding the frequency coefficients obtained from the prediction error image. As a result of the study, the inventor discovered that there is a skew in the probability distribution of sign match/mismatch information that indicates a match or mismatch between the positive/negative sign of each given frequency coefficient of the prediction error image and the positive/negative sign of the corresponding frequency coefficient in the predicted image that represents the same frequency component as that given frequency coefficient.

Accordingly, the motion video encoding apparatus described herein orthogonal-transforms not only the prediction error image but also the predicted image. Then, the motion video encoding apparatus computes sign match/mismatch information based on the positive/negative sign of a respective one of the frequency coefficients obtained by orthogonal-transforming the prediction error image and the positive/negative sign of a corresponding one of the frequency coefficient obtained by orthogonal-transforming the predicted image, and encodes the frequency coefficients of the prediction error image by using the sign match/mismatch information.

The positive/negative sign will hereafter be referred to simply as the sign, while the term "symbol" refers to each code element assigned to information contained in the encoded motion video data.

The picture may be either a frame or a field. A frame refers to one complete still image in the motion video data, while a field refers to a still image obtained by extracting data only in the odd-numbered lines or even-numbered lines from the frame. The encoded motion video may be color motion video or monochrome motion video.

Figure 1:
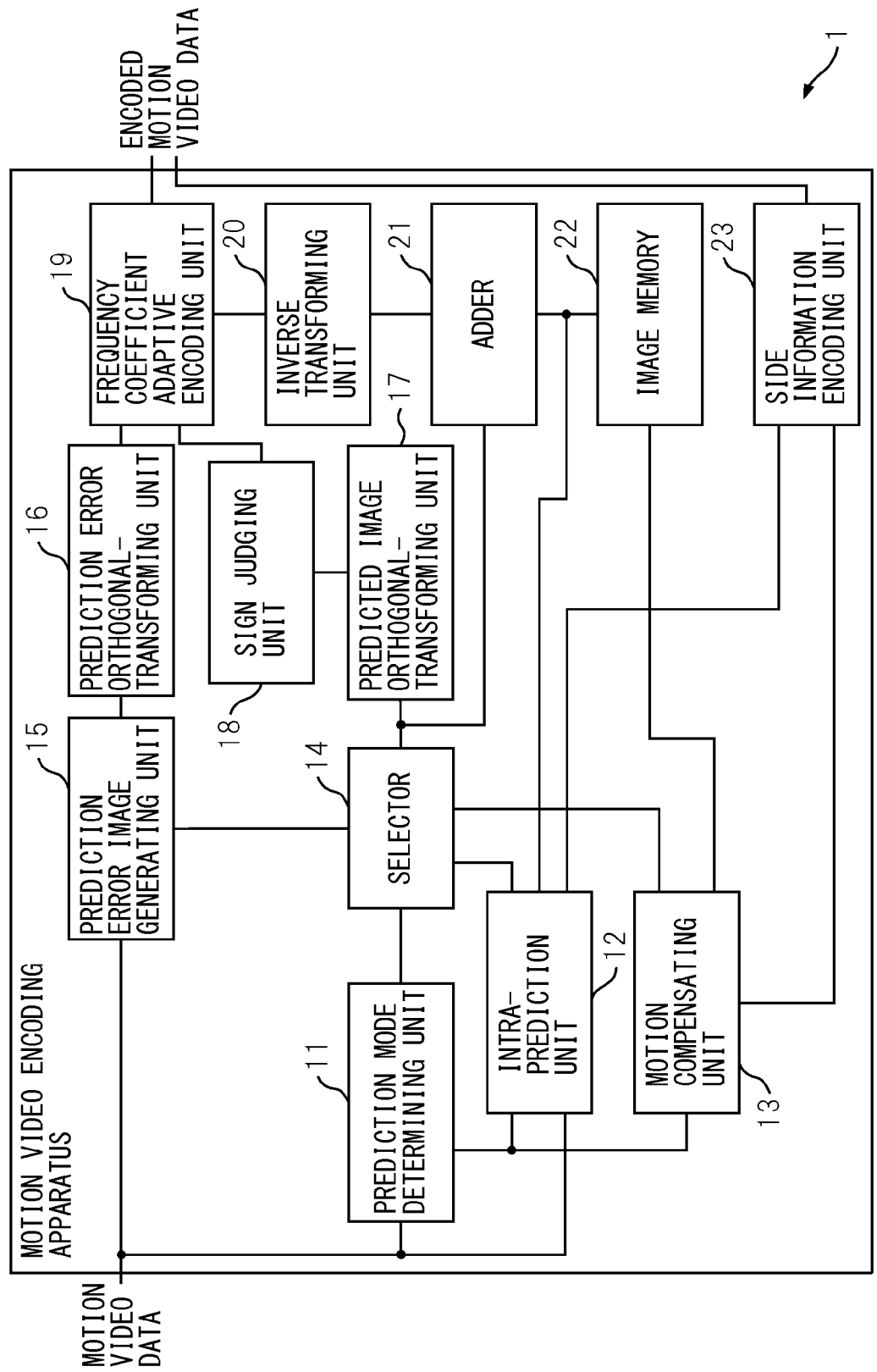
FIG. 1 is a diagram schematically illustrating the configuration of a motion video encoding apparatus according to a first embodiment.

FIG. 1 is a diagram schematically illustrating the configuration of a motion video encoding apparatus according to a first embodiment. The motion video encoding apparatus 1 includes a prediction mode determining unit 11, an intra-prediction unit 12, a motion compensating unit 13, a selector 14, a prediction error image generating unit 15, a prediction error orthogonal-transforming unit 16, a predicted image orthogonal-transforming unit 17, a sign judging unit 18, a frequency coefficient adaptive encoding unit 19, an inverse transforming unit 20, an adder 21, an image memory 22, and a side information encoding unit 23.

These units constituting the motion video encoding apparatus 1 are each implemented as a separate circuit. Alternatively, these units constituting the motion video encoding apparatus 1 may be implemented in the form of a single integrated circuit on which the circuits corresponding to the respective units are integrated. Further, these units constituting the motion video encoding apparatus 1 may be functional modules implemented by executing a computer program on a processor incorporated in the motion video encoding apparatus 1.

Picture data contained in the motion video data to be encoded are sequentially loaded into the motion video encoding apparatus 1 on a macroblock-by-macroblock basis from a buffer (not depicted) that stores the motion video data to be encoded. Each macroblock loaded into the motion video encoding apparatus 1 for encoding is passed to the prediction mode determining unit 11, the motion compensating unit 13, and the prediction error image generating unit 15.

The prediction mode determining unit 11 determines the prediction coding mode that specifies the method of predicted image creation for each block contained the macroblock to be encoded. For this purpose, the prediction mode determining unit 11 computes the cost which is a value for evaluating the amount of encoded data for the macroblock for each prediction coding mode. Then, the prediction mode determining unit 11 selects the prediction coding mode that minimizes the cost as the prediction coding mode to be applied to the macroblock to be encoded. For example, if the prediction coding mode that minimizes the cost is the inter-prediction coding mode that specifies inter-prediction coding, the prediction mode determining unit 11 selects the inter-prediction coding mode as the prediction coding mode. On the other hand, if the prediction coding mode that minimizes the cost is the intra-prediction coding mode that specifies intra-prediction coding, the prediction mode determining unit 11 selects the intra-prediction coding mode as the prediction coding mode.

Alternatively, the prediction mode determining unit 11 may determine the prediction coding mode according to the type of the picture being encoded in which the macroblock to be encoded is contained. For example, if the picture being encoded corresponds to an I-picture which is an intra-prediction coded picture, the prediction mode determining unit 11 selects the intra-prediction coding mode as the prediction coding mode. On the other hand, if the picture being encoded corresponds to a B-picture or P-picture which is an inter-prediction coded picture, the prediction mode determining unit 11 selects the inter-prediction coding mode as the prediction coding mode.

The prediction mode determining unit 11 notifies the selector 14 and the side information encoding unit 23 of the selected prediction coding mode. Further, when the selected prediction coding mode is the intra-prediction coding mode, the prediction mode determining unit 11 notifies the intra-prediction unit 12 to create a predicted image. On the other hand, when the selected prediction coding mode is the inter-prediction coding mode, the prediction mode determining unit 11 notifies the motion compensating unit 13 to create a motion-compensated predicted image.

The intra-prediction unit 12 is one example of a predicted image creating unit and, in accordance with the intra-prediction coding mode selected by the prediction mode determining unit 11, creates a predicted image for each block in the macroblock being encoded. In this case, the intra-prediction unit 12 creates the predicted image by using the pixel values of a reference block located adjacent to the block being encoded, the reference block being a block once encoded and then decoded, in accordance, for example, with a horizontal mode, a DC mode, a vertical mode, etc. defined in MPEG-4 AVC/H.264. In any mode, the value of each pixel in the predicted image is computed by averaging or weighted-averaging the values of a plurality of pixels in the reference block. Averaging or weighted-averaging is one example of low-pass filtering. Accordingly, the value of each pixel in the predicted image is a value obtained by applying low-pass filtering to the reference block. As a result, the high-frequency components of the predicted image created by intra-prediction are generally smaller than the high-frequency components of the reference block. The intra-prediction unit 12 passes the thus created predicted image to the selector 14.

The motion compensating unit 13 is another example of the predicted image creating unit and, when inter-prediction coding the macroblock, computes a motion vector by using the reference picture and the block being encoded within the macroblock being encoded. The motion vector represents the amount of spatial motion between the block being encoded and the reference picture that most resembles that block.

By performing block matching between the block being encoded and the reference block, the motion compensating unit 13 determines the reference picture that best matches the block being encoded and the location of its corresponding region on the reference picture.

The motion compensating unit 13 computes the motion vector based on the amount of horizontal and vertical motion between the location of the block being encoded in the picture and the location of the region on the reference picture that best matches that block.

The motion compensating unit 13 creates a predicted image by applying motion compensation, using the motion vector, to the region on the reference picture that best matches the block being encoded in the reference picture retrieved from the image memory 22. The motion compensation is a process for moving the region on the reference picture that most resembles the block being encoded, in such a manner as to offset the amount of positional displacement represented by the motion vector between the block being encoded and its corresponding region on the reference picture.

In some cases, the amount of horizontal or vertical motion between the block being encoded and the region on the reference picture that best matches that block may not be equal to an integral multiple of the pixel size. In view of this, the motion compensating unit 13 obtains the value of an attention pixel in the predicted image by performing interpolation using a plurality of pixels in the reference picture that are located at positions corresponding to the positions of pixels located in the neighborhood of the attention pixel. For example, when the attention pixel is displaced in position relative to a given pixel on the reference picture by an amount equal to one quarter of the pixel size, the interpolation operation is given, for example, by the following equation.

$$p(x) = \frac{\left(\left(\frac{r(A) - 5r(B) + 20r(C) + 20r(D) - 5r(E) + r(F)}{32}\right) + r(C)\right)}{2} \quad (1)$$

where p(x) obtained by interpolation represents the value of the attention pixel, x, in the predicted image, and r(A) to r(F) represent the values of pixels A to F arranged horizontally in a row in the reference picture and located in the neighborhood of the attention pixel. In this example, the attention pixel, x, is located between the pixels C and D, and is displaced from the pixel C by one quarter of the pixel size and from the pixel D by three quarters of the pixel size.

As is apparent from equation (1), the value of the attention pixel, x, is a value obtained by applying low-pass filtering to the reference picture. As a result, the high-frequency components of the predicted image created by inter-prediction are generally smaller than the high-frequency components of the corresponding region on the reference picture.

The motion compensating unit 13 passes the identifier of the reference picture to the side information encoding unit 23 along with the motion vector computed for each block in the macroblock being encoded. Further, the motion compensating unit 13 passes the predicted image created for each block in the macroblock being encoded to the selector 14.

In accordance with the prediction coding mode determined by the prediction mode determining 11, the selector 14 passes the predicted image received from the intra-prediction unit 12 or the motion compensating unit 13, whichever is appropriate, to the prediction error image generating unit 15, the predicted image orthogonal-transforming unit 17, and the adder 21.

For each block contained in the macroblock being encoded, the prediction error image generating unit 15 generates a prediction error image by computing the difference between the block and its predicted image received from the selector 14. The prediction error image generating unit 15 passes the prediction error image to the prediction error orthogonal-transforming unit 16.

By applying an orthogonal transform to the prediction error image computed for each block contained in the macroblock being encoded, the prediction error orthogonal-transforming unit 16 generates a plurality of frequency coefficients representing the horizontal and vertical spatial frequency components of the prediction error image. For example, by applying a discrete cosine transform (DCT) as the orthogonal transform to the prediction error image, the prediction error orthogonal-transforming unit 16 generates a set of DCT coefficients as the plurality of frequency coefficients. Instead of the discrete cosine transform, the prediction error orthogonal-transforming unit 16 may use other types of orthogonal transform, such as a Hadamard transform or a wavelet transform.

The prediction error orthogonal-transforming unit 16 passes the plurality of frequency coefficients generated for the prediction error image to the frequency coefficient adaptive encoding unit 19.

The predicted image orthogonal-transforming unit 17 computes a plurality of frequency coefficients for each predicted image by applying an orthogonal transform to the predicted image created for each block contained in the macroblock being encoded. The predicted image orthogonal-transforming unit 17 uses the same type of orthogonal transform as that performed by the prediction error orthogonal-transforming unit 16.

The predicted image orthogonal-transforming unit 17 passes the plurality of frequency coefficients of the predicted image to the sign judging unit 18.

The sign judging unit 18 judges, in accordance with a prescribe order, the sign of each given frequency coefficient of the predicted image created for each block contained in the macroblock being encoded. If the sign of the given frequency coefficient of the predicted image is positive, the sign judging unit 18 outputs "1" to an adaptive-quantizing/inverse-quantizing unit 191 in the frequency coefficient adaptive encoding unit 19 and "0" to an adaptively quantized coefficient encoding unit 192 in the frequency coefficient adaptive encoding unit 19.

On the other hand, if the sign of the given frequency coefficient of the predicted image is negative, the sign judging unit 18 outputs "−1" to the adaptive-quantizing/inverse-quantizing unit 191 and "1" to the adaptively quantized coefficient encoding unit 192.

The prescribed order here is the same as the order in which the adaptive-quantizing/inverse-quantizing unit 191 and the adaptively quantized coefficient encoding unit 192 quantize and entropy-code the frequency coefficients of the prediction error image, for example, the same order as that defined in MPEG-4 AVC/H.264.

Figure 2:
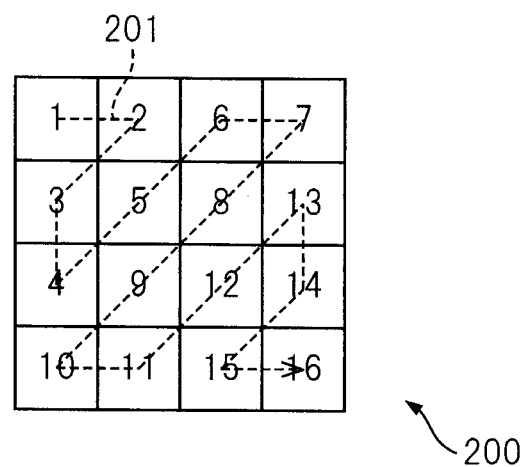
FIG. 2 is a diagram illustrating one example of the order in which the signs of the frequency coefficients of a predicted image are judged.

FIG. 2 is a diagram illustrating one example of the order in which the signs of the frequency coefficients of the predicted image are judged. In the example of FIG. 2, the predicted image 200 has a size of 4×4 pixels. In the predicted image 200, the pixel located in the upper left corner, for example, has a frequency coefficient representing the lowest frequency component. Pixels located closer to the pixel in the upper left corner have frequency coefficients representing lower frequency components.

Generally, in both the prediction error image and the predicted image, there is a tendency for frequency coefficients corresponding to lower frequency components to have larger absolute values. Conversely, pixels located closer to the lower right corner, i.e., frequency coefficients corresponding to higher frequency components, have smaller absolute values. As a result, when the frequency coefficients of the prediction error image are quantized, it is highly likely that the coefficients of the pixels located closer to the lower right corner are quantized to zero. Further, data containing a long run of specific symbols can be efficiently encoded. In view of this, in the present embodiment, the sign judging unit 18 judges the signs of the frequency coefficients in sequence, starting from the pixel in the upper left corner, as indicated by arrow 201. When the predicted image and the prediction error image each have a size other than the above size, for example, a size of 8×8 pixels, the sign judging unit 18 judges the signs of the frequency coefficients in like manner, starting from the pixel corresponding to the lowest frequency component.

The frequency coefficient adaptive encoding unit 19 is one example of an adaptive encoding unit. For each given one of the plurality of frequency coefficients of the prediction error image, the frequency coefficient adaptive encoding unit 19 computes a corrected frequency coefficient by multiplying that given frequency coefficient by the sign of the corresponding frequency coefficient in the predicted image that represents the same frequency component as that given frequency coefficient. The corrected frequency coefficient is one example of the sign match/mismatch information. Then, the frequency coefficient adaptive encoding unit 19 quantizes the corrected frequency coefficient and entropy-code the quantized frequency coefficient.

A description will be given below of how a skew occurs in the probability of occurrence of the corrected frequency coefficient.

Figure 3:
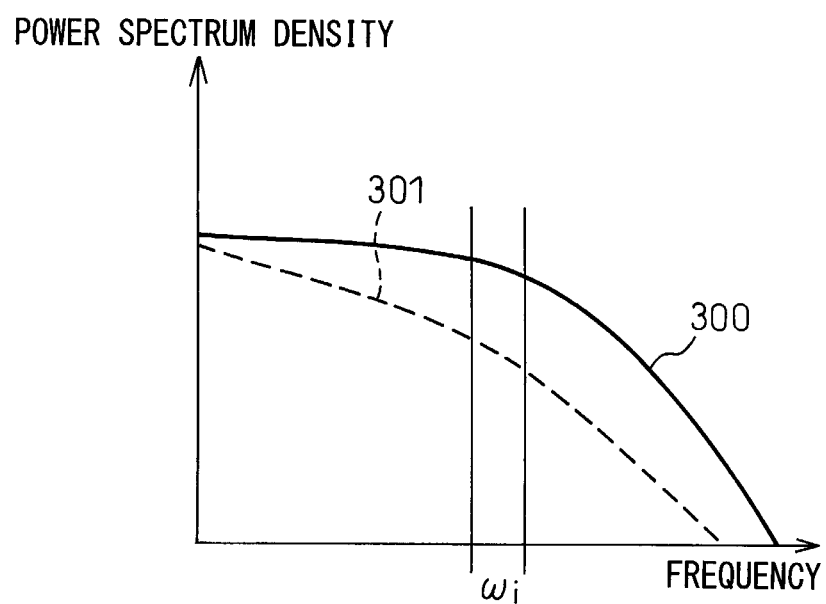
FIG. 3 is a diagram illustrating the relationship between the power spectrum of a block being encoded and the corresponding power spectrum of the predicted image.

FIG. 3 is a diagram illustrating the relationship between the power spectrum of the block being encoded within the picture being encoded and the power spectrum of the predicted image computed for the block being encoded. In the figure, the abscissa represents the frequency, and the ordinate represents the power spectrum density. Graph 300 depicts the power spectrum of the block being encoded, while graph 301 depicts the power spectrum of the predicted image.

As earlier described, the predicted image is computed by applying low-pass filtering to the reference picture or reference block once encoded and then decoded. As a result, the high-frequency components of the predicted image are smaller than the high-frequency components of the reference block or the region on the reference picture that was used to create the predicted image. Furthermore, since the predicted image is created so that it resembles the block being encoded, it is highly likely that the reference block or the region on the reference picture that was used to create the predicted image also resembles the block being encoded. Accordingly, it is highly likely that the high-frequency components of the block being encoded are about the same as the high-frequency components of the reference block or the region on the reference picture that was used to create the predicted image.

Accordingly, as illustrated in FIG. 3, the power spectrum of the predicted image is smaller over the entire frequency range than the power spectrum of the block being encoded. As a result, it is highly likely that the absolute value $|Coef_{pred}(i)|$ of the i-th frequency coefficient of the predicted image that corresponds to the frequency $\omega_i$, for example, becomes smaller than the absolute value $|Coef_{org}(i)|$ of the i-th frequency coefficient obtained by directly orthogonal-transforming the block being encoded.

Figure 4:
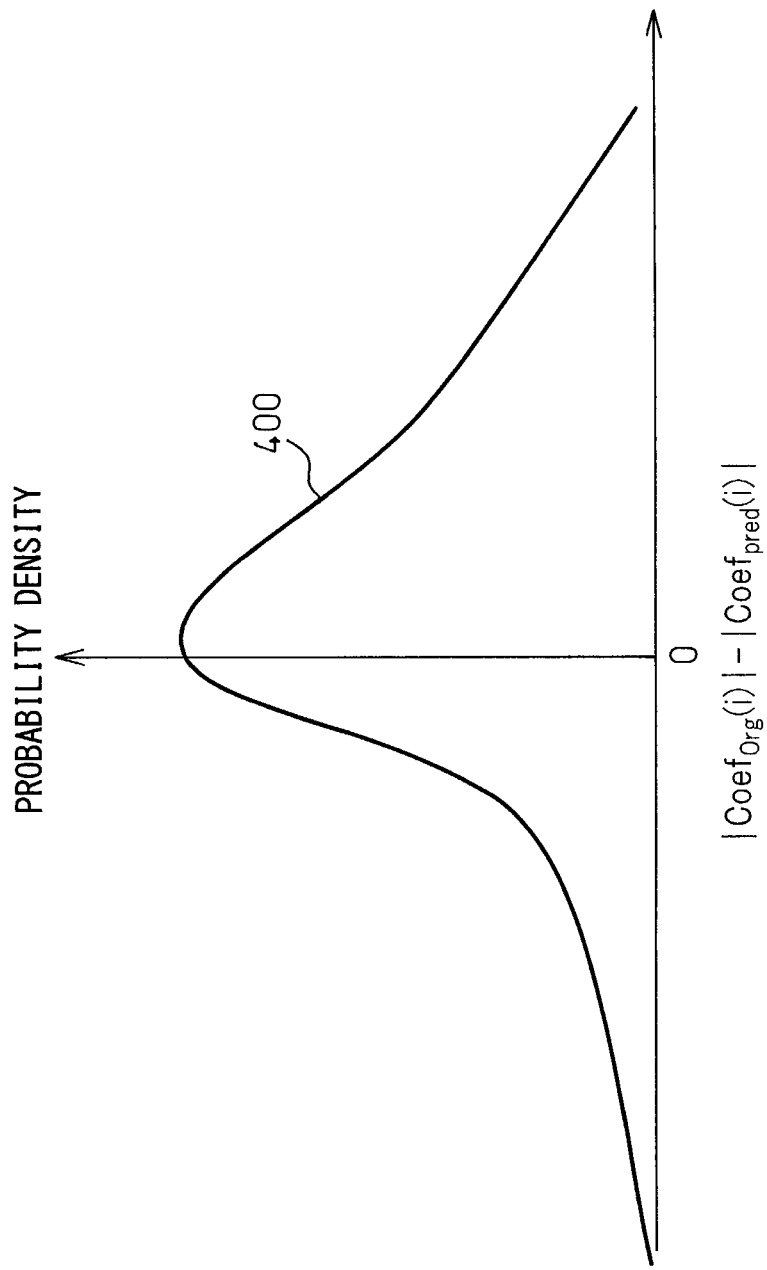
FIG. 4 is a diagram illustrating the probability distribution of the difference value obtained by subtracting the absolute value of each frequency coefficient of the predicted image from the absolute value of the corresponding frequency coefficient of the block being encoded.

FIG. 4 is a diagram illustrating the probability distribution of the difference value $\{|\text{Coef}_{org}(i)|-|\text{Coef}_{pred}(i)|\}$ obtained by subtracting the absolute value of each frequency coefficient of the prediction error image from the absolute value of the corresponding frequency coefficient of the block being encoded. In FIG. 4, the abscissa represents the value $\{|\text{Coef}_{org}(i)|-|\text{Coef}_{pred}(i)|\}$, and the ordinate represents the probability density. Graph 400 depicts the probability density distribution for the value $\{|\text{Coef}_{org}(i)|-|\text{Coef}_{pred}(i)|\}$.

As described above, it is highly likely that, at any given frequency, the absolute value $|\text{Coef}_{pred}(i)|$ of the frequency coefficient of the predicted image becomes smaller than the absolute value $|\text{Coef}_{org}(i)|$ of the frequency coefficient of the block being encoded. As a result, the probability of the value $\{|\text{Coef}_{org}(i)|-|\text{Coef}_{pred}(i)|\}$ being positive is higher than the probability of the value $\{|\text{Coef}_{org}(i)|-|\text{Coef}_{pred}(i)|\}$ being negative.

A function sign(x) that returns the sign of a variable x is defined as follows:

$$\text{sign}(x) = \begin{cases} 1 & x \geq 0 \\ -1 & x < 0 \end{cases} \quad (2)$$

Using the function sign(x), the value $\{|\text{Coef}_{org}(i)|-|\text{Coef}_{pred}(i)|\}$ is expressed as follows:

$$|Coef_{org}(i)| - |Coef_{pred}(i)| = \quad (3)$$
$$\text{sign}(Coef_{org}(i))Coef_{org}(i) - \text{sign}(Coef_{pred}(i))Coef_{pred}(i)$$

The frequency coefficients obtained by orthogonal-transforming the prediction error image generated based on the difference between the predicted image and the block being encoded are each equal to a value obtained by subtracting a respective one of the frequency coefficients of the predicted image from a corresponding one of the frequency coefficients of the block being encoded. Hence, the following equation holds.

$$\text{Coef}_{diff}(i) = \text{Coef}_{org}(i) - \text{Coef}_{pred}(i) \quad (4)$$

where $\text{Coef}_{diff}(i)$ is the i-th frequency coefficient of the prediction error image that corresponds to the frequency $\omega_i$.

Furthermore, since the predicted image is created so that it resembles the block being encoded, it is highly likely that the $\text{sign}(\text{Coef}_{org}(i))$ of each given frequency coefficient of the block being encoded is identical to the $\text{sign}(\text{Coef}_{pred}(i))$ of the corresponding frequency coefficient of the predicted image.

Accordingly, by substituting $\text{sign}(\text{Coef}_{pred}(i))$ for $\text{sign}(\text{Coef}_{org}(i))$ in equation (3) and by applying equation (4), the following equation is obtained.

$$\text{sign}(Coef_{org}(i))Coef_{org}(i) - \text{sign}(Coef_{pred}(i))$$
$$Coef_{pred}(i) \approx \text{sign}(Coef_{pred}(i))\text{Coeforg}(i) - \text{sign}$$
$$(Coef_{pred}(i))Coef_{pred}(i) = \text{sign}(Coef_{pred}(i))(\text{Co-}$$
$$\text{eforg}(i) - Coef_{pred}(i)) = \text{sign}(Coef_{pred}(i))Coef_{diff}(i) \quad (5)$$

Accordingly, in the probability distribution of the corrected frequency coefficient $\text{sign}(\text{Coef}_{pred}(i))\text{Coef}_{diff}(i)$ obtained by multiplying the frequency coefficient of the prediction error image by the sign of the corresponding frequency component of the predicted image, the probability of the sign being positive is higher than the probability of the sign being negative, as illustrated in FIG. 4.

Figure 5:
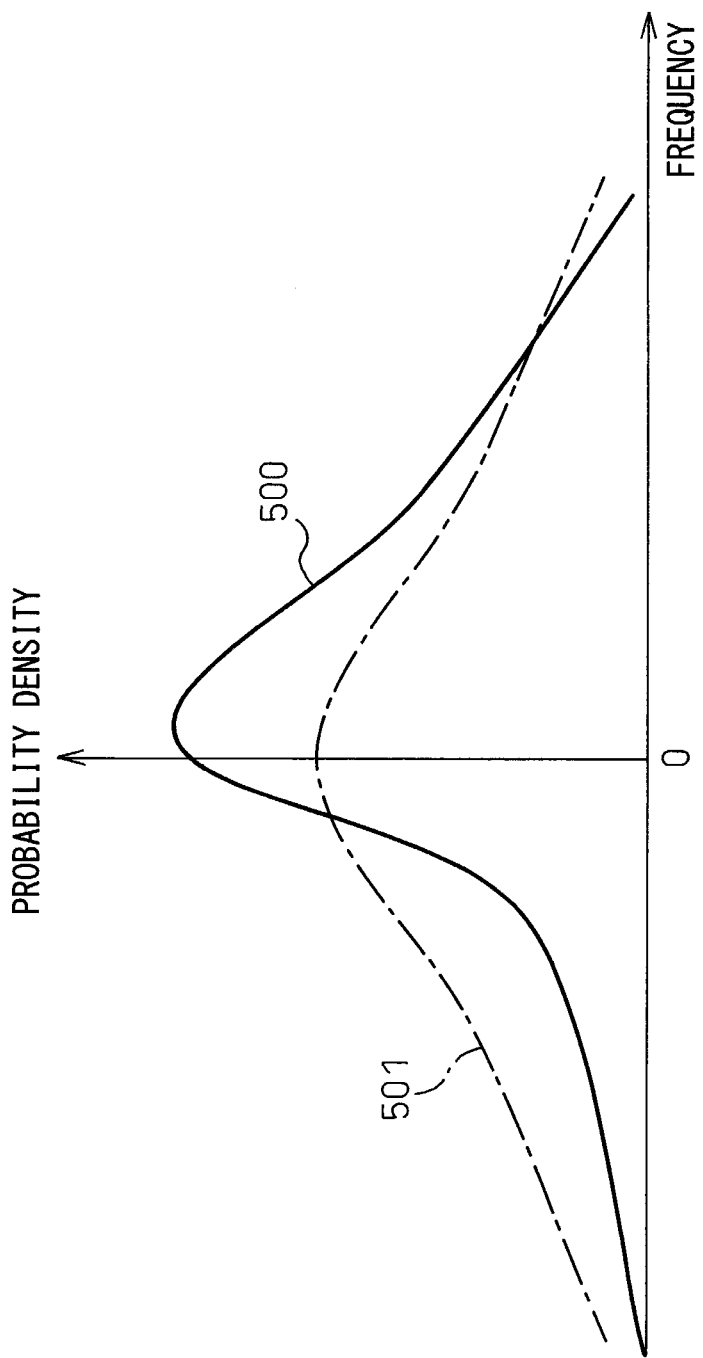
FIG. 5 is a diagram illustrating the probability distribution of corrected frequency coefficients for comparison with the probability distribution of frequency coefficients of a prediction error image.

FIG. 5 is a diagram illustrating the probability distribution of the corrected frequency coefficient for comparison with the probability distribution of the frequency coefficient of the prediction error image. In FIG. 5, the abscissa represents the frequency, and the ordinate represents the probability density. Graph 500 depicts the probability distribution of the corrected frequency coefficient $\text{sign}(\text{Coef}_{pred}(i))\text{Coef}_{diff}(i)$, while graph 501 depicts the probability distribution of the frequency coefficient $\text{Coef}_{diff}(i)$ of the prediction error image.

As described above, the probability density of the corrected frequency coefficient $\text{sign}(\text{Coef}_{pred}(i))\text{Coef}_{diff}(i)$ being positive is higher than the probability density of the corrected frequency coefficient $\text{sign}(\text{Coef}_{pred}(i))\text{Coef}_{diff}(i)$ being negative. As a result, the probability distribution of the corrected frequency coefficient $\text{sign}(\text{Coef}_{pred}(i))\text{Coef}_{diff}(i)$ is skewed and asymmetrical about the frequency "0". On the other hand, in the probability distribution of the frequency coefficient $\text{Coef}_{diff}(i)$ of the prediction error image, the probability density of the positive value is approximately equal to the probability density of the negative value.

It therefore follows that the amount of information needed to represent the corrected frequency coefficient sign-$(\text{Coef}_{pred}(i))\text{Coef}_{diff}(i)$ is smaller than the amount of information needed to represent the frequency coefficient $\text{Coef}_{diff}(i)$ of the prediction error image. In view of this, the motion video encoding apparatus 1 can enhance the coding efficiency by encoding the corrected frequency coefficient sign$(\text{Coef}_{pred}(i))\text{Coef}_{diff}(i)$.

Figure 6:
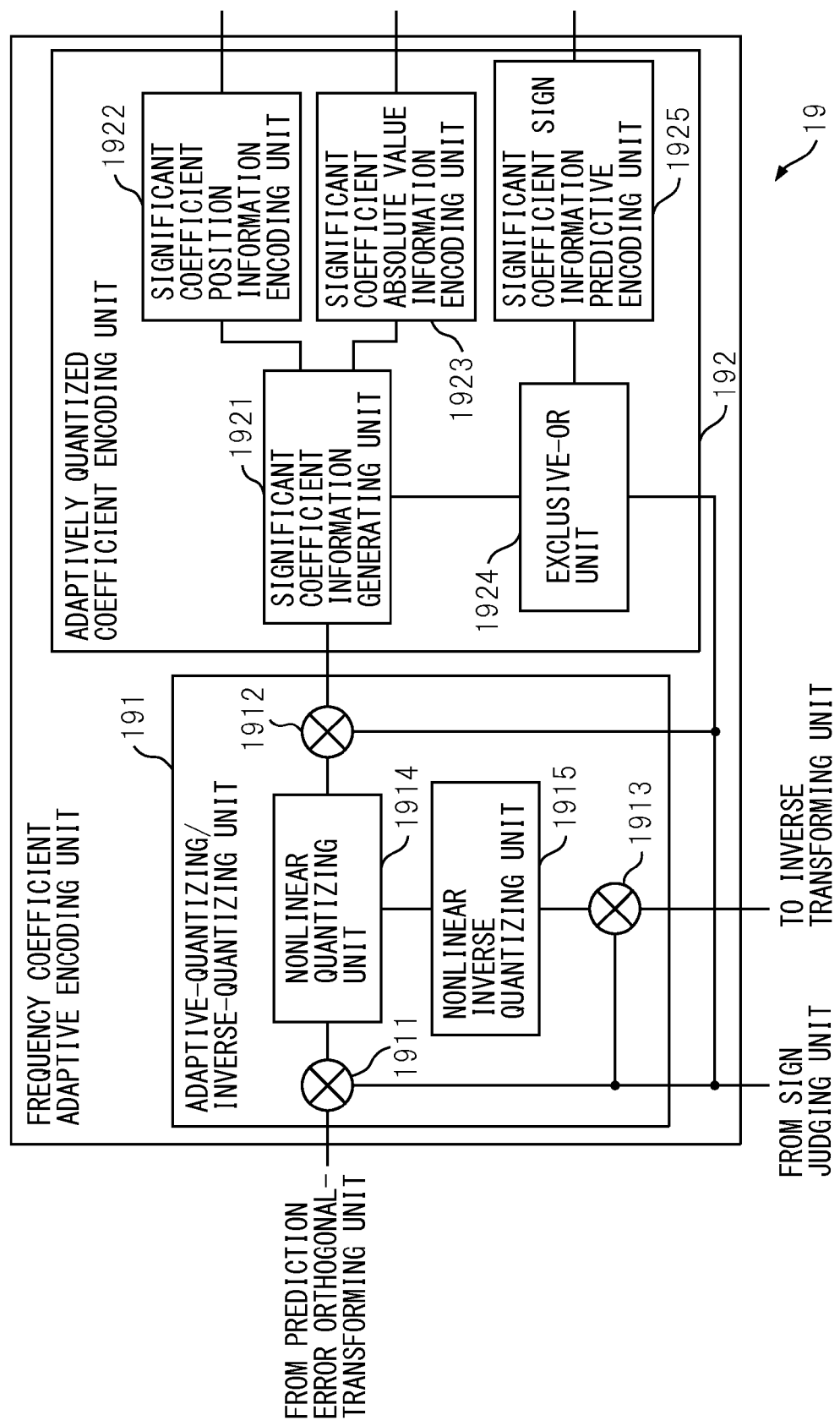
FIG. 6 is a diagram schematically illustrating the configuration of a frequency coefficient adaptive encoding unit.

FIG. 6 is a diagram schematically illustrating the configuration of the frequency coefficient adaptive encoding unit 19. The frequency coefficient adaptive encoding unit 19 includes the adaptive-quantizing/inverse-quantizing unit 191 and the adaptively quantized coefficient encoding unit 192.

The adaptive-quantizing/inverse-quantizing unit 191 computes the corrected frequency coefficients of the prediction error image for each block within the macroblock being encoded, and quantizes the corrected frequency coefficients. For this purpose, the adaptive-quantizing/inverse-quantizing unit 191 includes three multipliers 1911 to 1913, a nonlinear quantizing unit 1914, and a nonlinear inverse quantizing unit 1915.

The multiplier 1911 computes each corrected frequency coefficient by multiplying a given one of the frequency coefficients of the prediction error image by the sign determined by the sign judging unit 18 for the corresponding frequency coefficient in the predicted image that represents the same frequency component as that given frequency coefficient. Accordingly, if the sign of the given frequency coefficient of the prediction error image and the sign of the corresponding frequency coefficient of the predicted image match, the sign of the corrected frequency coefficient corresponding to that given frequency coefficient is positive. On the other hand, if the sign of the given frequency coefficient of the prediction error image and the sign of the corresponding frequency coefficient of the predicted image do not match, the sign of the corrected frequency coefficient corresponding to that given frequency coefficient is negative.

The multiplier 1911 supplies the plurality of corrected frequency coefficients obtained for each prediction error image to the nonlinear quantizing unit 1914.

The nonlinear quantizing unit 1914 quantizes the corrected frequency coefficients.

Figure 7:
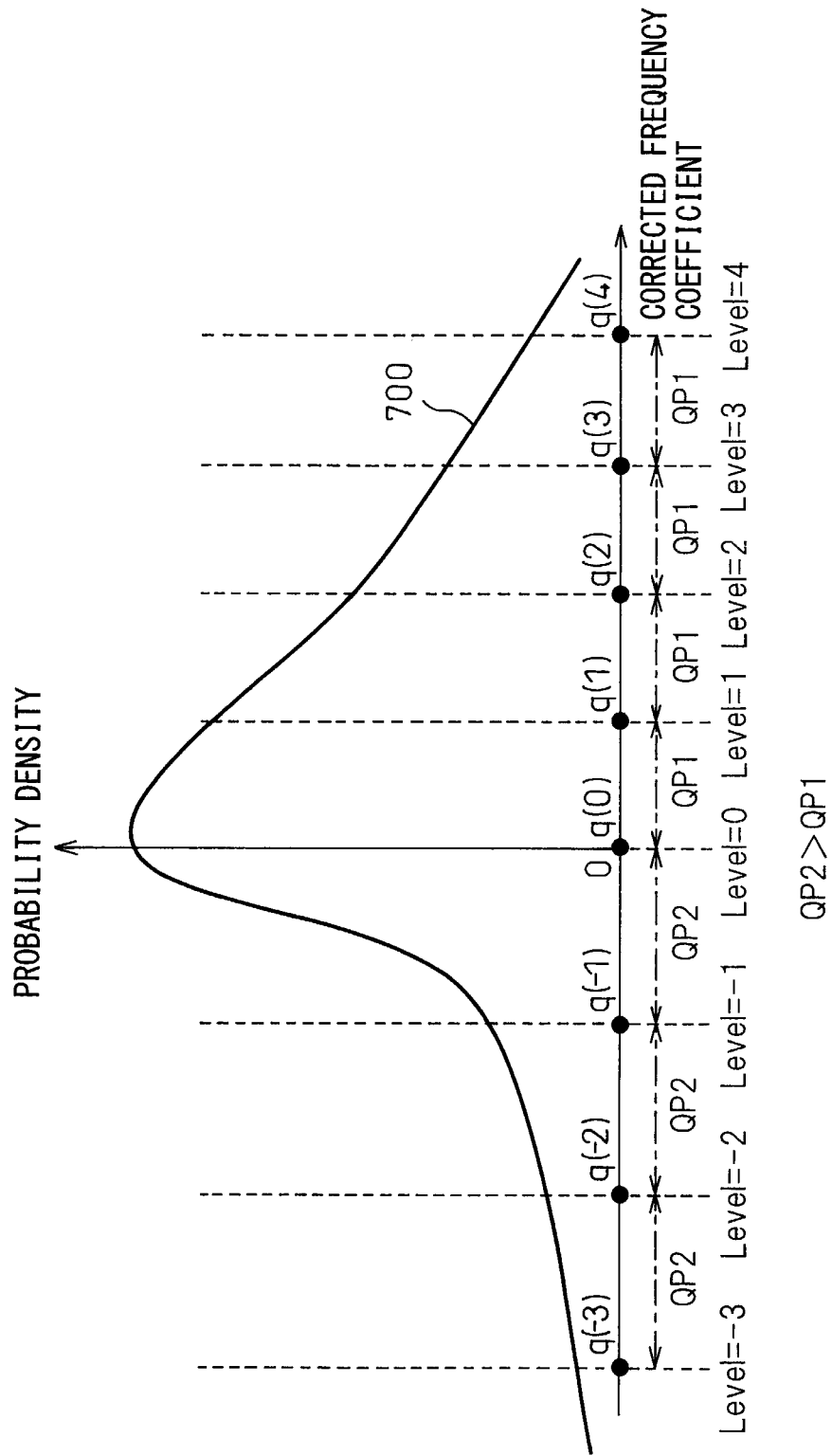
FIG. 7 is a diagram illustrating one example of the relationship between the quantization scale and the probability density distribution of the corrected frequency coefficient.

FIG. 7 is a diagram illustrating one example of the relationship between the quantization scale and the probability density distribution of the corrected frequency coefficient. In FIG. 7, the abscissa represents the corrected frequency coefficient, and the ordinate represents the probability density. Graph 700 depicts the probability density distribution of the corrected frequency coefficient. This graph 700 corresponds to the probability distribution graph 500 of sign(Coef$_{pred}$(i)Coef$_{diff}$(i)) plotted in FIG. 5. QP1 and QP2 each represent the quantization scale when the corrected frequency coefficient has a positive value or a negative value, respectively. "Level" indicates the corrected quantized coefficient. On the other hand, q(i) is the quantization level corresponding to Level(i). The quantization level represents the value to which the corrected frequency coefficient is quantized. The corrected quantized coefficient is an index value to the corresponding quantization level.

As earlier described, the probability density of the corrected frequency coefficient, i.e., sign(Coef$_{pred}$(i)Coef$_{diff}$(i)), being positive is higher than the probability density of sign(Coef$_{pred}$(i)Coef$_{diff}$(i)) being negative. As a result, the probability distribution of the corrected frequency coefficient sign(Coef$_{pred}$(i))Coef$_{diff}$(i) is skewed and asymmetrical about "0", as depicted by the graph 700.

For such a skewed asymmetrical distribution, it is known that the smaller the spacing between adjacent quantization levels is made for a symbol having a higher probability of occurrence, the smaller is the quantization error. In the present embodiment, as earlier noted, the probability of occurrence of the corrected frequency coefficient having a positive value is higher than the probability of occurrence of the corrected frequency coefficient having a negative value, provided that the absolute values of the corrected frequency coefficients are the same.

Accordingly, the nonlinear quantizing unit 1914 sets the quantization scale Q2 for the negative-valued corrected frequency coefficients larger than the quantization scale Q1 for the positive-valued corrected frequency coefficients. With this setting, the nonlinear quantizing unit 1914 can reduce the amount of information needed to represent the negative-valued corrected frequency coefficients, whose probability of occurrence is low, while allowing the positive-valued corrected frequency coefficients, whose probability of occurrence is high, to be quantized so that they can be reconstructed accurately.

For example, the nonlinear quantizing unit 1914 computes the corrected quantized coefficients by quantizing the corrected frequency coefficients in accordance with the following equation.

$$\text{Level}_c(i)=\text{sign}(\text{Coef}_c(i))\text{int}(\text{abs}(\text{Coef}_c(i))/QP1+0.5)$$
$$\text{Coef}_c(i) \geq 0 \qquad (6)$$

$$\text{Level}_c(i)=\text{sign}(\text{Coef}_c(i))\text{int}(\text{abs}(\text{Coef}_c(i))/QP2+0.5)$$
$$\text{Coef}_c(i) < 0$$

In the equation, the function int(x) is a function that outputs the largest integer not larger than x. The function abs(x) is a function that outputs the absolute value of the variable x. Coef$_c$(i) is the i-th corrected frequency component, where Coef$_c$(i)=sign(Coef$_{pred}$(i)Coef$_{diff}$(i)). Each corrected frequency coefficient is thus quantized to the corrected quantized coefficient corresponding to the nearest of the plurality of quantization levels whose spacing is chosen to be equal to the quantization scale.

The nonlinear quantizing unit 1914 may compute each corrected quantized coefficient by performing, instead of the operation defined by the above function int( ) a rightward bit shift operation corresponding to the quantization scale QP1 or QP2 on the value obtained by adding one half of the quantization scale to the absolute value of the corrected frequency coefficient. For example, when the quantization scale QP1 is "8", since 8=2$^3$ the nonlinear quantizing unit 1914 causes the value obtained by adding one half of the quantization scale to the absolute value of the corrected frequency coefficient to be shifted three bits to the right.

The quantization scales QP1 and QP2 are determined in advance, for example, in the following manner, and pre-stored in a memory that the nonlinear quantizing unit 1914 has.

First, the initial value QP and constant α are set for the quantization scale. Using this QP and α, QP1 and QP2 are expressed by the following equations.

$$QP1=QP-\alpha$$

$$QP2=QP+\alpha \qquad (7)$$

Then, motion video test data is prepared, and the motion video test data is encoded in accordance with the present embodiment while varying the quantization scale QP, and a coding rate/distortion characteristic is obtained. The coding rate/distortion characteristic is expressed by the signal to noise ratio of the motion video data decoded from the encoded motion video test data, for example, when the coding rate is changed variously. Then, the value of QP that yielded the best coding rate/distortion characteristic is selected. Next, the motion video test data is encoded in accordance with the present embodiment while varying the constant α, and the coding rate/distortion characteristic is obtained. Then, the value of α that yielded the best coding rate/distortion characteristic is selected. Then, by substituting the selected QP and α into the equations (7), QP1 and QP2 are determined.

The nonlinear quantizing unit 1914 may set the spacing between adjacent quantization levels in such a manner that the spacing varies nonlinearly with the absolute value of the quantization level so as to achieve the optimum spacing according to the probability density distribution of the corrected frequency coefficients. In this case, in order to minimize the quantization error, the spacing between adjacent quantization levels is set smaller as the probability corresponding to the quantization level is higher.

For example, M. D. Paez, T. H. Glisson, "Minimum Mean-Squared-Error Quantization in Speech PCM and DPCM systems," IEEE TRANSACTIONS ON COMMUNICATIONS, pp. 225-230, April 1972, presents quantization levels when the probability density distribution follows Laplacian distribution. Generally, the probability distribution PDF(x) that follows Laplacian distribution is expressed by the following equation.

$$PDF(x)=a/2 \cdot \exp|-2 \cdot x|$$

where a is an arbitrary constant, and x is the symbol value.

As the value of x increases, the value of the probability distribution PDF(x) exponentially approaches zero. The above document presents quantization levels for cases where the number N of quantization levels is 2, 4, 8, and 32, respectively. For example, suppose that the number N of quantization levels is 8, and that $y_i$ (i=1, 2, 3, 4) represents the quantization levels arranged in order of increasing distance from zero and symmetrical between the positive and negative values. In this case, the first quantization level is given as $y_1=\pm 0.222$, the second quantization level as $y_2=\pm 0.785$, the third quantization level as $y_3=\pm 1.576$, and the fourth quantization level as $y_4=\pm 2.994$. Hence, the spacings between the respective quantization levels are: $y_2-y_1=0.563$, $y_3-y_2=0.791$, and $y_4-y_3=1.418$. Thus, it can be seen that the spacing between adjacent quantization levels increases as the symbol value increases and as the probability of the symbol value decreases.

In the present embodiment, the probability of occurrence of the corrected frequency coefficient having a positive value is higher than the corrected frequency coefficient having a negative value, when the absolute values of the corrected frequency coefficients are the same. Accordingly, the quantization levels are set so that the spacing between the quantization levels for two adjacent corrected frequency coefficients having different negative values becomes wider than the spacing between the quantization levels for two adjacent corrected frequency coefficients having different positive values whose absolute values are the same as those of the negative values. For this purpose, the quantization level for each corrected frequency coefficient may be determined in accordance with the Lloyd-Max method, for example, based on the probability distribution of occurrence of the corrected frequency coefficient obtained on a motion video test sequence. The quantization levels are then stored, for example, in a memory that the nonlinear quantizing unit 1914 has.

In this case, the nonlinear quantizing unit 1914 quantizes each corrected frequency coefficient to the nearest of the plurality of quantization levels, and outputs the corrected quantized coefficient corresponding to that quantization level.

Figure 8:
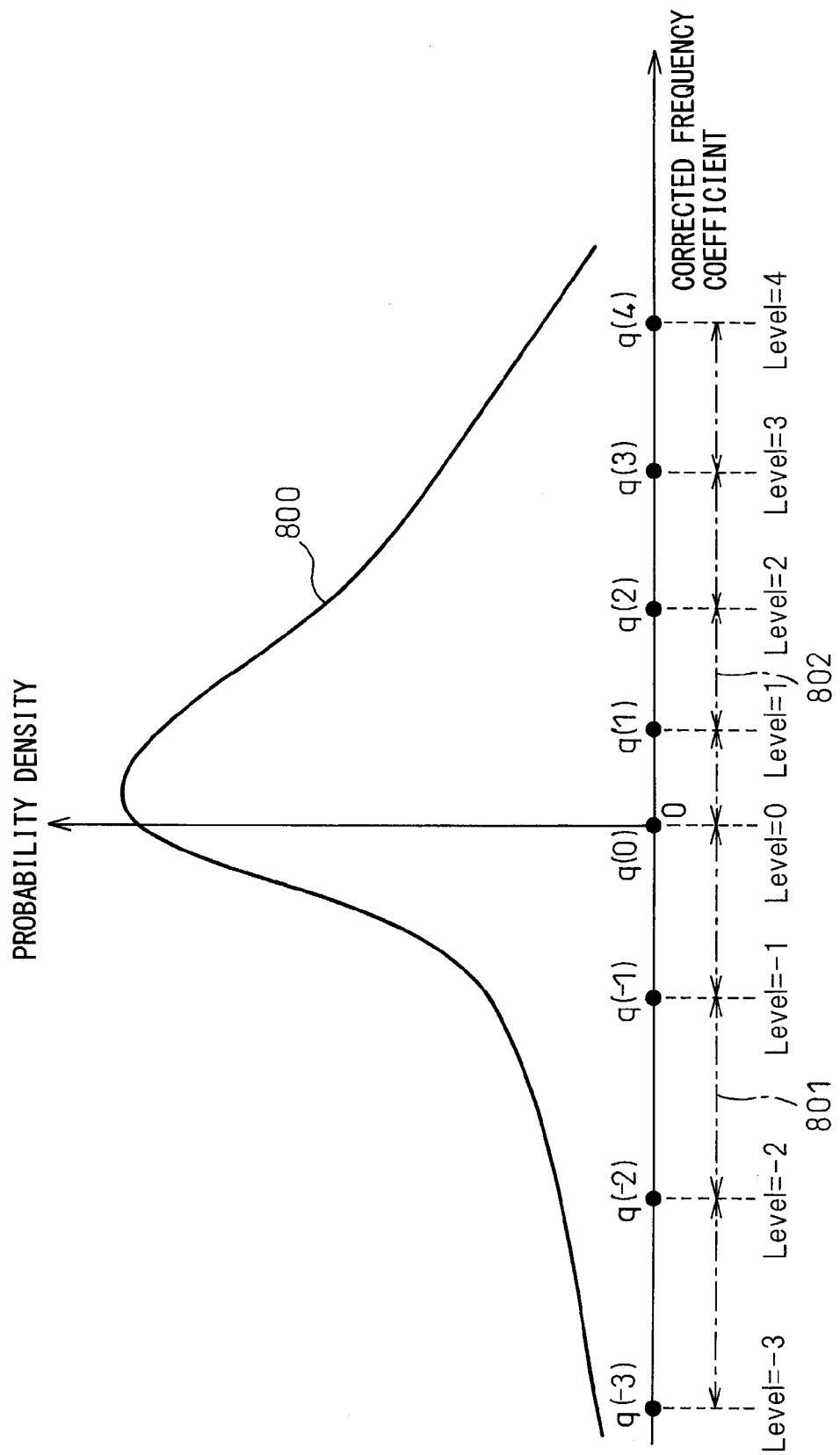
FIG. 8 is a diagram illustrating one example of the relationship between the quantization level and the probability density distribution of the corrected frequency coefficient.

FIG. 8 is a diagram illustrating one example of the relationship between the quantization level and the probability density distribution of the corrected frequency coefficient. In FIG. 8, the abscissa represents the corrected frequency coefficient, and the ordinate represents the probability density. Graph 800 depicts the probability density distribution of the corrected frequency coefficient. This graph 800 corresponds to the probability distribution graph 500 of sign($Coef_{pred}(i)$)$Coef_{diff}(i)$ plotted in FIG. 5. "Level" indicates the corrected quantized coefficient. On the other hand, q(i) is the quantization level corresponding to Level(i).

As earlier described, the probability density of the corrected frequency coefficient, i.e., sign($Coef_{pred}(i)$)$Coef_{diff}(i)$, being positive is higher than the probability density of sign($Coef_{pred}(i)$)$Coef_{diff}(i)$ being negative. As a result, the quantization levels corresponding to the corrected quantized coefficients whose absolute values are the same are set so that the spacing between the quantization levels having negative values becomes wider than the spacing between the quantization levels having positive values. For example, the spacing 801 between the quantization level q(−1) corresponding to the corrected quantized coefficient "−1" and the quantization level q(−2) corresponding to the corrected quantized coefficient "−2" is set wider than the spacing 802 between the quantization level q(1) corresponding to the corrected quantized coefficient "1" and the quantization level q(2) corresponding to the corrected quantized coefficient "2".

The nonlinear quantizing unit 1914 passes the corrected quantized coefficient corresponding to each corrected frequency coefficient to the nonlinear inverse quantizing unit 1915 as well as to the multiplier 1912.

The multiplier 1912 computes the quantized coefficient corresponding to each frequency coefficient of the prediction error image by multiplying each given one of the corrected quantized coefficients by the sign of the corresponding frequency coefficient in the predicted image that represents the same frequency component as that given corrected quantized coefficient. As a result of this multiplication by the sign, the frequency coefficient of the prediction error image that corresponds to the given corrected quantized coefficient has been multiplied twice by the sign of the corresponding frequency coefficient of the predicted image. Accordingly, the sign of each quantized coefficient output from the multiplier 1912 matches the sign of the corresponding frequency coefficient of the prediction error image. Each quantized coefficient output from the multiplier 1912 is supplied to the adaptively quantized coefficient encoding unit 192.

The nonlinear inverse quantizing unit 1915 inverse-quantizes each corrected quantized coefficient to reconstruct the corresponding corrected frequency coefficient. In the present embodiment, the nonlinear inverse quantizing unit 1915 inverse-quantizes each corrected quantized coefficient by using a quantization scale whose value differs depending on the sign of the corrected quantized coefficient, as in the case of the nonlinear quantizing unit 1914.

For example, the nonlinear inverse quantizing unit 1915 inverse-quantizes each corrected quantized coefficient in accordance with the following equation.

$$q(\text{level}) = QP1 \cdot \text{level} \quad \text{level} \geq 0$$

$$q(\text{level}) = QP2 \cdot \text{level} \quad \text{level} < 0 \tag{8}$$

In the equation, "level" represents the corrected quantized coefficient. QP1 and QP2 each represent the quantization scale when the sign of the corrected quantized coefficient is positive or negative, respectively, and are the same as the quantization scales QP1 and QP2 that the nonlinear quantizing unit 1914 uses. Finally, q(level) is the reconstructed corrected frequency coefficient, and represents the corrected frequency coefficient corresponding to the corrected quantized coefficient "level".

When the spacing between adjacent quantization levels is set so as to vary according to the absolute value of the corrected frequency coefficient, the nonlinear inverse quantizing unit 1915 prestores, for example, in its internal memory, a mapping table that provides a mapping between the corrected quantized coefficient and the quantization level. Then, by referring to the mapping table, the nonlinear inverse quantizing unit 1915 obtains the quantization level corresponding to the corrected quantized coefficient as representing the reconstructed corrected frequency coefficient.

The nonlinear inverse quantizing unit 1915 supplies each reconstructed corrected frequency coefficient to the multiplier 1913.

The multiplier 1913 reconstructs each frequency coefficient of the prediction error image by multiplying each given one of the reconstructed corrected frequency coefficients by the sign of the corresponding frequency coefficient of the predicted image. This means that the frequency coefficient of the prediction error image that corresponds to the reconstructed frequency coefficient has been multiplied twice by the sign of the corresponding frequency coefficient of the predicted image. Accordingly, the sign of each reconstructed frequency coefficient output from the multiplier 1913 matches the sign of the corresponding frequency coefficient of the prediction error image. Each reconstructed frequency coefficient output from the multiplier 1913 is supplied to the inverse transforming unit 20.

The adaptively quantized coefficient encoding unit 192 receives from the adaptive-quantizing/inverse-quantizing unit 191 the quantized coefficients of each prediction error image in the macroblock being encoded, and entropy-codes the quantized coefficients. For this purpose, the adaptively quantized coefficient encoding unit 192 includes a significant coefficient information generating unit 1921, a significant coefficient position information encoding unit 1922, a significant coefficient absolute value information encoding unit 1923, an exclusive-OR unit 1924, and a significant coefficient sign information predictive encoding unit 1925.

The significant coefficient information generating unit 1921 extracts quantized coefficients having nonzero values as the significant coefficients from among the plurality of quantized coefficients of the prediction error image generated for each block contained in the macroblock being encoded. The significant coefficient information generating unit 1921 checks each quantized coefficient in sequence to see if it is nonzero or not in the same order as the sign judging unit 18 judges the signs of the frequency coefficients of the predicted image. Then, the significant coefficient information generating unit 1921 passes significant coefficient position information representing the position of the significant coefficient to the significant coefficient position information encoding unit 1922. Further, the significant coefficient information generating unit 1921 passes significant coefficient absolute value information representing the absolute value of the significant coefficient to the significant coefficient absolute value information encoding unit 1923. The significant coefficient information generating unit 1921 also passes significant coefficient sign information representing the sign of the significant coefficient to the exclusive-OR unit 1924.

Figure 9:
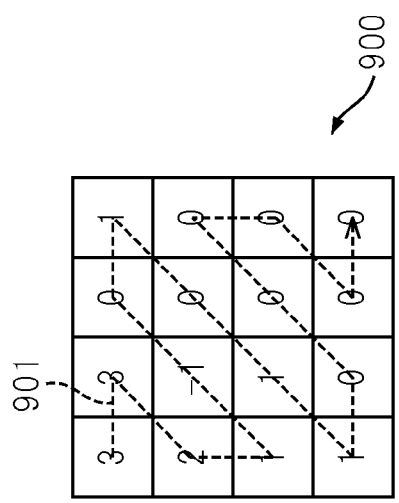
FIG. 9 is a diagram illustrating the relationship between significant coefficient information and the order in which the coefficients are referenced.

FIG. 9 is a diagram illustrating the relationship between the significant coefficient information and the order in which the quantized coefficients are referenced. Image 900 in FIG. 9 is an image representing the quantized coefficients of the prediction error image. In the image 900, the value of each pixel represents the quantized coefficient of that pixel. Arrow 901 in the image 900 indicates the order in which the quantized coefficients are referenced. In the illustrated example, nonzero pixels are located at the first to fifth positions, seven position, ninth position, and 10th position, respectively, in the order of reference.

Table 910 depicts the significant coefficient position information, significant coefficient absolute value information, and significant coefficient sign information for the image 900. In the table 910, row 911 carries the identification numbers of the significant coefficients. The identification numbers are assigned so as to increment by 1 from left to right starting from the first detected significant coefficient in the order in which the quantized coefficients are referenced.

Row 912 carries the significant coefficient position information. The significant coefficient position information includes numbers each corresponding to the order in which the pixel having the corresponding significant coefficient is referenced. In the illustrated example, the significant coefficient positions are numbered 1, 2, 3, 4, 5, 7, 9, and 10 in sequence from left to right starting from the significant coefficient with identification number "1".

Further, row 913 carries the significant coefficient absolute value information. In the illustrated example, since the significant coefficient with identification number "1" corresponds to the pixel located in the upper left corner, the absolute value of the significant coefficient corresponding to the significant coefficient with identification number "1" is "3". Similarly, since the significant coefficient with identification number "5" corresponds to the second pixel from the left as well as from the top, the absolute value of the significant coefficient corresponding to the significant coefficient with identification number "5" is "1".

Row 914 carries the significant coefficient sign information. In the present embodiment, the significant coefficient sign information is set to "0" when the sign of the significant coefficient is positive, and to "1" when the sign of the significant coefficient is negative. In the illustrated example, only the significant coefficient corresponding to the pixel located at the fifth position in the order of reference has a negative value. Therefore, the significant coefficient sign information is set to "1" only for the significant coefficient corresponding to the identification number "5", and the significant coefficient sign information is set to "0" for the significant coefficients corresponding to the other identification numbers.

The significant coefficient position information encoding unit 1922 entropy-codes the significant coefficient position information. In this case, the significant coefficient position information encoding unit 1922 assigns an optimum entropy code by utilizing the property that a quantized coefficient whose corresponding frequency is lower has a higher probability of being a significant coefficient. For example, the significant coefficient position information encoding unit 1922 entropy-codes the significant coefficient position information by using a method of entropy coding such as Huffman coding, context-adaptive binary arithmetic coding (CABAC), or other arithmetic coding. The significant coefficient position information encoding unit 1922 supplies the entropy-coded significant coefficient position information to a consolidating unit not depicted.

The significant coefficient absolute value information encoding unit 1923 entropy-codes the significant coefficient absolute value information. In this case, the significant coefficient absolute value information encoding unit 1923 assigns an optimum entropy code by utilizing the property that a quantized coefficient whose corresponding frequency is lower has a higher probability of having a larger value and, conversely, a quantized coefficient whose corresponding frequency is higher has a higher probability of having a smaller value. For example, the significant coefficient absolute value information encoding unit 1923 entropy-codes the significant coefficient absolute information by using a method of entropy coding such as Huffman coding, CABAC, or other arithmetic coding. The significant coefficient absolute value information encoding unit 1923 supplies the entropy-coded significant coefficient absolute value information to the consolidating unit not depicted.

The exclusive-OR unit 1924 receives from the sign judging unit 18 the value indicating the sign of the corresponding frequency coefficient in the predicted image that represents the same frequency component as the significant coefficient. Then, the exclusive-OR unit 1924 obtains a sign match/mismatch prediction value by performing an exclusive-OR operation between the value of the significant coefficient sign information indicating the sign of the significant coefficient and the value indicating the sign of the corresponding frequency coefficient of the predicted image. The sign match/mismatch prediction value is one example of the sign match/mismatch information.

In the present embodiment, when the sign of the significant coefficient is positive, the value of the significant coefficient sign information is "0", and when the sign of the significant coefficient is negative, the value of the significant coefficient sign information is "1". On the other hand, when the sign of the corresponding frequency coefficient of the predicted image is positive, the value received from the sign judging unit 18 is "0", and when the sign of the corresponding frequency coefficient of the predicted image is negative, the value received from the sign judging unit 18 is "1". Accordingly, when the sign of the significant coefficient matches the sign of the corresponding frequency coefficient of the predicted image, the sign match/mismatch prediction value is "0"; on the other hand, when the sign of the significant coefficient does not match the sign of the corresponding frequency coefficient in the predicted image, the sign match/mismatch prediction value is "1". The exclusive-OR unit 1924 supplies the sign match/mismatch prediction information containing the sign match/mismatch prediction value for each significant coefficient to the significant coefficient sign information predictive encoding unit 1925.

The significant coefficient sign information predictive encoding unit 1925 entropy-codes the sign match/mismatch prediction information. The sign match/mismatch prediction value contained in the sign match/mismatch prediction information is set to "0" when the sign of the significant coefficient, which is a nonzero quantized coefficient, matches the sign of the corresponding frequency coefficient of the predicted image. The probability of the sign of the quantized coefficient matching the sign of the corresponding frequency coefficient of the predicted image is higher than the probability of the signs not matching. Accordingly, the probability of the sign match/mismatch prediction value being "0" is higher than the probability of the sign match/mismatch prediction value being "1".

FIG. 10 is a diagram illustrating the sign match/mismatch prediction values along with the frequency coefficients of the predicted image in corresponding relationship to FIG. 9. In FIG. 10, image 1000 is an image representing the frequency coefficients of the predicted image, and corresponds to the image representing the frequency coefficients of the prediction error image depicted in FIG. 9. Table 1010 in FIG. 10 differs from the table 900 in FIG. 9 by the addition of the frequency coefficients of the predicted image corresponding to the significant coefficients, their signs, and the sign match/mismatch prediction values.

In the table 1010, rows 1011 to 1014 carry the identification number of the significant coefficients, the significant coefficient position information, the significant coefficient absolute value information, and the significant coefficient sign information, respectively. On the other hand, row 1015 carries the values of the frequency coefficients of the predicted image that correspond to the respective significant coefficients. In the illustrated example, since the pixel value in the upper left corner of the image 1000, which corresponds to the significant coefficient to be referenced first, is "227.25", the value in the row 1015, written in the column corresponding to the significant coefficient identification number "1", is also "227.25".

Row 1016 carries the values indicating the signs of the frequency coefficients of the predicted image that correspond to the respective significant coefficients, i.e., the prediction values of the significant coefficient sign information. In the present embodiment, the prediction values of the significant coefficient sign information each represent the value received from the sign judging unit 18. Accordingly, when the sign of the frequency coefficient is positive, the value is "0", and when the sign of the frequency coefficient is negative, the value is "1". In the illustrated example, the frequency coefficients of the pixels located as the second, fifth, and ninth positions in the order of reference have negative values, and the frequency coefficients of the pixels corresponding to the other significant coefficients have positive values. As a result, the value indicating the sign is set to "1" for the frequency coefficients of the predicted image that correspond to the significant coefficient identification numbers "2", "5", and "7", and to "0" for the frequency coefficients of the predicted image that correspond to the other identification numbers.

Row 1017 carries the sign match/mismatch prediction values. In the illustrated example, since the signs of the significant coefficients corresponding to the identification numbers "2" and "7" do not match the signs of the corresponding frequency coefficients of the predicted image, the sign match/mismatch prediction values for the identification numbers "2" and "7" are both set to "1".

In this way, the frequency of occurrence of the respective sign match/mismatch prediction values is skewed according to the respective values. In view of this, the significant coefficient sign information predictive encoding unit 1925 entropy-codes the plurality of sign match/mismatch prediction values contained in the sign match/mismatch prediction information by using an optimum entropy code that matches the degree of skewness. For example, the significant coefficient sign information predictive encoding unit 1925 entropy-codes the sign match/mismatch prediction information by using arithmetic coding such as CABAC. Alternatively, the significant coefficient sign information predictive encoding unit 1925 may employ another entropy coding method such that an entropy code is assigned to the plurality of sign match/mismatch prediction values. In this case, the significant coefficient sign information predictive encoding unit 1925 can encode the sign of each significant coefficient with less than one bit of information.

In the prior art, one bit has had to be assigned to the sign of each significant coefficient, because the probability of any given frequency coefficient of the prediction error image being positive in value is approximately equal to the probability of it being negative in value. By contrast, according to the motion video encoding apparatus 1 of the present embodiment, information indicating the sign of each significant coefficient can be encoded with a smaller amount of information than the prior art.

The significant coefficient sign information predictive encoding unit 1925 may optimize for each frequency coefficient the coding method to be employed or the code to be assigned. As illustrated in FIG. 3, generally, the ratio of the power spectrum of the predicted image to the power spectrum of the block being encoded varies with frequency. Then, as the power spectrum ratio approaches unity, the probability density distribution of the frequency coefficients of the predicted image approaches the probability density distribution of the frequency coefficients of the block being encoded. As a result, the probability of the sign of any given frequency coefficient of the prediction error image matching the sign of the corresponding frequency coefficient of the predicted image increases. Then, as the probability of the sign of any given frequency coefficient of the prediction error image matching the sign of the corresponding frequency coefficient of the predicted image increases, the skewness of the distribution of the sign match/mismatch prediction value also increases.

In view of the above, the distribution of the sign match/mismatch prediction value is obtained for each frequency coefficient based, for example, on motion video test data prepared in advance, and an entropy code suitable for each prediction value is determined in advance in accordance with the distribution. Then, for each frequency coefficient or for each set of frequency coefficients for which the power spectrum ratios are substantially equal, an entropy code that matches the distribution of the sign match/mismatch prediction value is stored in the internal memory of the significant coefficient sign information predictive encoding unit 1925. The significant coefficient sign information predictive encoding unit 1925 selects the appropriate entropy code for each frequency coefficient.

Alternatively, when the significant coefficient sign information predictive encoding unit 1925 uses adaptive arithmetic coding such as CABAC, the entropy code to be assigned to the sign match/mismatch prediction value may be determined for each frequency coefficient by examining the probability of occurrence of the sign match/mismatch prediction value for each individual frequency coefficient.

Further, the significant coefficient sign information predictive encoding unit 1925 may optimize the coding method to be employed or the code to be assigned, in accordance with the variance of the pixel values of the predicted image. When the variance of the pixel values of the predicted image is large, the predicted image contains many high-frequency components. In this case, if the image contained in the block being encoded is even slightly distorted with respect to the image contained in the predicted image, the number of pixels that do not match between the block being encoded and the predicted image increases. This reduces the probability of the sign of any given frequency coefficient of the prediction error image matching the sign of the corresponding frequency coefficient of the predicted image. As a result, the degree of skewness of the sign/mismatch prediction value decreases.

On the other hand, when the variance of the pixel values of the predicted image is small, the amount of high-frequency components contained in the predicted image is small. In this case, even if the image contained in the block being encoded is slightly distorted with respect to the image contained in the predicted image, the number of pixels that do not match between the block being encoded and the predicted image is small. This increases the probability of the sign of any given frequency coefficient in the prediction error image matching the sign of the corresponding frequency coefficient in the predicted image. As a result, the degree of skewness of the sign/mismatch prediction value increases.

In view of the above, the distribution of the sign match/mismatch prediction value is obtained for each variance of the pixel values of the predicted image based, for example, on motion video test data prepared in advance, and an entropy suitable for each prediction value is determined in advance in accordance with the distribution. Then, for each variance, the entropy code to be assigned to the sign match/mismatch prediction value is stored in the internal memory of the significant coefficient sign information predictive encoding unit 1925.

The significant coefficient sign information predictive encoding unit 1925 receives the predicted image from the selector 14, obtains the variance for the predicted image, and selects the appropriate entropy code in accordance with the variance. Alternatively, when the significant coefficient sign information predictive encoding unit 1925 uses adaptive arithmetic coding such as CABAC, the entropy code to be assigned to the sign match/mismatch prediction value may be determined for each variance by examining the probability of occurrence of the sign match/mismatch prediction value for each variance.

The significant coefficient sign information predictive encoding unit 1925 supplies the entropy-coded sign match/mismatch prediction information to the consolidating unit not depicted.

In certain embodiments, the quantization level for each corrected quantized coefficient is optimized according to the probability of its occurrence; i.e., the quantization levels are set so that the spacing between adjacent quantization levels decreases as the probability of occurrence increases. In such embodiments, the frequency coefficient adaptive encoding unit 19 may assign an entropy code that matches the probability of occurrence of the quantization level to the quantized coefficient corresponding to that quantization level.

In this case, the probability of occurrence of each quantization level is determined by the Lloyd-Max method, for example, based on the probability distribution of occurrence of the corrected frequency coefficient obtained on a motion video test sequence. The entropy code may be, for example, a Huffman code or an arithmetic code. In the case of Huffman coding, for example, entropy codes of shorter lengths are assigned to quantized coefficients corresponding to quantization levels having higher probability of occurring. In the case of arithmetic coding also, the entropy code to be assigned to the quantized coefficient corresponding to any given quantization level is optimized according to the probability of occurrence of that quantization level. As a result, the frequency coefficient adaptive encoding unit 19 can encode the quantized coefficients with higher efficiency.

The inverse transforming unit 20 receives the plurality of reconstructed frequency coefficients of each prediction error image from the frequency coefficient adaptive encoding unit 19, and applies an inverse orthogonal transform to them. For example, when the DCT is used in the frequency coefficient adaptive encoding unit 19, the inverse transforming unit 20 applies an inverse DCT. By applying the inverse orthogonal transform to the set of reconstructed frequency coefficients, a prediction error image is reconstructed that has information equivalent to that of the original prediction error image. The inverse transforming unit 20 passes the reconstructed prediction error image to the adder 21.

The adder 21 adds the value of each pixel of the predicted image received from the selector 14 to the value of the corresponding pixel in the prediction error image, thereby reconstructing the block corresponding to the predicted image and the prediction error image. The adder 21 reconstructs each block in the block being encoded and combines the reconstructed blocks in accordance with a prescribed coding order to reconstruct the macroblock being encoded. The adder 21 supplies the reconstructed macroblock as a reference block to the intra-prediction unit 12.

Further, the adder 21 combines the reconstructed macroblocks in accordance with a prescribed coding order to generate a reference picture which is used to create a predicted image for the picture to be subsequently encoded. The adder 21 stores the thus generated reference picture in the image memory 22.

The image memory 22 includes, for example, a semiconductor memory. The image memory 22 temporarily stores the reference picture received from the adder 21. Then, the image memory 22 supplies the reference picture to the intra-prediction unit 12, the motion compensating unit 13, and the prediction mode determining unit 11. The image memory 22 stores a predetermined number of reference pictures and, as the number of stored reference pictures exceeds the predetermined number, discards reference pictures in the same order as they were encoded.

The side information encoding unit 23 entropy-codes side information, such as the prediction coding mode, motion compensation vector, etc. for each macroblock being encoded, by using such coding techniques as Huffman coding or CABAC. The side information encoding unit 23 supplies the entropy-coded side information to the consolidating unit not depicted.

In the consolidating unit, the entropy-coded significant coefficient position information, significant coefficient absolute value information, and sign match/mismatch prediction information received from the frequency coefficient adaptive encoding unit 19 and the entropy-coded side information received from the side information encoding unit 23 are consolidated into a single data stream in accordance with a prescribed format. Then, the consolidating unit stores the data stream in a storage unit such as a magnetic recording medium, optical recording medium, or semiconductor memory (not depicted), or supplies the data stream to another apparatus. The prescribed format used here may be, for example, the data format defined in MPEG-2.

Figure 12:
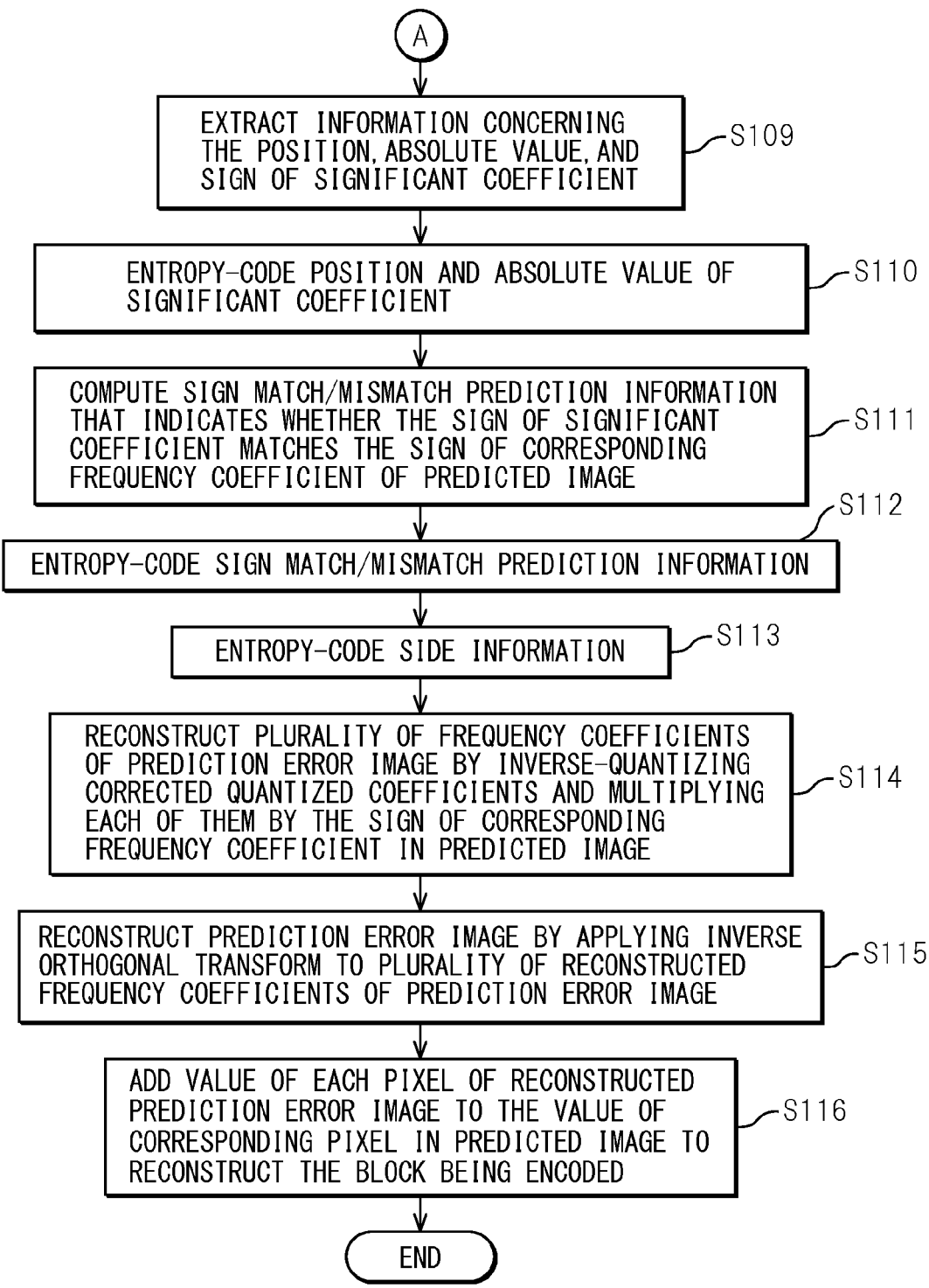
FIG. 12 is a diagram illustrating an operation flowchart of the motion video encoding process according to the first embodiment.

FIGS. 11 and 12 are diagrams illustrating an operation flowchart of the motion video encoding process according to the first embodiment. The motion video encoding apparatus 1 performs the following motion video encoding process on each macroblock to be encoded by predictive coding. When not using predictive coding to encode the macroblock, the motion video encoding apparatus 1 encodes the macroblock by using, for example, intra-prediction coding defined in MPEG-4 AVC/H.264.

The prediction mode determining unit 11 determines the prediction coding mode, based on the macroblock to be encoded and the reference picture stored in the image memory 22 (step S101).

The motion video encoding apparatus 1 creates a predicted image for each block in the macroblock in accordance with the prediction coding mode (step S102). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. Then, the intra-prediction unit 12 or the motion compensating unit 13 passes the predicted image to the selector 14. The selector 14 supplies the received predicted image to the prediction error image generating unit 15, the predicted image orthogonal-transforming unit 17, and the adder 21.

The prediction error image generating unit 15 generates a prediction error image based on the difference between the predicted image and the block contained in the macroblock being encoded (step S103). The prediction error image generating unit 15 supplies the prediction error image to the prediction error orthogonal-transforming unit 16. The prediction error orthogonal-transforming unit 16 computes the plurality of frequency coefficients of the prediction error image by orthogonal-transforming the prediction error image (step S104). The prediction error orthogonal-transforming unit 16 supplies the plurality of frequency coefficients of the prediction error image to the frequency coefficient adaptive encoding unit 19.

On the other hand, the predicted image orthogonal-transforming unit 17 computes the plurality of frequency coefficients of the predicted image by orthogonal-transforming the predicted image (step S105). The predicted image orthogonal-transforming unit 17 supplies the plurality of frequency coefficients of the predicted image to the sign judging unit 18.

The sign judging unit 18 judges the sign of each frequency coefficient of the predicted image (step S106). The sign judging unit 18 supplies the value indicating the sign of each frequency coefficient of the predicted image to the adaptive-quantizing/inverse-quantizing unit 191 and the adaptively quantized coefficient encoding unit 192, respectively, in the frequency coefficient adaptive encoding unit 19.

The multiplier 1911 in the adaptive-quantizing/inverse-quantizing unit 191 computes a corrected frequency coefficient by multiplying each frequency coefficient of the prediction error image by the sign of the corresponding frequency coefficient of the predicted image (step S107).

The multiplier 1911 supplies the corrected frequency coefficient to the nonlinear quantizing unit 1914 in the adaptive-quantizing/inverse-quantizing unit 191.

For each corrected frequency coefficient, the nonlinear quantizing unit 1914 obtains the nearest quantization level among the quantization levels that have been set so that the spacing between adjacent quantization levels for corrected frequency coefficients having negative values becomes wider than the spacing between adjacent quantization levels for corrected frequency coefficients having positive values. Then, the nonlinear quantizing unit 1914 obtains the corrected quantized coefficient corresponding to that quantization level (step S108). The corrected quantized coefficient output from the nonlinear quantizing unit 1914 is supplied to the nonlinear inverse quantizing unit 1915 in the adaptive-quantizing/inverse-quantizing unit 191. The corrected quantized coefficient output from the nonlinear quantizing unit 1914 is also supplied to the multiplier 1912 where it is multiplied by the sign of the corresponding frequency coefficient of the predicted image so that the resulting sign matches the sign of the corresponding frequency coefficient of the prediction error image, thus computing each quantized coefficient. Each quantized coefficient thus computed is then supplied to the adaptively quantized coefficient encoding unit 192.

As illustrated in FIG. 12, the significant coefficient information generating unit 1921 in the adaptively quantized coefficient encoding unit 192 extracts information concerning the position, absolute value, and sign of each significant coefficient having a nonzero absolute value among the quantized coefficients (step S109). Then, the significant coefficient information generating unit 1921 passes the position information of the significant coefficient to the significant coefficient position information encoding unit 1922 in the adaptively quantized coefficient encoding unit 192. The significant coefficient information generating unit 1921 passes the absolute value information of the significant coefficient to the significant coefficient absolute value information encoding unit 1923 in the adaptively quantized coefficient encoding unit 192. The significant coefficient information generating unit 1921 passes the sign information of the significant coefficient to the exclusive-OR unit 1924 in the adaptively quantized coefficient encoding unit 192.

The significant coefficient position information encoding unit 1922 entropy-codes the position information of the significant coefficient. The significant coefficient absolute value information encoding unit 1923 entropy-codes the absolute value information of the significant coefficient (step S110). The significant coefficient position information encoding unit 1922 and the significant coefficient absolute value information encoding unit 1923, respectively, supply the entropy-coded position information of the significant coefficient and the entropy-coded absolute value information of the significant coefficient to the consolidating unit not depicted.

On the other hand, the exclusive-OR unit 1924 performs an exclusive-OR operation between the value indicating the sign of the significant coefficient and the value indicating the sign of the corresponding frequency coefficient in the predicted image. The exclusive-OR unit 1924 then computes sign match/mismatch prediction information that indicates whether the sign of the significant coefficient matches the sign of the corresponding frequency coefficient in the predicted image (step S111). The exclusive-OR unit 1924 passes the sign match/mismatch prediction information to the significant coefficient sign information predictive encoding unit 1925.

The significant coefficient sign information predictive encoding unit 1925 entropy-codes the sign match/mismatch prediction information (step S112). The significant coefficient sign information predictive encoding unit 1925 supplies the entropy-coded sign match/mismatch prediction information to the consolidating unit. The side information encoding unit 23 encodes side information such as the motion vector, etc. (step S113). The side information encoding unit 23 supplies the encoded side information to the consolidating unit.

Further, the motion video encoding apparatus 1 generates a reference picture or reference block which is used for encoding the subsequent macroblock or picture. To that end, the nonlinear inverse quantizing unit 1915 in the frequency coefficient adaptive encoding unit 19 inverse-quantizes each corrected quantized coefficient to reconstruct the corresponding corrected frequency coefficient. Then, the reconstructed corrected frequency coefficients are each multiplied in the multiplier 1913 by the sign of the corresponding frequency coefficient in the predicted image, thus reconstructing the plurality of frequency coefficients of the prediction error image (step S114). The plurality of reconstructed frequency coefficients of the prediction error image are then supplied to the inverse transforming unit 20.

The inverse transforming unit 20 reconstructs the prediction error image by applying an inverse orthogonal transform to the plurality of reconstructed frequency coefficients of the prediction error image (step S115). The inverse transforming unit 20 passes the reconstructed prediction error image to the adder 21. The adder 21 adds the value of each pixel of the reconstructed prediction error image to the value of the corresponding pixel in the predicted image, thereby reconstructing the block corresponding to the predicted image and the prediction error image within the macroblock being encoded (step S116). The adder 21 combines the reconstructed blocks in accordance with a prescribed order to reconstruct the macroblock being encoded. Further, the adder 21 combines the reconstructed macroblocks in sequence in accordance with a prescribed coding order to create the reference picture. The adder 21 stores the reference picture in the image memory 22. The process of steps S102 to S116 is performed on each block in the macroblock being encoded.

After that, the motion video encoding apparatus 1 terminates the motion video encoding process. The motion video encoding apparatus 1 may interchange the order of steps S104 and S105. The motion video encoding apparatus 1 may also interchange the order of the process of step S110 and the process of steps S111 and S112. Furthermore, the motion video encoding apparatus 1 may interchange the order of the process of steps S114 to S116 and the process of steps S109 to S113.

Further, instead of the process of steps S109 to S112, the motion video encoding apparatus 1 may perform processing for entropy-coding each quantized coefficient by assigning to the quantized coefficient an entropy code that matches the probability of occurrence of the quantization level corresponding to that quantized coefficient.

As has been described above, the motion video encoding apparatus according to the first embodiment computes the corrected frequency coefficients whose amount of information is smaller than the amount of information of the frequency coefficients of each prediction error image in the macroblock being encoded, and quantizes the corrected frequency coefficients thus computed. Further, the motion video encoding apparatus can appropriately set the quantization level for each corrected frequency coefficient according to the probability of occurrence of that quantization level. As a result, the motion video encoding apparatus can reduce the amount of information needed to encode the frequency coefficients of each prediction error image, and can thus enhance the efficiency for encoding the frequency coefficients of each prediction error image. Furthermore, since the motion video encoding apparatus can entropy-code each quantized coefficient according to the probability of occurrence of the quantization level corresponding to that quantized coefficient or can entropy-code the significant coefficient sign match/mismatch prediction information, the motion video encoding apparatus can further enhance the coding efficiency.

Next, a motion video decoding apparatus according to a second embodiment will be described. The motion video decoding apparatus of the second embodiment decodes the motion video data encoded by the motion video encoding apparatus of the first embodiment.

Figure 13:
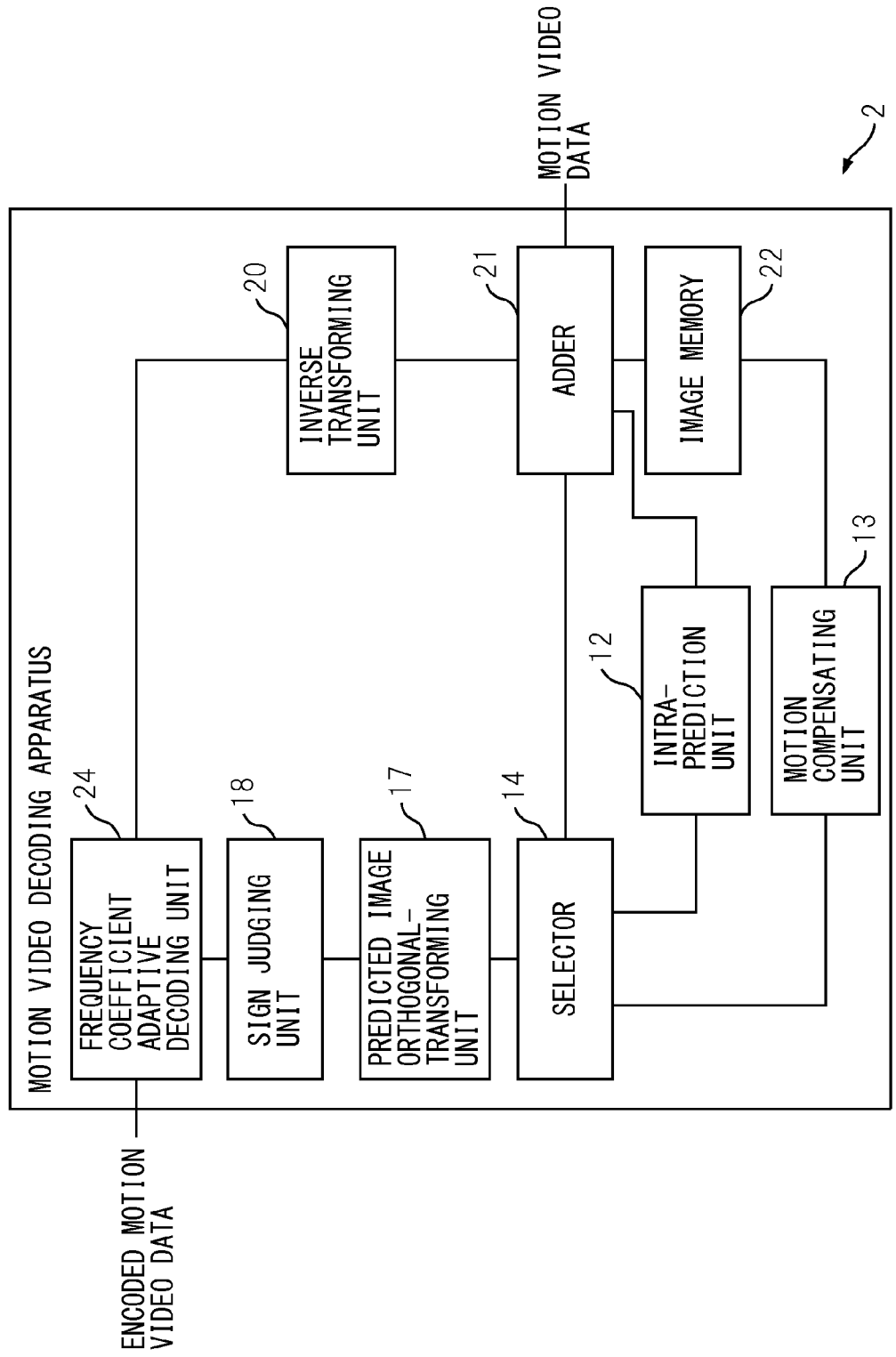
FIG. 13 is a diagram schematically illustrating the configuration of a motion video decoding apparatus according to a second embodiment which decodes the motion video data encoded by the motion video encoding apparatus according to the first embodiment.

FIG. 13 is a diagram schematically illustrating the configuration of the motion video decoding apparatus according to the second embodiment. As illustrated in FIG. 13, the motion video decoding apparatus 2 includes a frequency coefficient adaptive decoding unit 24, an intra-prediction unit 12, a motion compensating unit 13, a selector 14, a predicted image orthogonal-transforming unit 17, a sign judging unit 18, an inverse transforming unit 20, an adder 21, and an image memory 22.

These units constituting the motion video decoding apparatus 2 are each implemented as a separate circuit. Alternatively, these units constituting the motion video decoding apparatus 2 may be implemented in the form of a single integrated circuit on which the circuits corresponding to the respective units are integrated. Further, these units constituting the motion video decoding apparatus 2 may be functional modules implemented by executing a computer program on a processor incorporated in the motion video decoding apparatus 2.

In FIG. 13, parts of the motion video decoding apparatus 2 that are identical to the corresponding parts of the motion video encoding apparatus 1 depicted in FIG. 1 are designated by the same reference numerals. The intra-prediction unit 12, motion compensating unit 13, selector 14, predicted image orthogonal-transforming unit 17, sign judging unit 18, inverse transforming unit 20, adder 21, and image memory 22 in the motion video decoding apparatus 2 are identical in configuration and function to the corresponding constituent parts of the motion video encoding apparatus 1. Therefore, for the details of the intra-prediction unit 12, motion compensating unit 13, selector 14, predicted image orthogonal-transforming unit 17, sign judging unit 18, inverse transforming unit 20, adder 21, and image memory 22, refer to the description given of the corresponding parts of the motion video encoding apparatus 1.

The motion video decoding apparatus 2 receives the data stream containing the encoded motion video data, for example, via a communication network and an interface circuit (not depicted) provided for connecting the motion video decoding apparatus 2 to the communication network. Then, the motion video decoding apparatus 2 extracts the encoded motion video data from the data stream and stores the extracted data in a buffer not depicted. The motion video decoding apparatus 2 reads out the encoded motion video data from the buffer memory in prescribed units, for example, in units of macroblocks or in units of pictures, and supplies the readout data to the frequency coefficient adaptive decoding unit 24.

The frequency coefficient adaptive decoding unit 24 decodes the entropy-coded side information such as the motion vector, etc. When the macroblock is an inter-prediction coded macroblock, the frequency coefficient adaptive decoding unit 24 passes motion parameters associated with that macroblock to the motion compensating unit 13. When the macroblock is an intra-prediction coded macroblock, the frequency coefficient adaptive decoding unit 24 passes information indicating the intra-prediction coding mode of that macroblock to the intra-prediction unit 12. Further, the frequency coefficient adaptive decoding unit 24 notifies the selector 14 of the prediction coding mode associated with the macroblock being decoded. Then, when the macroblock being decoded is an intra-prediction coded macroblock, the intra-prediction unit 12 creates a predicted image from the already decoded reference block. On the other hand, when the macroblock being decoded is an inter-prediction coded macroblock, the motion compensating unit 13 creates a predicted image based on the already decoded reference block. The predicted image created by the intra-prediction unit 12 or the motion compensating unit 13 is supplied to the selector 14 which then passes the predicted image to the predicted image orthogonal-transforming unit 17 and the adder 21.

The frequency coefficient adaptive decoding unit 24 is one example of an adaptive decoding unit, and decodes the encoded motion video data to reconstruct the plurality of frequency coefficients of the prediction error image generated for each block contained in the macroblock being decoded.

Figure 14:
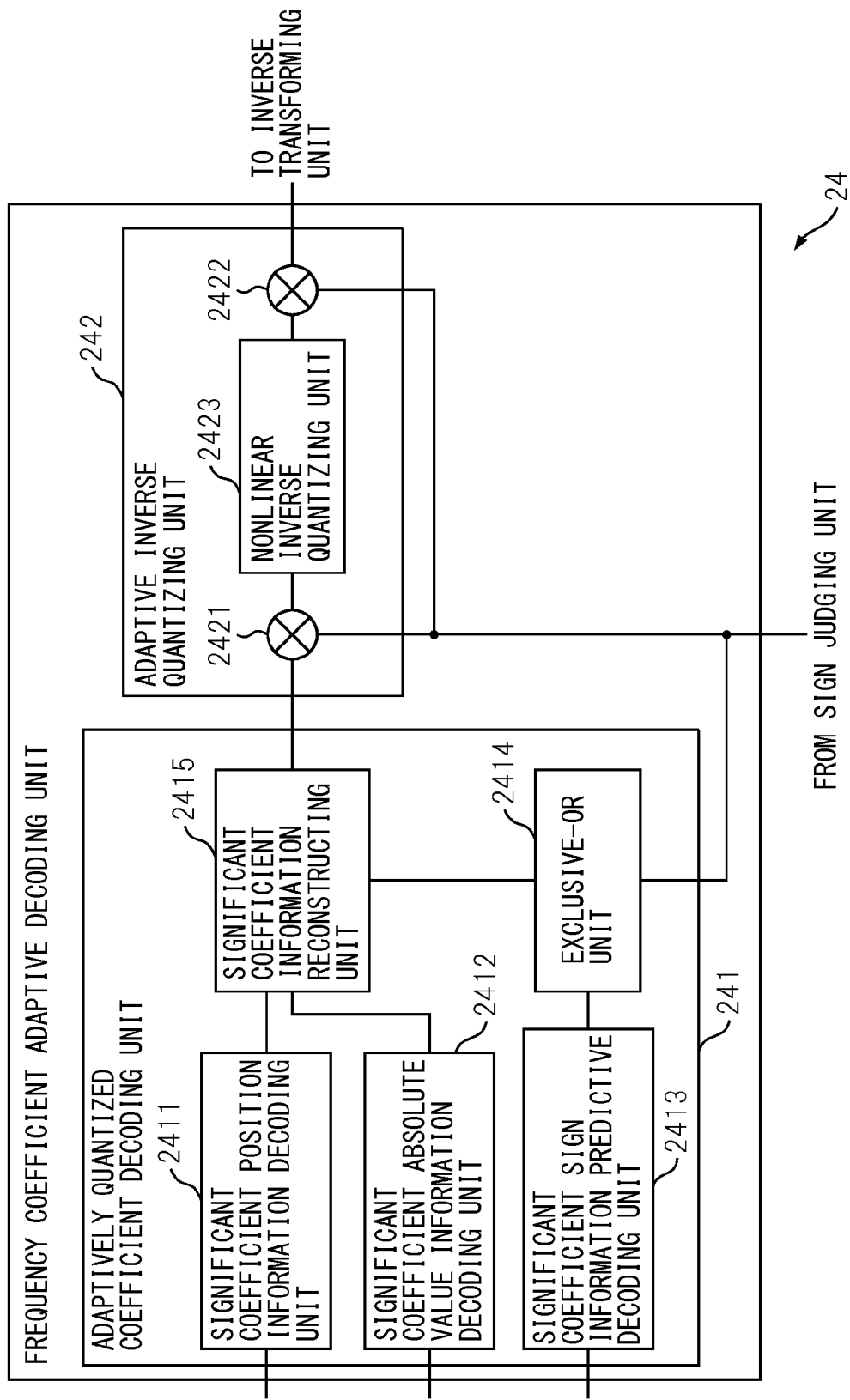
FIG. 14 is a diagram schematically illustrating the configuration of a frequency coefficient adaptive decoding unit according to the second embodiment.

FIG. 14 is a diagram schematically illustrating the configuration of the frequency coefficient adaptive decoding unit 24 which reconstructs the plurality of frequency coefficients of the prediction error image. The frequency coefficient adaptive decoding unit 24 includes an adaptively quantized coefficient decoding unit 241 and an adaptive inverse quantizing unit 242.

The adaptively quantized coefficient decoding unit 241 reconstructs the quantized coefficients by decoding the entropy-coded significant coefficient position information, significant coefficient absolute value information, and sign match/mismatch prediction information. For this purpose, the adaptively quantized coefficient decoding unit 241 includes a significant coefficient position information decoding unit 2411, a significant coefficient absolute value information decoding unit 2412, a significant coefficient sign information predictive decoding unit 2413, an exclusive-OR unit 2414, and a significant coefficient information reconstructing unit 2415.

The significant coefficient position information decoding unit 2411 decodes the entropy-coded significant coefficient position information in accordance with the entropy coding method used by the significant coefficient position information encoding unit 1922 provided in the motion video encoding apparatus 1. The significant coefficient position information decoding unit 2411 passes the decoded significant coefficient position information to the significant coefficient information reconstructing unit 2415.

The significant coefficient absolute value information decoding unit 2412 decodes the entropy-coded significant coefficient absolute value information in accordance with the entropy coding method used by the significant coefficient absolute value information encoding unit 1923 provided in the motion video encoding apparatus 1. The significant coefficient absolute value information decoding unit 2412 passes the decoded significant coefficient absolute value information to the significant coefficient information reconstructing unit 2415.

The significant coefficient sign information predictive decoding unit 2413 decodes the entropy-coded sign match/mismatch prediction information in accordance with the entropy coding method used by the significant coefficient sign information predictive encoding unit 1925 provided in the motion video encoding apparatus 1. The significant coefficient sign information predictive decoding unit 2413 passes the decoded sign match/mismatch prediction information to the exclusive-OR unit 2414.

For each significant coefficient, the exclusive-OR unit 2414 receives from the sign judging unit 18 the value indicating the sign of the corresponding frequency coefficient in the predicted image that represents the same frequency component as the significant coefficient. The value indicating the sign is, for example, the same as the value that the exclusive-OR unit 1924 in the motion video encoding apparatus 1 according to the first embodiment receives.

The exclusive-OR unit 2414 performs an exclusive-OR operation between the sign match/mismatch prediction value of each significant coefficient, contained in the sign match/mismatch prediction information received from the significant coefficient sign information predictive decoding unit 2413, and the value indicating the sign of the corresponding frequency coefficient of the predicted image. The sign match/mismatch prediction value is the exclusive-OR of the value that the sign information of the significant coefficient indicates and the corresponding frequency coefficient of the predicted image. Therefore, the sign information of each significant coefficient is decoded by exclusive-ORing the sign match/mismatch prediction value with the corresponding frequency coefficient of the predicted image. The exclusive-OR unit 2414 passes the sign information of each significant coefficient to the significant coefficient information reconstructing unit 2415.

The significant coefficient information reconstructing unit 2415 reconstructs each significant coefficient by combining the absolute value information and sign information of the significant coefficient. Then, the significant coefficient information reconstructing unit 2415 reconstructs the plurality of quantized coefficients of the prediction error image by arranging the significant coefficients in accordance with the position information of the respective significant coefficients and inserting values "0" at positions other than the significant coefficients. The significant coefficient information reconstructing unit 2415 passes the plurality of reconstructed quantized coefficients of the prediction error image to the adaptive inverse quantizing unit 242.

When the quantized coefficients are entropy-coded by assigning each quantized coefficient an entropy code that matches the probability of occurrence of the corresponding quantization level, the adaptively quantized coefficient decoding unit 241 decodes each quantized coefficient in accordance with the entropy coding method used to encode the quantized coefficient. The adaptively quantized coefficient decoding unit 241 passes the reconstructed quantized coefficients to the adaptive inverse quantizing unit 242.

The adaptive inverse quantizing unit 242 reconstructs the plurality of frequency coefficients of the prediction error image, based on the plurality of quantized coefficients of the prediction error image. For this purpose, the adaptive inverse quantizing unit 242 includes multipliers 2421 and 2422 and a nonlinear inverse quantizing unit 2423.

The multiplier 2421 reconstructs each corrected quantized coefficient by multiplying each quantized coefficient of the prediction error image by the sign of the corresponding frequency coefficient in the predicted image that represents the same frequency component as the quantized coefficient. The multiplier 2421 passes the corrected quantized coefficient to the nonlinear inverse quantizing unit 2423.

The nonlinear inverse quantizing unit 2423 reconstructs the corrected frequency coefficient by inverse-quantizing the corrected quantized coefficient in a manner similar to the nonlinear inverse quantizing unit 1915 in the motion video encoding apparatus 1. In the present embodiment, the nonlinear inverse quantizing unit 2423 inverse-quantizes each corrected quantized coefficient by using a quantization scale whose value differs depending on the sign of the corrected quantized coefficient, as in the case of the nonlinear inverse quantizing unit 1915 in the motion video encoding apparatus 1. For example, the nonlinear inverse quantizing unit 2423 inverse-quantizes each corrected quantized coefficient in accordance with the previously given equation (8).

When the spacing between adjacent quantization levels is set so as to vary according to the absolute value of the corrected frequency coefficient, the nonlinear inverse quantizing unit 2423 prestores, for example, in its internal memory, a mapping table that provides a mapping between the corrected quantized coefficient and the quantization level. Then, by referring to the mapping table, the nonlinear inverse quantizing unit 2423 obtains the quantization level corresponding to the corrected quantized coefficient as representing the reconstructed corrected frequency coefficient. The nonlinear inverse quantizing unit 2423 supplies each reconstructed corrected frequency coefficient to the multiplier 2422.

The multiplier 2422 reconstructs the plurality of frequency coefficients of the prediction error image by multiplying a respective one of the reconstructed corrected frequency coefficients by the sign of the corresponding frequency coefficient of the predicted image. This means that each reconstructed quantized coefficient has been multiplied twice by the sign of the corresponding frequency coefficient of the predicted image. Accordingly, the sign of each reconstructed frequency coefficient output from the multiplier 2422 matches the sign of the corresponding frequency coefficient of the prediction error image. Each reconstructed frequency coefficient output from the multiplier 2422 is supplied to the inverse transforming unit 20.

The inverse transforming unit 20 reconstructs the prediction error image by applying an inverse orthogonal transform to the reconstructed frequency coefficients, as in the case of the motion video encoding apparatus 1. Then, the adder 21 adds the value of each pixel of the predicted image to the value of the corresponding pixel in the prediction error image, thereby reconstructing the block being decoded.

The motion video decoding apparatus 2 reconstructs each picture by combining the reconstructed macroblocks in the order in which they were encoded. Then, the motion video decoding apparatus 2 reconstructs the motion video data by arranging the pictures in time order. The motion video decoding apparatus 2 outputs the reconstructed motion video data. The motion video data output is, for example, stored in a storage apparatus not depicted. Further, the motion video data thus output is displayed on a display apparatus (not depicted) connected to the motion video decoding apparatus 2.

Figure 15:
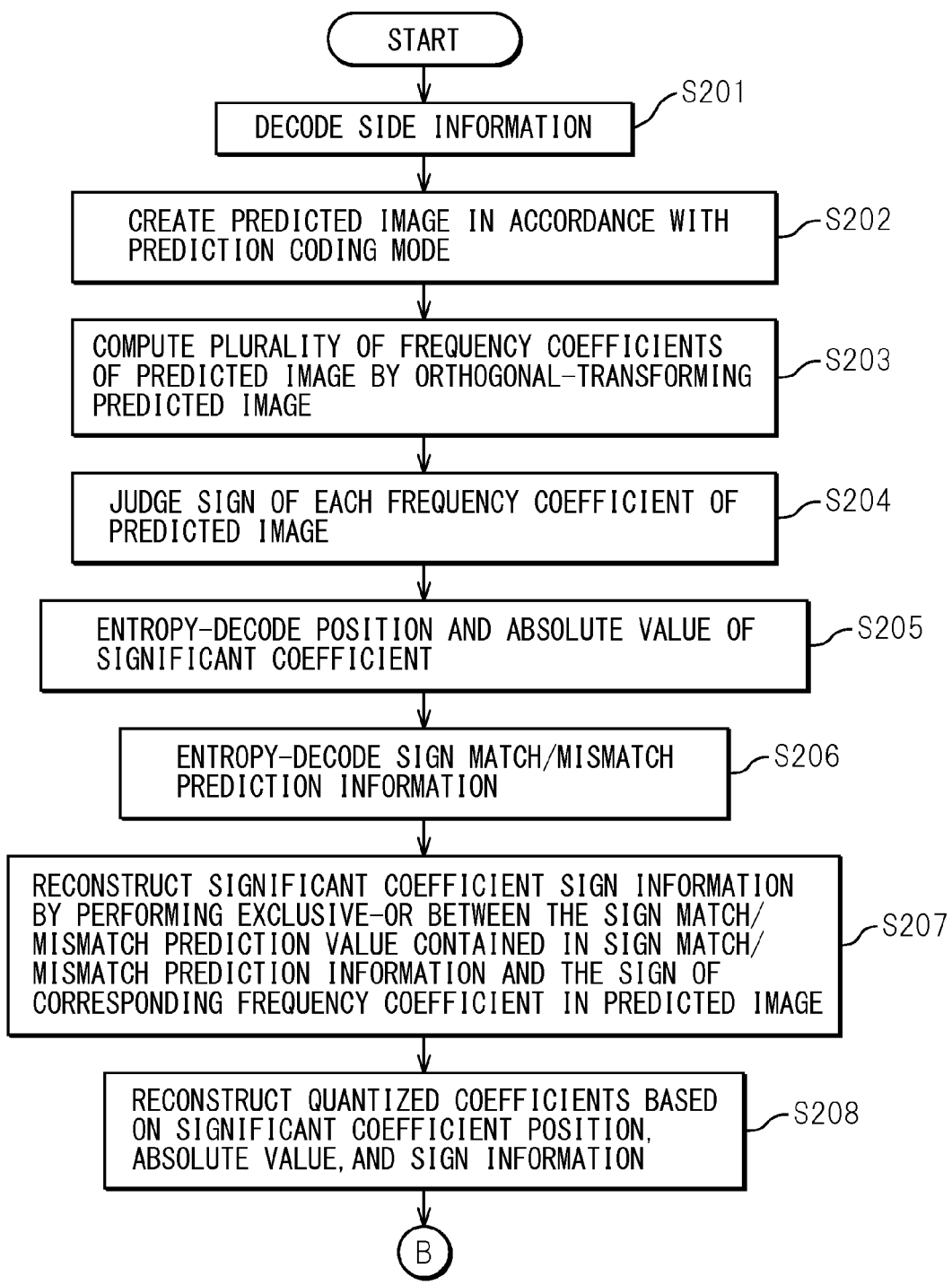
FIG. 15 is a diagram illustrating an operation flowchart of a motion video decoding process according to the second embodiment.
Figure 16:
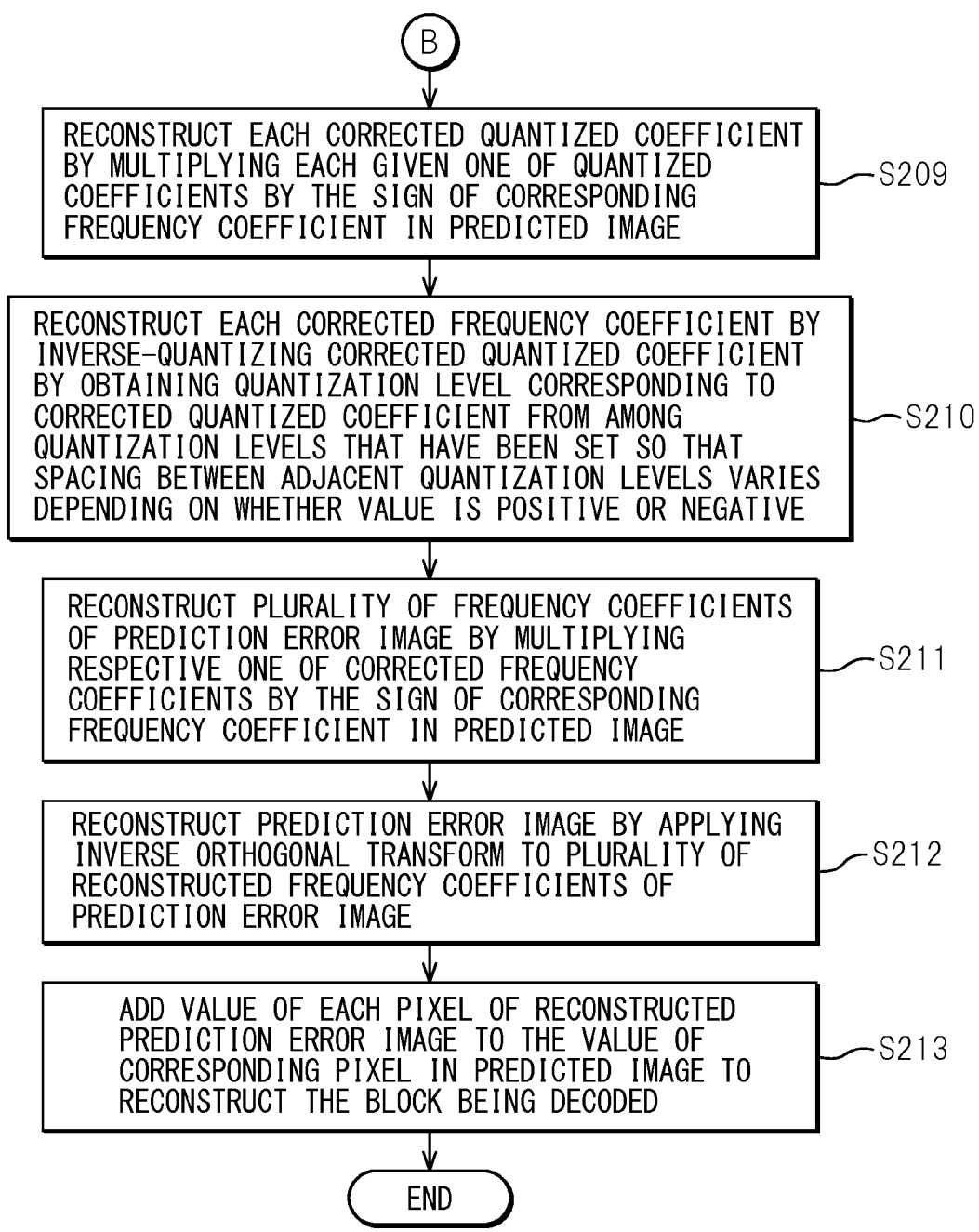
FIG. 16 is a diagram illustrating an operation flowchart of the motion video decoding process according to the second embodiment.

FIGS. 15 and 16 are diagrams illustrating an operation flowchart of the motion video decoding process according to the second embodiment. The motion video decoding apparatus 2 performs the following motion video decoding process on each macroblock to be decoded.

The frequency coefficient adaptive decoding unit 24 decodes the entropy-coded side information such as the motion vector, etc. (step S201). Then, the frequency coefficient adaptive decoding unit 24 passes information such as the prediction coding mode, motion vector, etc., contained in the side information, to the intra-prediction unit 12, the motion compensating unit 13, and the selector 14, respectively. The motion video decoding apparatus 2 creates a predicted image in accordance with the prediction coding mode for each block contained in the macroblock being decoded (step S202). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. The intra-prediction unit 12 or the motion compensating unit 13 supplies the predicted image to the selector 14. The selector 14 passes the received predicted image to the predicted image orthogonal-transforming unit 17 and the adder 21.

The predicted image orthogonal-transforming unit 17 computes the plurality of frequency coefficients of the predicted image by orthogonal-transforming the predicted image (step S203). The predicted image orthogonal-transforming unit 17 supplies the plurality of frequency coefficients of the predicted image to the sign judging unit 18.

The sign judging unit 18 judges the sign of each frequency coefficient of the predicted image (step S204). The sign judging unit 18 supplies the value indicating the sign of each frequency coefficient of the predicted image to the adaptively quantized coefficient decoding unit 241 and the adaptive inverse quantizing unit 242, respectively, in the frequency coefficient adaptive decoding unit 24.

The significant coefficient position information decoding unit 2411 in the adaptively quantized coefficient decoding unit 241 entropy-decodes the position information of each significant coefficient. On the other hand, the significant coefficient absolute value information decoding unit 2412 entropy-decodes the absolute value of each significant coefficient (step S205). The significant coefficient position information decoding unit 2411 and the significant coefficient absolute value information decoding unit 2412 pass the decoded significant coefficient position information and the decoded significant coefficient absolute value information, respectively, to the significant coefficient information reconstructing unit 2415 in the adaptively quantized coefficient decoding unit 241.

The significant coefficient sign information predictive decoding unit 2413 in the adaptively quantized coefficient decoding unit 241 entropy-decodes the sign match/mismatch prediction information (step S206). The significant coefficient sign information predictive decoding unit 2413 passes the decoded sign match/mismatch prediction information to the exclusive-OR unit 2414 in the adaptively quantized coefficient decoding unit 241. The exclusive-OR unit 2414 reconstructs the significant coefficient sign information by performing an exclusive-OR between the sign match/mismatch prediction value contained in the sign match/mismatch prediction information and the value indicating the sign of the corresponding frequency coefficient in the predicted image (step S207). The exclusive-OR unit 2414 passes the significant coefficient sign information to the significant coefficient information reconstructing unit 2415.

Based on the position information, absolute value information, and sign information of the significant coefficients, the significant coefficient information reconstructing unit 2415 reconstructs the plurality of quantized coefficients of the prediction error image (step S208). The significant coefficient information reconstructing unit 2415 passes the plurality of reconstructed quantized coefficients of the prediction error image to the adaptive inverse quantizing unit 242.

As illustrated in FIG. 16, the multiplier 2421 in the adaptive inverse quantizing unit 242 reconstructs each corrected quantized coefficient by multiplying each given one of the quantized coefficients of the prediction error image by the sign of the corresponding frequency coefficient in the predicted image (step S209). The multiplier 2421 passes the corrected quantized coefficient to the nonlinear inverse quantizing unit 2423 in the adaptive inverse quantizing unit 242.

The nonlinear inverse quantizing unit 2423 inverse-quantizes each corrected quantized coefficient by obtaining the quantization level corresponding to the corrected quantized coefficient from among the quantization levels that have been set so that the spacing between adjacent quantization levels varies depending on whether the value is positive or negative. The nonlinear inverse quantizing unit 2423 thus reconstructs each corrected frequency coefficient (step S210). The nonlinear inverse quantizing unit 2423 supplies each reconstructed corrected frequency coefficient to the multiplier 2422 in the adaptive inverse quantizing unit 242.

The multiplier 2422 reconstructs the plurality of frequency coefficients of the prediction error image by multiplying a respective one of the reconstructed corrected frequency coefficients by the sign of the corresponding frequency coefficient in the predicted image (step S211). Each reconstructed frequency coefficient output from the multiplier 2422 is supplied to the inverse transforming unit 20.

The inverse transforming unit 20 reconstructs the prediction error image by applying an inverse orthogonal transform to the plurality of reconstructed frequency coefficients of the prediction error image (step S212). The inverse transforming unit 20 passes the reconstructed prediction error image to the adder 21. The adder 21 adds the value of each pixel of the reconstructed prediction error image to the value of the corresponding pixel in the predicted image, thereby reconstructing the block being decoded (step S213). The adder 21 combines the thus reconstructed blocks in accordance with a prescribed order to reconstruct the macroblock being decoded. Further, the adder 21 combines the reconstructed macroblocks in sequence in accordance with a prescribed coding order to reconstruct each picture. The adder 21 outputs the reconstructed picture, while storing the reconstructed picture as the reference picture in the image memory 22. The process of steps S202 to S213 is performed on each block in the macroblock being decoded.

After that, the motion video decoding apparatus 2 terminates the motion video decoding process. The motion video decoding apparatus 2 may interchange the order of the process of step S205 and the process of steps S206 and S207.

As earlier described for the motion video encoding apparatus 1, the quantized coefficients may be entropy-coded by assigning each quantized coefficient an entropy code that matches the probability of occurrence of the quantization level of the corrected quantized coefficient. In this case, instead of performing the process of steps S204 to S208, the motion video decoding apparatus 2 may decode each quantized coefficient in accordance with the entropy coding method used to encode the quantized coefficient.

As has been described above, the motion video decoding apparatus according to the second embodiment can decode the motion video data encoded by the motion video encoding apparatus according to the first embodiment.

Next, a motion video encoding apparatus according to a third embodiment will be described. The motion video encoding apparatus according to the third embodiment entropy-codes the sign match/mismatch prediction information that indicates whether the sign of each given one of the significant coefficients, indicated by the significant coefficient sign information, matches the sign of the corresponding frequency coefficient in the predicted image, as in the first embodiment. However, the picture encoding apparatus here quantizes each frequency coefficient of the prediction error image in the same manner as in the prior art.

Figure 17:
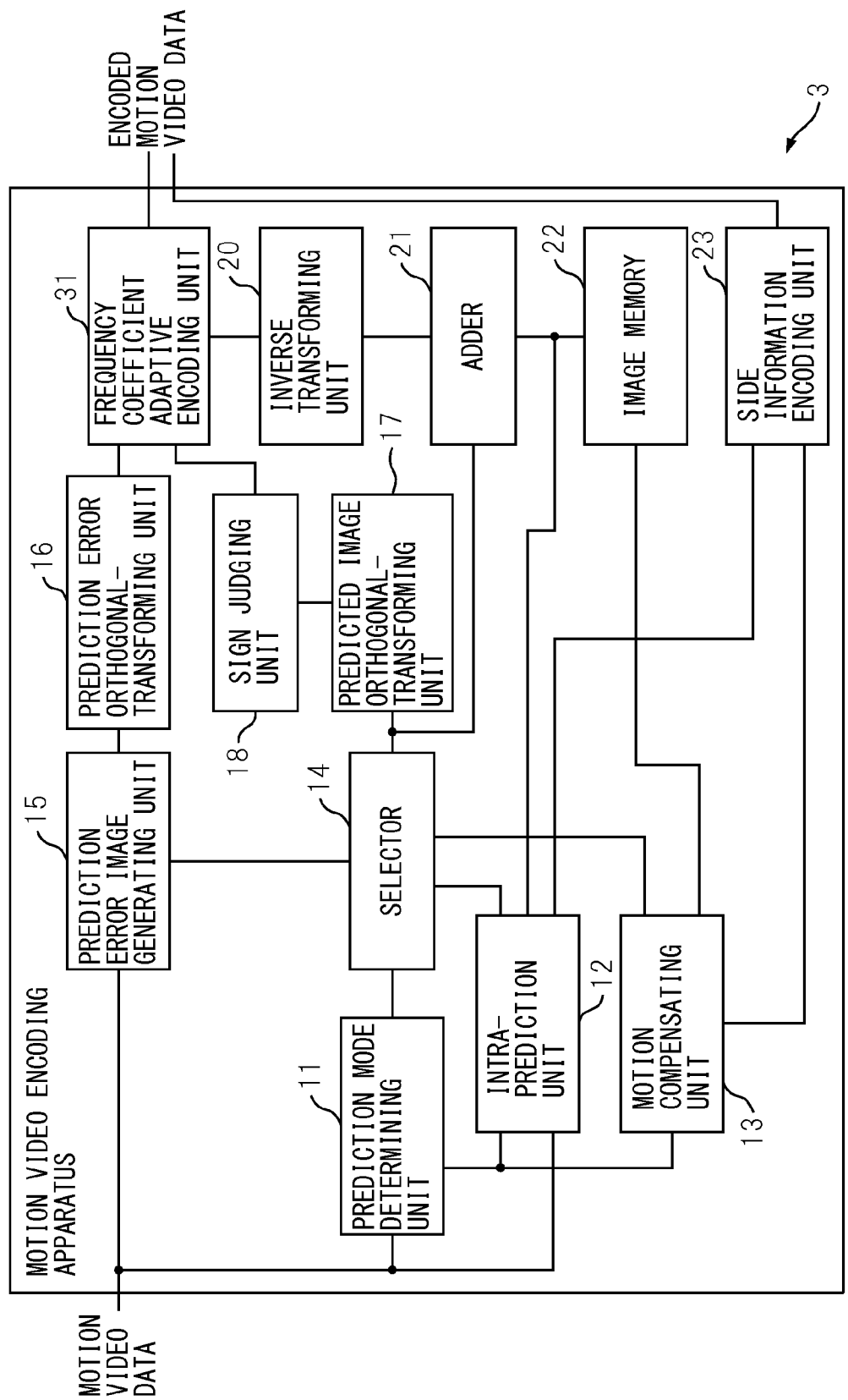
FIG. 17 is a diagram schematically illustrating the configuration of a motion video encoding apparatus according to a third embodiment.

FIG. 17 is a diagram schematically illustrating the configuration of the motion video encoding apparatus according to the third embodiment. The motion video encoding apparatus 3 includes a prediction mode determining unit 11, an intra-prediction unit 12, a motion compensating unit 13, a selector 14, a prediction error image generating unit 15, a prediction error orthogonal-transforming unit 16, a predicted image orthogonal-transforming unit 17, a sign judging unit 18, a frequency coefficient adaptive encoding unit 31, an inverse transforming unit 20, an adder 21, an image memory 22, and a side information encoding unit 23. These units constituting the motion video encoding apparatus 3 are each implemented as a separate circuit. Alternatively, these units constituting the motion video encoding apparatus 3 may be implemented in the form of a single integrated circuit on which the circuits corresponding to the respective units are integrated. Further, these units constituting the motion video encoding apparatus 3 may be functional modules implemented by executing a computer program on a processor incorporated in the motion video encoding apparatus 3.

In FIG. 17, parts of the motion video encoding apparatus 3 that are identical to the corresponding parts of the motion video encoding apparatus 1 depicted in FIG. 1 are designated by the same reference numerals. The motion video encoding apparatus 3 of the third embodiment differs from the motion video encoding apparatus 1 of the first embodiment only in the configuration of the frequency coefficient adaptive encoding unit 31. Therefore, the following description deals only with the frequency coefficient adaptive encoding unit 31. For details on the other parts of the motion video encoding apparatus 3, refer to the description given of the corresponding parts of the motion video encoding apparatus 1.

Figure 18:
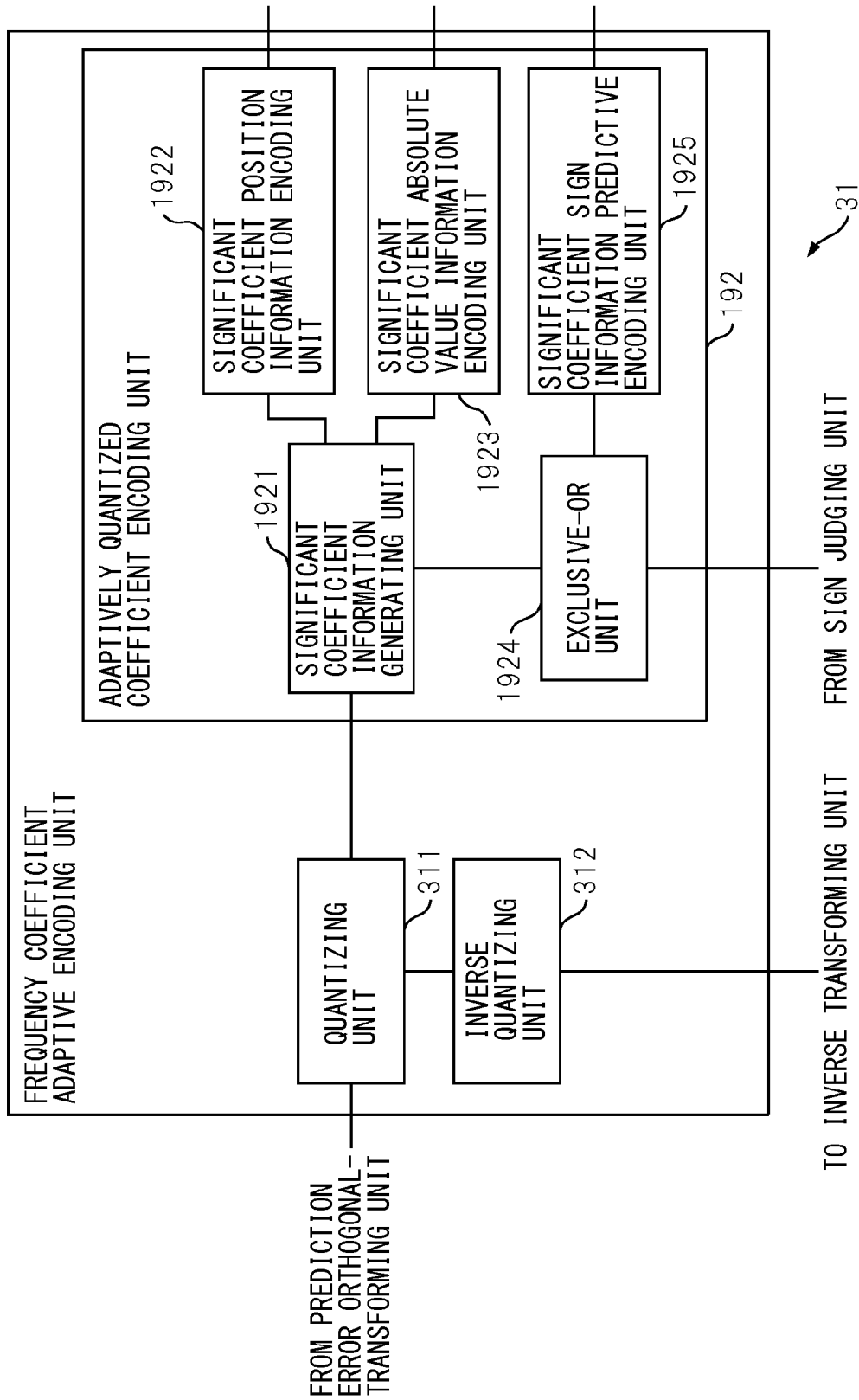
FIG. 18 is a diagram schematically illustrating the configuration of a frequency coefficient adaptive encoding unit according to the third embodiment.

FIG. 18 is a diagram schematically illustrating the configuration of the frequency coefficient adaptive encoding unit 31 according to the third embodiment. The frequency coefficient adaptive encoding unit 31 is one example of an adaptive encoding unit, and includes a quantizing unit 311, an inverse quantizing unit 312, and an adaptively quantized coefficient encoding unit 192.

The quantizing unit 311 quantizes the plurality of frequency coefficients of the prediction error image generated for each block contained in the macroblock being encoded. In this case, the probability of occurrence of any given frequency coefficient being positive in value is approximately equal to the probability of occurrence of it being negative in value, as earlier described. Therefore, the quantizing unit 311 quantizes each frequency coefficient by using a quantization level that has been determined irrespective of the sign of the frequency coefficient. The quantization levels are determined, for example, by using the method disclosed by M. D. Paez, T. H. Glisson, in the article "Minimum Mean-Squared-Error Quantization in Speech PCM and DPCM systems," IEEE TRANSACTIONS ON COMMUNICATIONS, pp. 225-230, April 1972. Then, the quantizing unit 311 obtains the quantization level nearest to the frequency coefficient, and obtains the quantized coefficient by quantizing the frequency coefficient to that quantization level.

Alternatively, using a function that expresses a quantization scale for a given quantization parameter value, the quantizing unit 311 determines the quantization scale to be used. The function may be a monotonically increasing function for the quantization parameter value, and is set in advance.

Alternatively, a plurality of quantization matrices that define quantization scales for horizontal and vertical spatial frequency components, respectively, are prepared in advance and stored in an internal memory of the quantizing unit 311. The quantizing unit 311 then selects one of the quantization matrices in accordance with the quantization parameter. Then, the quantizing unit 311 may determine the quantization scale for each frequency component of the frequency signal by referring to the selected quantization matrix.

The quantizing unit 311 may determine the quantization parameter by using one of the various quantization parameter determining methods defined in motion video coding standards such as MPEG-2, MPEG-4, MPEG-4 AVC/H.264, etc. The quantizing unit 311 may use a quantization parameter computing method defined, for example, for the MPEG-2 Standard Test Model 5. For the quantization parameter computing method defined for the MPEG-2 Standard Test Model 5, refer, for example, to the URL http://www.mpeg.org/MPEG/MSSG/tm5/Ch10/Ch10.html.

The quantizing unit 311 passes each quantized coefficient to the inverse quantizing unit 312 and the adaptively quantized coefficient encoding unit 192.

The inverse quantizing unit 312 inverse-quantizes each quantized coefficient by multiplying it with the quantization scale determined by the quantizing unit 311 for that quantized coefficient. By performing the inverse quantization, the plurality of frequency coefficients of the prediction error image are reconstructed. In the present embodiment, the same quantization scale value is used for any quantized coefficient, whether it be a quantized coefficient having a positive value or a negative value. Alternatively, the inverse quantizing unit 312 may refer to a mapping table that provides a mapping between the quantization level and the quantized coefficient, and may obtain the quantization level corresponding to the quantized coefficient as representing the reconstructed frequency coefficient. The inverse quantizing unit 312 supplies the plurality of reconstructed frequency coefficients of the prediction error image to the inverse transforming unit 20. The reconstructed frequency coefficients of the prediction error image are used for the creation of a reference picture or a reference block, as in the motion video encoding apparatus 1 of the first embodiment.

The adaptively quantized coefficient encoding unit 192 is identical in configuration and function to the adaptively quantized coefficient encoding unit 192 provided in the motion video encoding apparatus 1 of the first embodiment. That is, the adaptively quantized coefficient encoding unit 192 includes a significant coefficient information generating unit 1921, a significant coefficient position information encoding unit 1922, a significant coefficient absolute value information encoding unit 1923, an exclusive-OR unit 1924, and a significant coefficient sign information predictive encoding unit 1925.

The adaptively quantized coefficient encoding unit 192 detects significant coefficients from among the quantized coefficients of each prediction error image in the macroblock being encoded, and entropy-codes the position information and absolute value information of each significant coefficient. The adaptively quantized coefficient encoding unit 192 receives from the sign judging unit 18 the value indicating the sign of the frequency coefficient of the predicted image corresponding to the significant coefficient. Then, by performing an exclusive-OR operation between the value indicating the sign of the significant coefficient and the value indicating the sign of the frequency coefficient of the predicted image corresponding to the significant coefficient, the adaptively quantized coefficient encoding unit 192 obtains sign match/mismatch prediction information that indicates whether the sign of the significant coefficient matches the sign of the corresponding frequency coefficient in the predicted image. The sign match/mismatch prediction information is one example of the sign match/mismatch information. Then, the adaptively quantized coefficient encoding unit 192 entropy-codes the sign match/mismatch prediction information. The adaptively quantized coefficient encoding unit 192 supplies the entropy-coded position information and absolute value information of the significant coefficient and the entropy-coded sign match/mismatch prediction information to a consolidating unit not depicted. The consolidating unit consolidates these pieces of entropy-coded information and the entropy-coded side information into a single data stream in accordance with a prescribed format.

Figure 19:
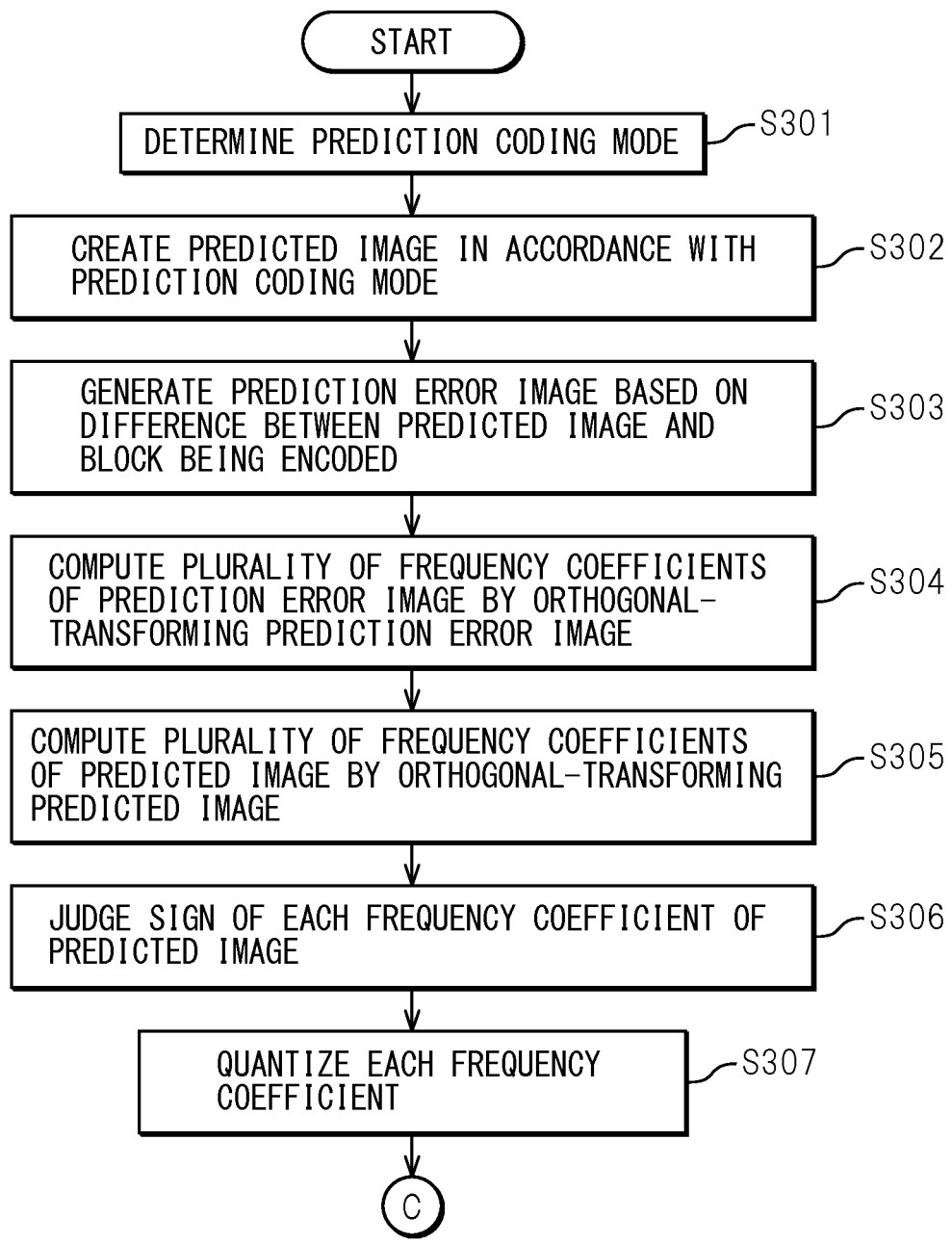
FIG. 19 is a diagram illustrating an operation flowchart of a motion video encoding process according to the third embodiment.
Figure 20:
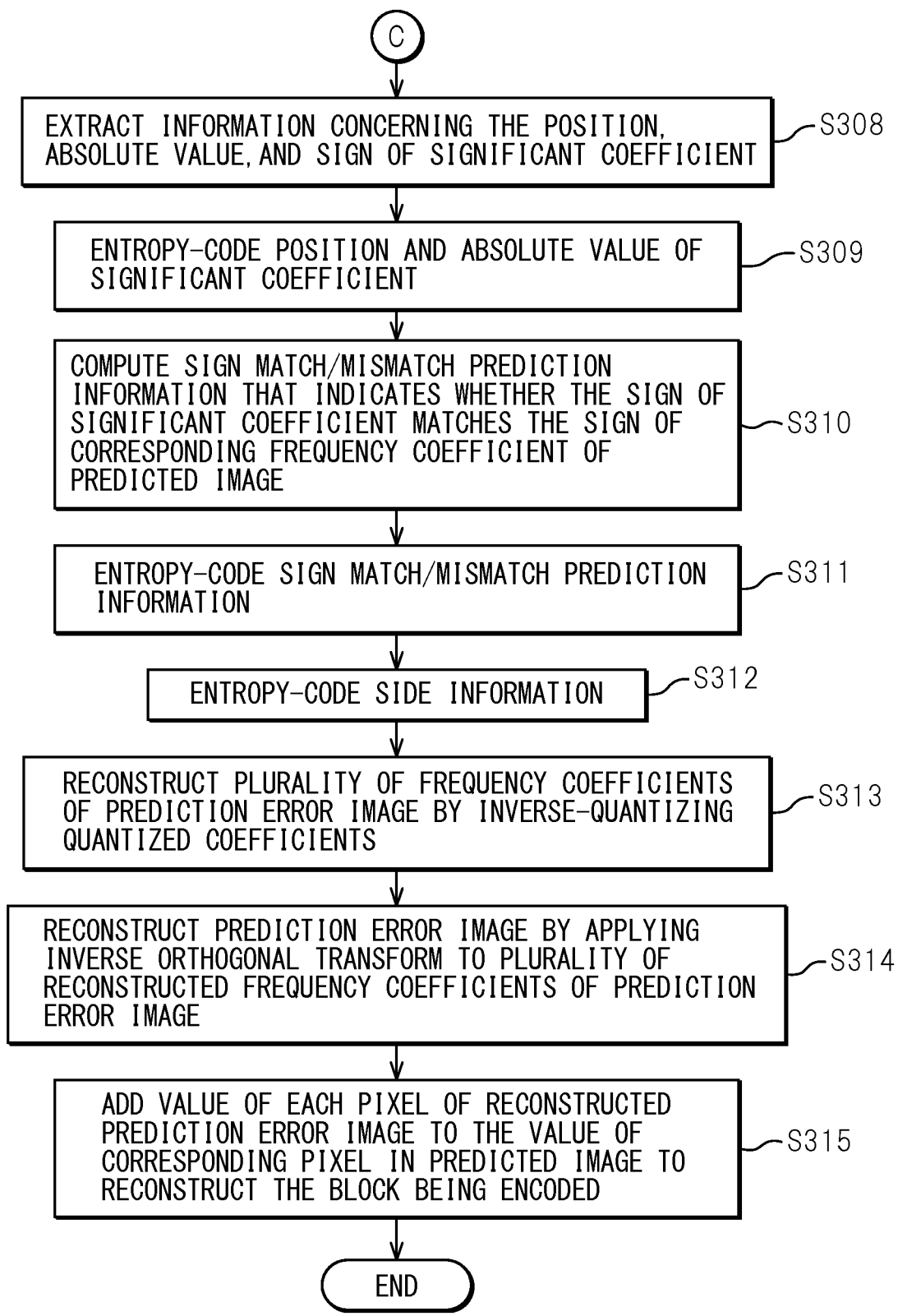
FIG. 20 is a diagram illustrating an operation flowchart of the motion video encoding process according to the third embodiment.

FIGS. 19 and 20 are diagrams illustrating an operation flowchart of the motion video encoding process according to the third embodiment. The motion video encoding apparatus 3 performs the following motion video encoding process on each macroblock to be encoded by predictive coding. When not using predictive coding to encode the macroblock, the motion video encoding apparatus 3 may encode the macroblock by using, for example, intra-prediction coding defined in MPEG-4 AVC/H.264.

The prediction mode determining unit 11 determines the prediction coding mode, based on the macroblock to be encoded and the reference picture stored in the image memory 22 (step S301). The motion video encoding apparatus 3 creates a predicted image for each block in the macroblock in accordance with the prediction coding mode (step S302). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. Then, the intra-prediction unit 12 or the motion compensating unit 13 passes the predicted image to the selector 14. The selector 14 supplies the received predicted image to the prediction error image generating unit 15, the predicted image orthogonal-transforming unit 17, and the adder 21.

The prediction error image generating unit 15 generates a prediction error image based on the difference between the predicted image and the block contained in the macroblock being encoded (step S303). The prediction error image generating unit 15 supplies the prediction error image to the prediction error orthogonal-transforming unit 16. The prediction error orthogonal-transforming unit 16 computes the plurality of frequency coefficients of the prediction error image by orthogonal-transforming the prediction error image (step S304). The prediction error orthogonal-transforming unit 16 supplies the plurality of frequency coefficients of the prediction error image to the frequency coefficient adaptive encoding unit 31.

On the other hand, the predicted image orthogonal-transforming unit 17 computes the plurality of frequency coefficients of the predicted image by orthogonal-transforming the predicted image (step S305). The predicted image orthogonal-transforming unit 17 supplies the plurality of frequency coefficients of the predicted image to the sign judging unit 18.

The sign judging unit 18 judges the sign of each frequency coefficient of the predicted image (step S306). The sign judging unit 18 supplies the value indicating the sign of each frequency coefficient of the predicted image to the frequency coefficient adaptive encoding unit 31.

The quantizing unit 3111 obtains a plurality of quantized coefficients by quantizing the plurality of frequency coefficients of the prediction error image by using prescribed quantization scales (step S307). The quantizing unit 3111 passes each quantized coefficient to the inverse quantizing unit 312 and the adaptively quantized coefficient encoding unit 192.

As illustrated in FIG. 20, the significant coefficient information generating unit 1921 in the adaptively quantized coefficient encoding unit 192 extracts information concerning the position, absolute value, and sign of each significant coefficient having a nonzero absolute value among the quantized coefficients (step S308). Then, the significant coefficient information generating unit 1921 passes the position information of the significant coefficient to the significant coefficient position information encoding unit 1922 in the adaptively quantized coefficient encoding unit 192. The significant coefficient information generating unit 1921 passes the absolute value information of the significant coefficient to the significant coefficient absolute value information encoding unit 1923 in the adaptively quantized coefficient encoding unit 192. The significant coefficient information generating unit 1921 passes the sign information of the significant coefficient to the exclusive-OR unit 1924 in the adaptively quantized coefficient encoding unit 192.

The significant coefficient position information encoding unit 1922 entropy-codes the position information of the significant coefficient. The significant coefficient absolute value information encoding unit 1923 entropy-codes the absolute value information of the significant coefficient (step S309). The significant coefficient position information encoding unit 1922 and the significant coefficient absolute value information encoding unit 1923, respectively, supply the entropy-coded position information of the significant coefficient and the entropy-coded absolute value information of the significant coefficient to the consolidating unit not depicted.

On the other hand, the exclusive-OR unit 1924 performs an exclusive-OR operation between the value indicating the sign of the significant coefficient and the value indicating the sign of the corresponding frequency coefficient in the predicted image. The exclusive-OR unit 1924 then computes sign match/mismatch prediction information (step S310). The exclusive-OR unit 1924 passes the sign match/mismatch prediction information to the significant coefficient sign information predictive encoding unit 1925.

The significant coefficient sign information predictive encoding unit 1925 entropy-codes the sign match/mismatch prediction information (step S311). The significant coefficient sign information predictive encoding unit 1925 supplies the entropy-coded sign match/mismatch prediction information to the consolidating unit. The side information encoding unit 23 encodes side information such as the motion vector, etc. (step S312). The side information encoding unit 23 supplies the encoded side information to the consolidating unit.

Further, the motion video encoding apparatus 3 generates a reference picture which is used for encoding the subsequent macroblock or picture. To that end, the inverse quantizing unit 312 in the frequency coefficient adaptive encoding unit 31 inverse-quantizes the quantized coefficients to reconstruct the plurality of frequency coefficients of the prediction error image (step S313). The plurality of reconstructed frequency coefficients are supplied to the inverse transforming unit 20.

The inverse transforming unit 20 reconstructs the prediction error image by applying an inverse orthogonal transform to the plurality of reconstructed frequency coefficients of the prediction error image (step S314). The inverse transforming unit 20 passes the reconstructed prediction error image to the adder 21. The adder 21 adds the value of each pixel of the reconstructed prediction error image to the value of the corresponding pixel in the predicted image, thereby reconstructing the block corresponding to the predicted image and the prediction error image within the macroblock being encoded (step S315). The adder 21 combines the reconstructed blocks in accordance with a prescribed order to reconstruct the macroblock being encoded. Further, the adder 21 combines the reconstructed macroblocks in sequence in accordance with a prescribed coding order to create the reference picture. The adder 21 stores the reference picture in the image memory 22. The process of steps S302 to S315 is performed on each block in the macroblock being encoded.

After that, the motion video encoding apparatus 3 terminates the motion video encoding process. The motion video encoding apparatus 3 may interchange the order of steps S304 and S305. The motion video encoding apparatus 3 may also interchange the order of the process of step S309 and the process of steps S310 and S311. Furthermore, the motion video encoding apparatus 3 may interchange the order of the process of steps S313 to S315 and the process of steps S308 to S312.

As has been described above, the motion video encoding apparatus according to the third embodiment entropy-codes the sign match/mismatch prediction information that indicates whether the sign of each given one of the significant coefficients of the prediction error image in the macroblock being encoded matches the sign of the corresponding frequency coefficient in the predicted image. Since the probability of occurrence of the value that indicates that both signs match is higher than the probability of occurrence of the value that indicates that they do not match, the amount of information needed to represent the sign match/mismatch prediction information is smaller than the amount of information needed to represent the sign of the significant coefficient itself. Accordingly, the motion video encoding apparatus can achieve higher coding efficiency than would be the case if the sign of the significant coefficient itself were encoded.

Next, a motion video decoding apparatus according to a fourth embodiment will be described. The motion video decoding apparatus of the fourth embodiment decodes the motion video data encoded by the motion video encoding apparatus of the third embodiment.

Figure 21:
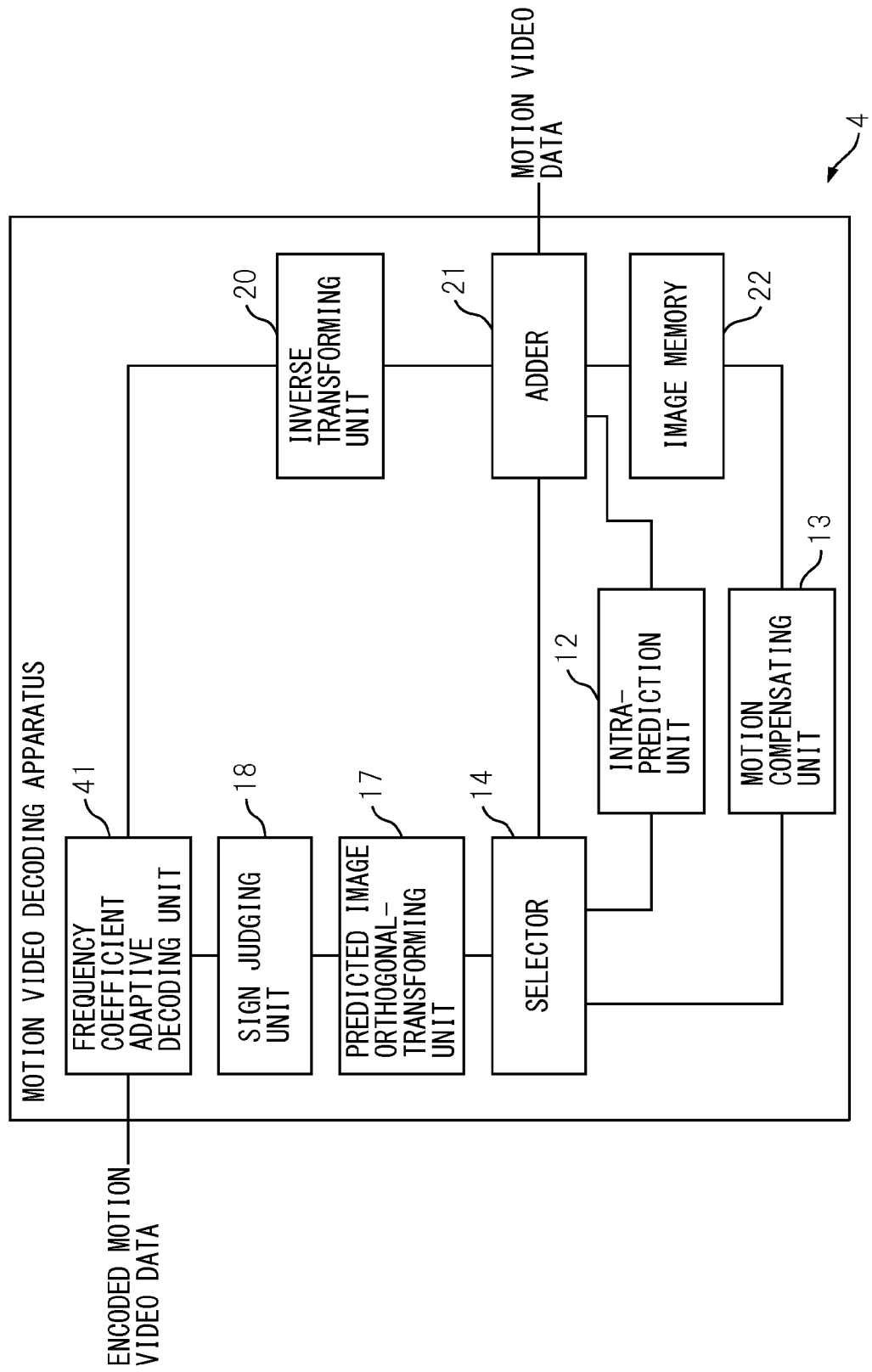
FIG. 21 is a diagram schematically illustrating the configuration of a motion video decoding apparatus according to a fourth embodiment which decodes the motion video data encoded by the motion video encoding apparatus according to the third embodiment.

FIG. 21 is a diagram schematically illustrating the configuration of the motion video decoding apparatus according to the fourth embodiment. As illustrated in FIG. 21, the motion video decoding apparatus 4 includes a frequency coefficient adaptive decoding unit 41, an intra-prediction unit 12, a motion compensating unit 13, a selector 14, a predicted image orthogonal-transforming unit 17, a sign judging unit 18, an inverse transforming unit 20, an adder 21, and an image memory 22. These units constituting the motion video decoding apparatus 4 are each implemented as a separate circuit. Alternatively, these units constituting the motion video decoding apparatus 4 may be implemented in the form of a single integrated circuit on which the circuits corresponding to the respective units are integrated. Further, these units constituting the motion video decoding apparatus 4 may be functional modules implemented by executing a computer program on a processor incorporated in the motion video decoding apparatus 4.

In FIG. 21, parts of the motion video decoding apparatus 4 that are identical to the corresponding parts of the motion video decoding apparatus 2 depicted in FIG. 13 are designated by the same reference numerals. The motion video decoding apparatus 4 of the fourth embodiment differs from the motion video decoding apparatus 2 of the second embodiment only in the configuration of the frequency coefficient adaptive decoding unit 41. Therefore, the following description deals only with the frequency coefficient adaptive decoding unit 41.

The frequency coefficient adaptive decoding unit 41 decodes the entropy-coded side information such as the motion vector, etc. When the macroblock is an inter-prediction coded macroblock, the frequency coefficient adaptive decoding unit 41 passes motion parameters associated with that macroblock to the motion compensating unit 13. When the macroblock is an intra-prediction coded macroblock, the frequency coefficient adaptive decoding unit 41 passes information indicating the intra-prediction coding mode of that macroblock to the intra-prediction unit 12. Further, the frequency coefficient adaptive decoding unit 41 notifies the selector 14 of the prediction coding mode associated with the macroblock being decoded. Then, when the macroblock being decoded is an intra-prediction coded macroblock, the intra-prediction unit 12 creates a predicted image from the already decoded reference block. On the other hand, when the macroblock being decoded is an inter-prediction coded macroblock, the motion compensating unit 13 creates a predicted image based on the already decoded reference block. The predicted image created by the intra-prediction unit 12 or the motion compensating unit 13 is supplied to the selector 14 which then passes the predicted image to the predicted image orthogonal-transforming unit 17 and the adder 21.

The frequency coefficient adaptive decoding unit 41 is one example of an adaptive decoding unit, and decodes the encoded motion video data to reconstruct the plurality of frequency coefficients of the prediction error image generated for each block contained in the macroblock being decoded.

Figure 22:
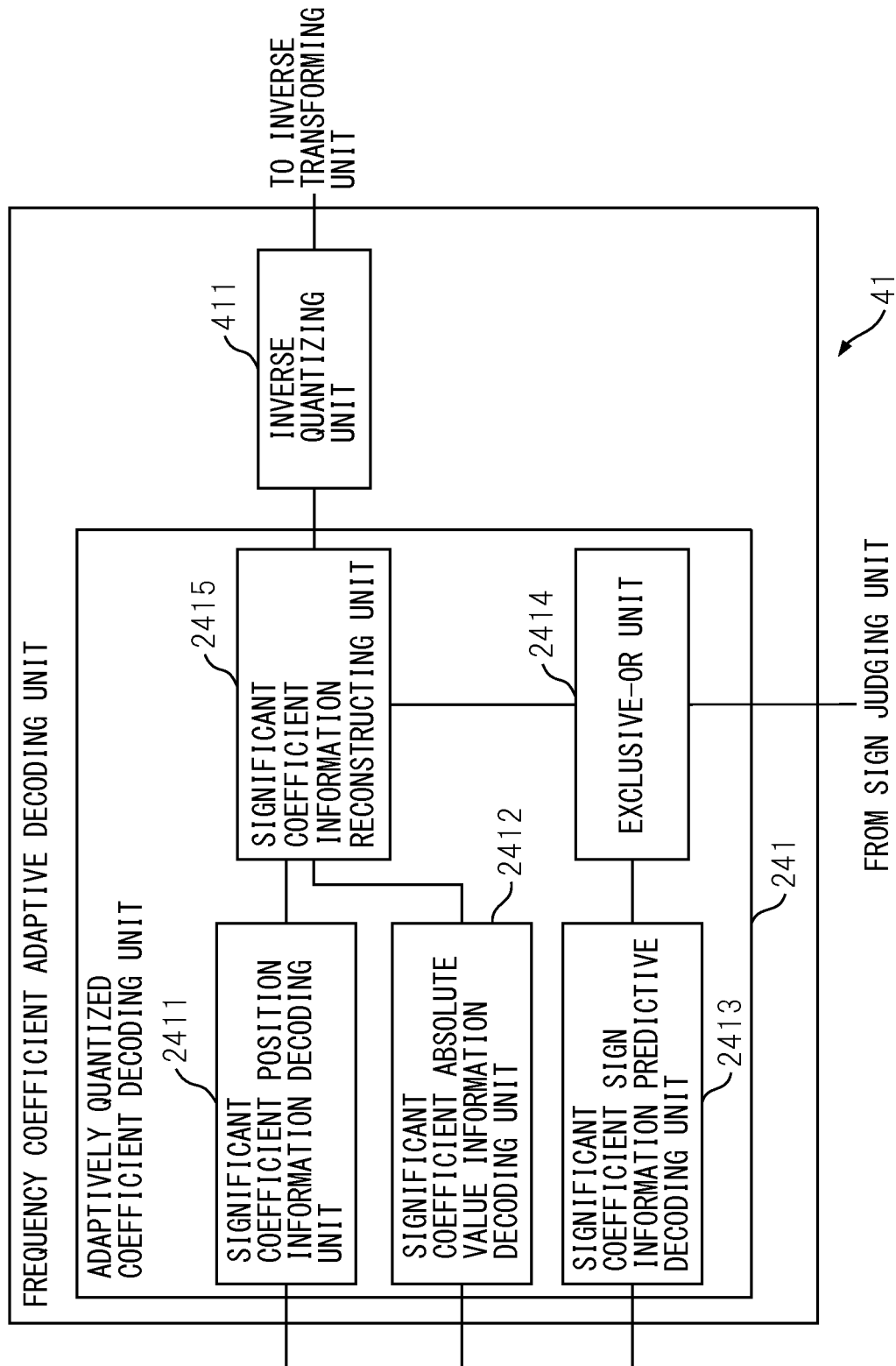
FIG. 22 is a diagram schematically illustrating the configuration of a frequency coefficient adaptive decoding unit according to the fourth embodiment.

FIG. 22 is a diagram schematically illustrating the configuration of the frequency coefficient adaptive decoding unit 41 according to the fourth embodiment which reconstructs the plurality of frequency coefficients of the prediction error image. The frequency coefficient adaptive decoding unit 41 includes an adaptively quantized coefficient decoding unit 241 and an inverse quantizing unit 411.

The adaptively quantized coefficient decoding unit 241 is identical in configuration and function to the adaptively quantized coefficient decoding unit 241 provided in the motion video decoding apparatus 2 of the second embodiment. That is, the adaptively quantized coefficient decoding unit 241 includes a significant coefficient position information decoding unit 2411, a significant coefficient absolute value information decoding unit 2412, a significant coefficient sign information predictive decoding unit 2413, an exclusive-OR unit 2414, and a significant coefficient information reconstructing unit 2415.

The significant coefficient position information decoding unit 2411 and significant coefficient absolute value information decoding unit 2412 in the adaptively quantized coefficient decoding unit 241 decode the entropy-coded significant coefficient position information and significant coefficient absolute value information, respectively. The significant coefficient sign information predictive decoding unit 2413 in the adaptively quantized coefficient decoding unit 241 decodes the entropy-coded sign match/mismatch prediction information. The exclusive-OR unit 2414 in the adaptively quantized coefficient decoding unit 241 reconstructs the significant coefficient sign information by performing an exclusive-OR between the sign match/mismatch prediction value of the significant coefficient, contained in the sign match/mismatch prediction information, and the value received from the sign judging unit 18 that indicates the sign of the corresponding frequency coefficient of the predicted image.

Based on the significant coefficient position information, significant coefficient absolute value information, and significant coefficient sign information, the significant coefficient information reconstructing unit 2415 in the adaptively quantized coefficient decoding unit 241 reconstructs the plurality of quantized coefficients. The adaptively quantized coefficient decoding unit 241 passes the reconstructed quantized coefficients to the inverse quantizing unit 411.

The inverse quantizing unit 411 inverse-quantizes each quantized coefficient by multiplying it with the quantization scale corresponding to that quantized coefficient. By performing the inverse quantization, the plurality of frequency coefficients of the prediction error image are reconstructed. In the present embodiment, the same quantization scale value is used for any quantized coefficient, whether it be a quantized coefficient having a positive value or a negative value.

Alternatively, the inverse quantizing unit 411 may refer to a mapping table that provides a mapping between the quantization level and the quantized coefficient, and may obtain the quantization level corresponding to the quantized coefficient as representing the reconstructed frequency coefficient. The inverse quantizing unit 411 supplies the plurality of reconstructed frequency coefficients of the prediction error image to the inverse transforming unit 20.

The inverse transforming unit 20 reconstructs the prediction error image by applying an inverse orthogonal transform to the reconstructed frequency coefficients, as in the motion video decoding apparatus 2. Then, the adder 21 adds the value of each pixel of the prediction error image to the value of the corresponding pixel in the predicted image, thereby reconstructing the block being decoded.

The motion video decoding apparatus 4 reconstructs each picture by combining the reconstructed macroblocks in the order in which they were encoded.

Figure 23:
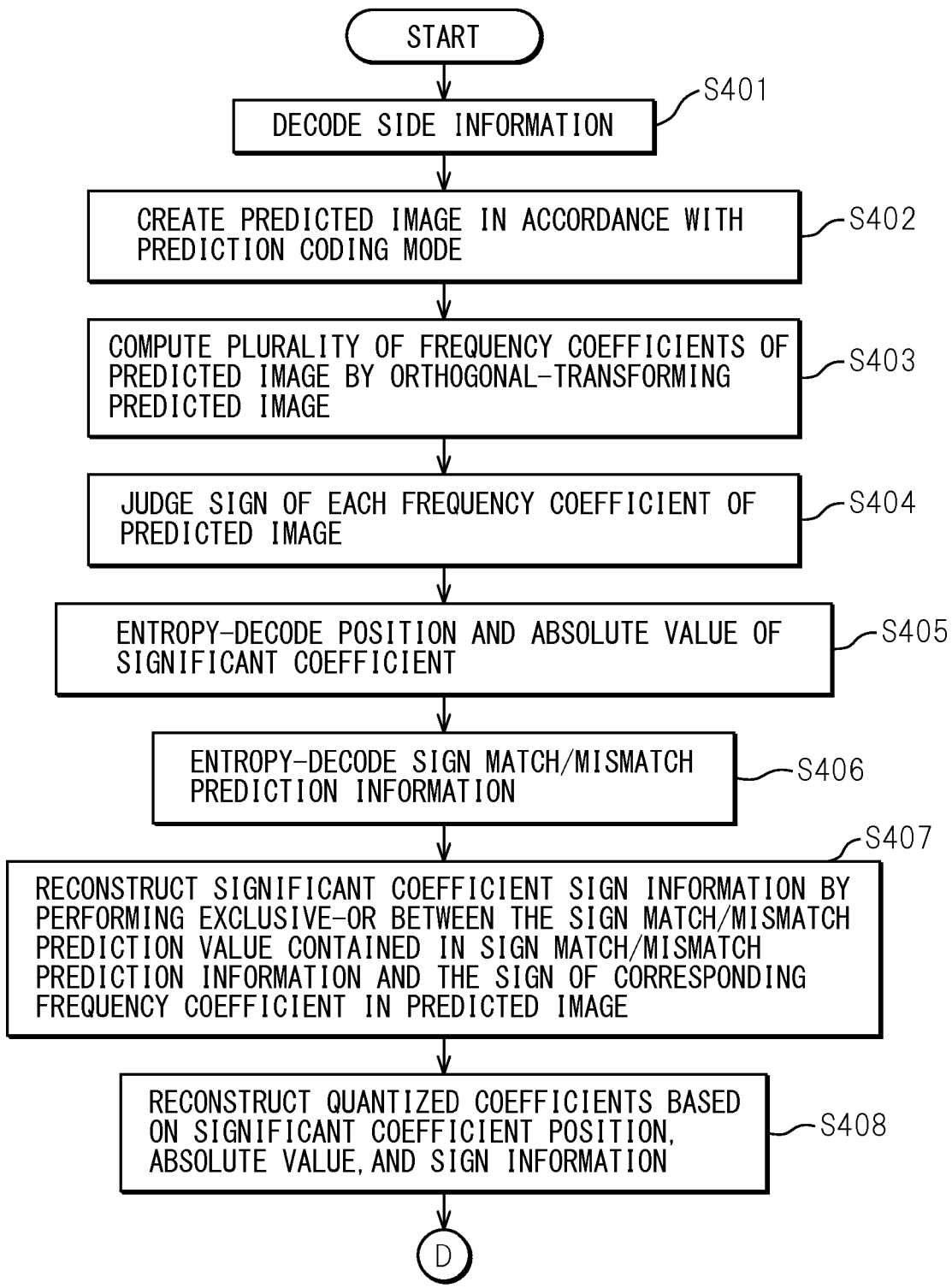
FIG. 23 is a diagram illustrating an operation flowchart of a motion video decoding process according to the fourth embodiment.
Figure 24:
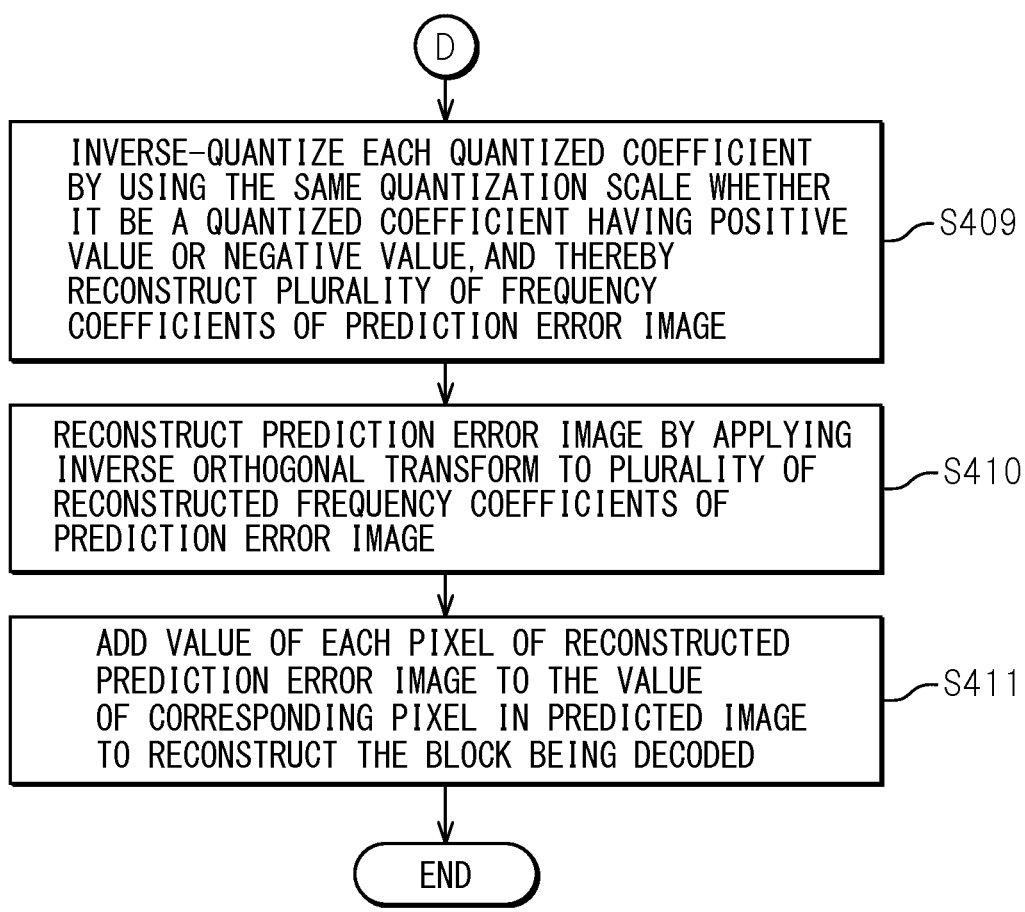
FIG. 24 is a diagram illustrating an operation flowchart of the motion video decoding process according to the fourth embodiment.

FIGS. 23 and 24 are diagrams illustrating an operation flowchart of the motion video decoding process according to the fourth embodiment. The motion video decoding apparatus 4 performs the following motion video decoding process on each macroblock to be decoded.

The frequency coefficient adaptive decoding unit 41 decodes the entropy-coded side information such as the motion vector, etc. (step S401). Then, the frequency coefficient adaptive decoding unit 41 passes information such as the prediction coding mode, motion vector, etc., contained in the side information, to the intra-prediction unit 12, the motion compensating unit 13, and the selector 14, respectively. The motion video decoding apparatus 4 creates a predicted image in accordance with the prediction coding mode for each block contained in the macroblock being decoded (step S402). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. The intra-prediction unit 12 or the motion compensating unit 13 supplies the predicted image to the selector 14. The selector 14 passes the received predicted image to the predicted image orthogonal-transforming unit 17 and the adder 21.

The predicted image orthogonal-transforming unit 17 computes the plurality of frequency coefficients of the predicted image by orthogonal-transforming the predicted image (step S403). The predicted image orthogonal-transforming unit 17 supplies the plurality of frequency coefficients of the predicted image to the sign judging unit 18.

The sign judging unit 18 judges the sign of each frequency coefficient of the predicted image (step S404). The sign judging unit 18 supplies the value indicating the sign of each frequency coefficient of the predicted image to the adaptively quantized coefficient decoding unit 241 in the frequency coefficient adaptive decoding unit 41.

The significant coefficient position information decoding unit 2411 in the adaptively quantized coefficient decoding unit 241 entropy-decodes the position information of each significant coefficient. On the other hand, the significant coefficient absolute value information decoding unit 2412 entropy-decodes the absolute value of each significant coefficient (step S405). The significant coefficient position information decoding unit 2411 and the significant coefficient absolute value information decoding unit 2412 pass the decoded significant coefficient position information and the decoded significant coefficient absolute value information, respectively, to the significant coefficient information reconstructing unit 2415 in the adaptively quantized coefficient decoding unit 241.

The significant coefficient sign information predictive decoding unit 2413 in the adaptively quantized coefficient decoding unit 241 entropy-decodes the sign match/mismatch prediction information (step S406). The significant coefficient sign information predictive decoding unit 2413 passes the decoded sign match/mismatch prediction information to the exclusive-OR unit 2414 in the adaptively quantized coefficient decoding unit 241. The exclusive-OR unit 2414 reconstructs the significant coefficient sign information by obtaining an exclusive-OR between the sign match/mismatch prediction value contained in the sign match/mismatch prediction information and the value indicating the sign of the corresponding frequency coefficient in the predicted image (step S407). The exclusive-OR unit 2414 passes the significant coefficient sign information to the significant coefficient information reconstructing unit 2415.

Based on the position information, absolute value information, and sign information of the significant coefficients, the significant coefficient information reconstructing unit 2415 reconstructs the plurality of quantized coefficients of the prediction error image (step S408). The significant coefficient information reconstructing unit 2415 passes the plurality of reconstructed quantized coefficients of the prediction error image to the inverse quantizing unit 413 in the frequency coefficient adaptive decoding unit 41.

As illustrated in FIG. 24, the inverse quantizing unit 411 inverse-quantizes each quantized coefficient by using the same quantization scale whether it be a quantized coefficient having a positive value or a negative value, and thereby reconstructs the plurality of frequency coefficients of the prediction error image (step S409). The inverse quantizing unit 411 supplies the reconstructed frequency coefficients to the inverse transforming unit 20.

The inverse transforming unit 20 reconstructs the prediction error image by applying an inverse orthogonal transform to the plurality of reconstructed frequency coefficients of the prediction error image (step S410). The inverse transforming unit 20 passes the reconstructed prediction error image to the adder 21. The adder 21 adds the value of each pixel of the reconstructed prediction error image to the value of the corresponding pixel in the predicted image, thereby reconstructing the block being decoded (step S411). The adder 21 combines the reconstructed blocks in accordance with a prescribed order to reconstruct the macroblock being decoded. Further, the adder 21 combines the reconstructed macroblocks in sequence in accordance with a prescribed coding order to reconstruct each picture. The adder 21 outputs the reconstructed picture, while storing the reconstructed picture as the reference picture in the image memory 22. The process of steps S402 to S411 is performed on each block in the macroblock being decoded.

After that, the motion video decoding apparatus 4 terminates the motion video decoding process. The motion video decoding apparatus 4 may interchange the order of the process of step S405 and the process of steps S406 and S407.

As has been described above, the motion video decoding apparatus according to the fourth embodiment can decode the motion video data encoded by the motion video encoding apparatus according to the third embodiment.

Next, a motion video encoding apparatus according to a fifth embodiment will be described. The motion video encoding apparatus according to the fifth embodiment computes corrected frequency coefficients, whose probability of occurrence differs between the positive and negative values, by multiplying a respective one of the frequency coefficients of the prediction error image by the sign of the corresponding frequency coefficient of the predicted image. In this motion video encoding apparatus, the spacing between adjacent quantization levels corresponding to negative-valued corrected frequency coefficients whose probability of occurrence is low is set wider than the spacing between adjacent quantization levels corresponding to positive-valued corrected frequency coefficients whose probability of occurrence is high.

Figure 25:
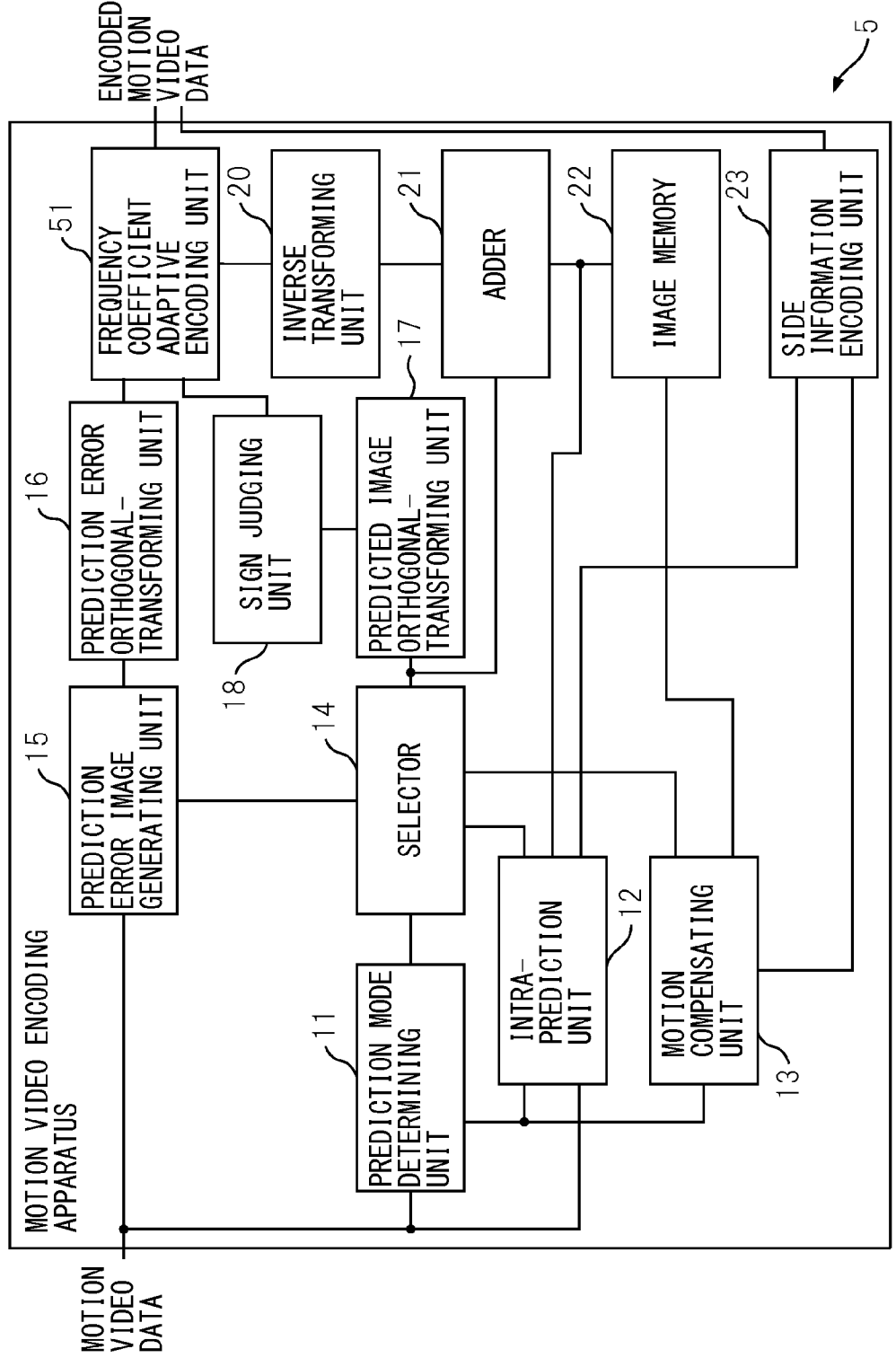
FIG. 25 is a diagram schematically illustrating the configuration of a motion video encoding apparatus according to a fifth embodiment.

FIG. 25 is a diagram schematically illustrating the configuration of the motion video encoding apparatus according to the fifth embodiment. The motion video encoding apparatus 5 includes a prediction mode determining unit 11, an intra-prediction unit 12, a motion compensating unit 13, a selector 14, a prediction error image generating unit 15, a prediction error orthogonal-transforming unit 16, a predicted image orthogonal-transforming unit 17, a sign judging unit 18, a frequency coefficient adaptive encoding unit 51, an inverse transforming unit 20, an adder 21, an image memory 22, and a side information encoding unit 23. These units constituting the motion video encoding apparatus 5 are each implemented as a separate circuit. Alternatively, these units constituting the motion video encoding apparatus 5 may be implemented in the form of a single integrated circuit on which the circuits corresponding to the respective units are integrated. Further, these units constituting the motion video encoding apparatus 5 may be functional modules implemented by executing a computer program on a processor incorporated in the motion video encoding apparatus 5.

In FIG. 25, parts of the motion video encoding apparatus 5 that are identical to the corresponding parts of the motion video encoding apparatus 1 depicted in FIG. 1 are designated by the same reference numerals. The motion video encoding apparatus 5 of the fifth embodiment differs from the motion video encoding apparatus 1 of the first embodiment only in the configuration of the frequency coefficient adaptive encoding unit 51. Therefore, the following description deals only with the frequency coefficient adaptive encoding unit 51. For the details of the other parts of the motion video encoding apparatus 5, refer to the description given of the corresponding parts of the motion video encoding apparatus 1.

Figure 26:
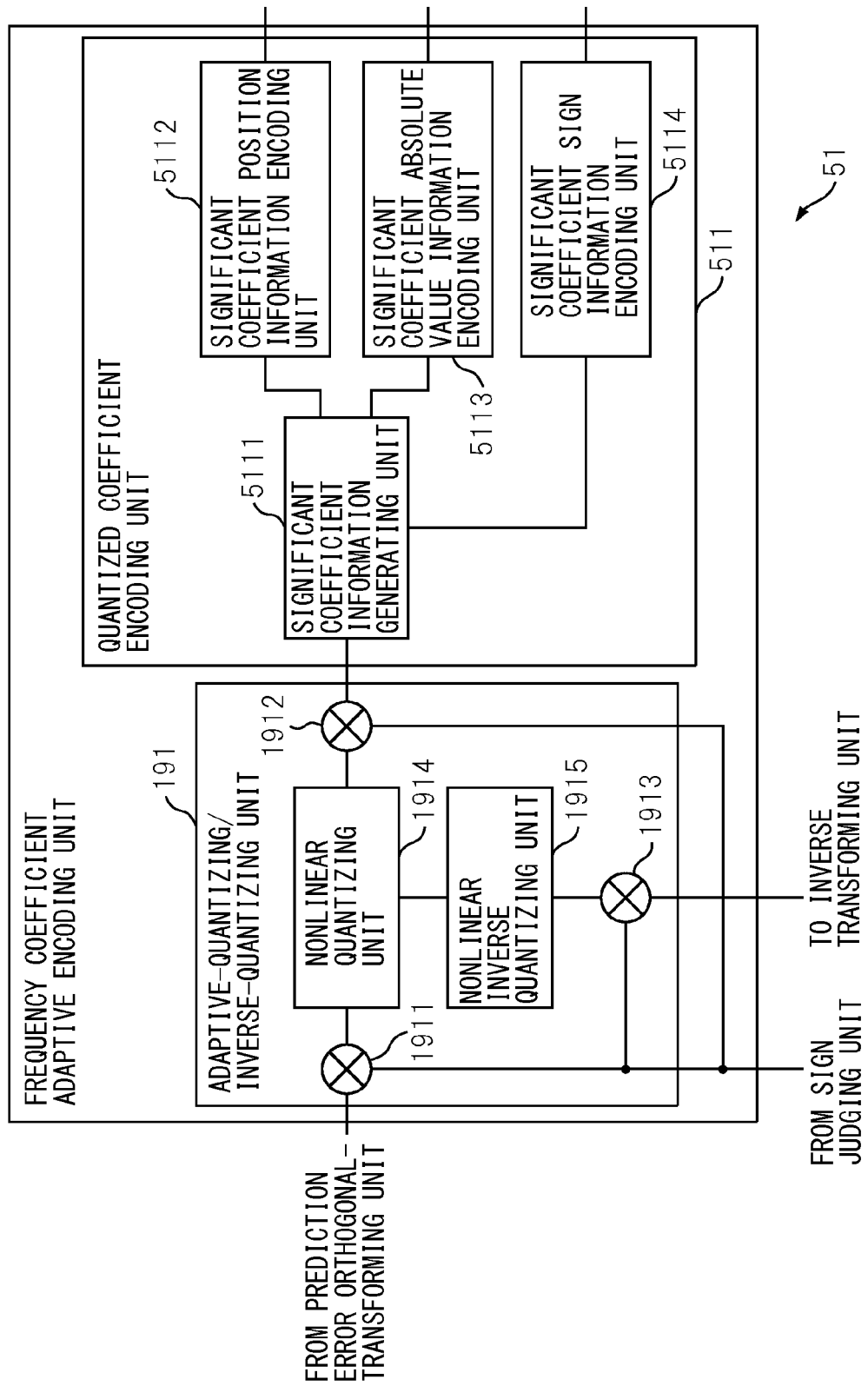
FIG. 26 is a diagram schematically illustrating the configuration of a frequency coefficient adaptive encoding unit according to the fifth embodiment.

FIG. 26 is a diagram schematically illustrating the configuration of the frequency coefficient adaptive encoding unit according to the fifth embodiment. The frequency coefficient adaptive encoding unit 51 is one example of an adaptive encoding unit, and includes an adaptive-quantizing/inverse-quantizing unit 191 and a quantized coefficient encoding unit 511.

The adaptive-quantizing/inverse-quantizing unit 191 is identical in configuration and function to the adaptive-quantizing/inverse-quantizing unit 191 provided in the motion video encoding apparatus 1 of the first embodiment. That is, the adaptive-quantizing/inverse-quantizing unit 191 includes three multipliers 1911 to 1913, a nonlinear quantizing unit 1914, and a nonlinear inverse quantizing unit 1915.

The adaptive-quantizing/inverse-quantizing unit 191 quantizes each corrected frequency coefficient computed by multiplying a given one of the frequency coefficients of each prediction error image in the macroblock being encoded by the sign of the corresponding frequency coefficient of the predicted image. As earlier described, the probability of occurrence of the corrected frequency coefficient having a positive value is higher than the corrected frequency coefficient having a negative value. Accordingly, by setting the quantization levels so that the spacing between quantization levels corresponding to corrected frequency coefficients having negative values becomes wider than the spacing between quantization levels corresponding to corrected frequency coefficients having positive values, the adaptive-quantizing/inverse-quantizing unit 191 can encode the corrected frequency coefficients efficiently.

Further, the adaptive-quantizing/inverse-quantizing unit 191 multiplies each corrected quantized coefficient by the sign of the corresponding frequency coefficient in the predicted image so that the sign of the corrected quantized coefficient matches the sign of the corresponding frequency coefficient of the prediction error image, thus generating the quantized coefficient corresponding to the frequency coefficient of the predicted image. The adaptive-quantizing/inverse-quantizing unit 191 supplies each quantized coefficient to the quantized coefficient encoding unit 511.

The adaptive-quantizing/inverse-quantizing unit 191 reconstructs the corrected frequency coefficients by inverse-quantizing the corrected quantized coefficients, and reconstructs the plurality of frequency coefficients of the prediction error image by multiplying a respective one of the reconstructed corrected frequency coefficients by the sign of the corresponding frequency coefficient of the predicted image. The adaptive-quantizing/inverse-quantizing unit 191 supplies the plurality of reconstructed frequency coefficients of the prediction error image to the inverse transforming unit 20.

The quantized coefficient encoding unit 511 entropy-codes the quantized coefficients for each block contained in the macroblock being encoded. For this purpose, the quantized coefficient encoding unit 511 includes a significant coefficient information generating unit 5111, a significant coefficient position information encoding unit 5112, a significant coefficient absolute value information encoding unit 5113, and a significant coefficient sign information encoding unit 5114.

Similarly to the significant coefficient information generating unit 1921 provided in the motion video encoding apparatus 1 of the first embodiment, the significant coefficient information generating unit 5111 extracts quantized coefficients having nonzero values as the significant coefficients from among the plurality of quantized coefficients of each prediction error image in the macroblock being encoded. Then, the significant coefficient information generating unit 5111 passes significant coefficient position information representing the position of the significant coefficient to the significant coefficient position information encoding unit 5112. Further, the significant coefficient information generating unit 5111 passes significant coefficient absolute value information representing the absolute value of the significant coefficient to the significant coefficient absolute value information encoding unit 5113. The significant coefficient information generating unit 5111 also passes significant coefficient sign information representing the sign of the significant coefficient to the significant coefficient sign information encoding unit 5114.

Similarly to the significant coefficient position information encoding unit 1922 provided in the motion video encoding apparatus 1 of the first embodiment, the significant coefficient position information encoding unit 5112 entropy-codes the significant coefficient position information. For example, the significant coefficient position information encoding unit 5112 entropy-codes the significant coefficient position information by using a method of entropy coding such as Huffman coding, CABAC, or other arithmetic coding. The significant coefficient position information encoding unit 5112 supplies the entropy-coded significant coefficient position information to a consolidating unit not depicted.

Similarly to the significant coefficient absolute value information encoding unit 1923 provided in the motion video encoding apparatus 1 of the first embodiment, the significant coefficient absolute value information encoding unit 5113 entropy-codes the significant coefficient absolute value information. For example, the significant coefficient absolute value information encoding unit 5113 entropy-codes the significant coefficient absolute information by using a method of entropy coding such as Huffman coding, CABAC, or other arithmetic coding. The significant coefficient absolute value information encoding unit 5113 supplies the entropy-coded significant coefficient absolute value information to the consolidating unit not depicted.

The significant coefficient sign information encoding unit 5114 encodes the significant coefficient sign information. The probability of any given significant coefficient being of positive sign is approximately equal to the probability of it being of negative sign. As a result, if entropy coding is used for encoding the significant coefficient sign information, the coding efficiency does not improve much. Therefore, the significant coefficient sign information encoding unit 5114 assigns the sign of each significant coefficient a 1-bit code that indicates whether the sign is positive or negative. The significant coefficient sign information encoding unit 5114 passes the encoded significant coefficient sign information to the consolidating unit not depicted.

Figure 27:
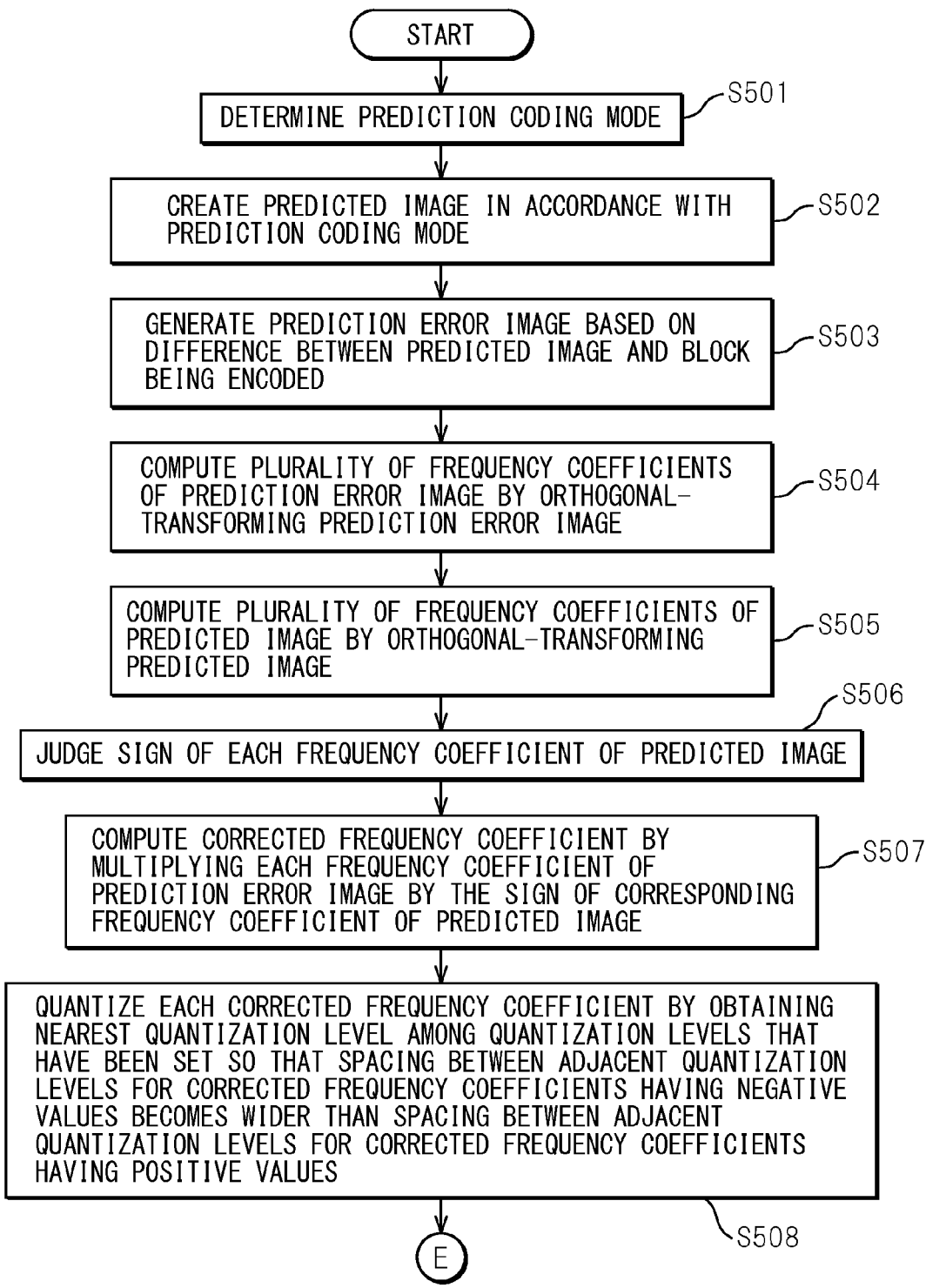
FIG. 27 is a diagram illustrating an operation flowchart of a motion video encoding process according to the fifth embodiment.
Figure 28:
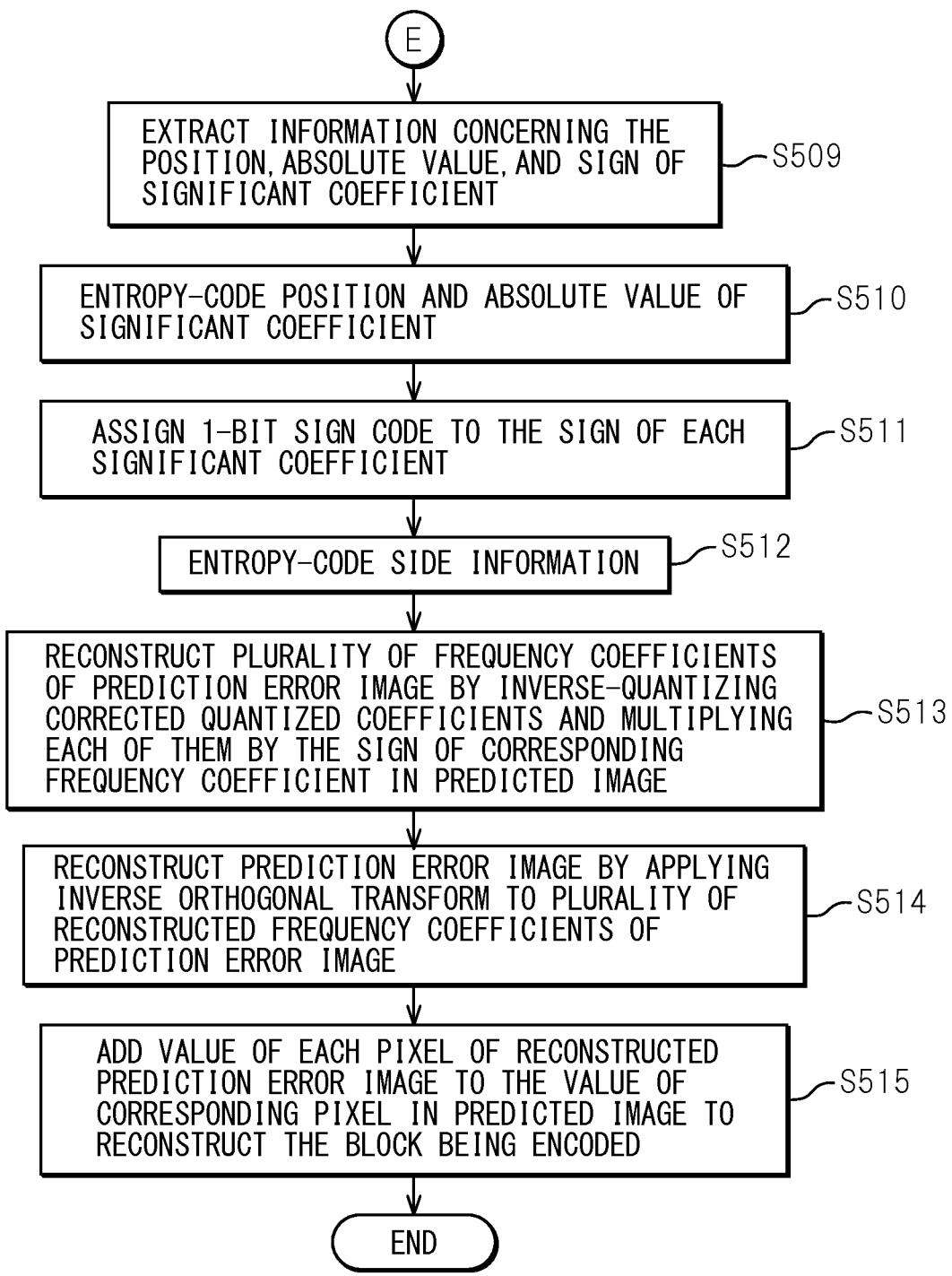
FIG. 28 is a diagram illustrating an operation flowchart of the motion video encoding process according to the fifth embodiment.

FIGS. 27 and 28 are diagrams illustrating an operation flowchart of the motion video encoding process according to the fifth embodiment. The motion video encoding apparatus 5 performs the following motion video encoding process on each macroblock to be encoded by predictive coding. When not using predictive coding to encode the macroblock, the motion video encoding apparatus 5 encodes the macroblock by using, for example, intra-prediction coding defined in MPEG-4 AVC/H.264.

The prediction mode determining unit 11 determines the prediction coding mode, based on the macroblock to be encoded and the reference picture stored in the image memory 22 (step S501). The motion video encoding apparatus 5 creates a predicted image for each block in the macroblock in accordance with the prediction coding mode (step S502). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. Then, the intra-prediction unit 12 or the motion compensating unit 13 passes the predicted image to the selector 14. The selector 14 supplies the received predicted image to the prediction error image generating unit 15, the predicted image orthogonal-transforming unit 17, and the adder 21.

The prediction error image generating unit 15 generates a prediction error image based on the difference between the predicted image and the block contained in the macroblock being encoded (step S503). The prediction error image generating unit 15 supplies the prediction error image to the prediction error orthogonal-transforming unit 16. The prediction error orthogonal-transforming unit 16 computes the plurality of frequency coefficients of the prediction error image by orthogonal-transforming the prediction error image (step S504). The prediction error orthogonal-transforming unit 16 supplies the plurality of frequency coefficients of the prediction error image to the frequency coefficient adaptive encoding unit 51.

On the other hand, the predicted image orthogonal-transforming unit 17 computes the plurality of frequency coefficients of the predicted image by orthogonal-transforming the predicted image (step S505). The predicted image orthogonal-transforming unit 17 supplies the plurality of frequency coefficients of the predicted image to the sign judging unit 18.

The sign judging unit 18 judges the sign of each frequency coefficient of the predicted image (step S506). The sign judging unit 18 supplies the value indicating the sign of each frequency coefficient of the predicted image to the adaptive-quantizing/inverse-quantizing unit 191 in the frequency coefficient adaptive encoding unit 51.

The multiplier 1911 in the adaptive-quantizing/inverse-quantizing unit 191 computes a corrected frequency coefficient by multiplying each frequency coefficient of the prediction error image by the sign of the corresponding frequency coefficient of the predicted image (step S507). The multiplier 1911 supplies the corrected frequency coefficient to the nonlinear quantizing unit 1914 in the adaptive-quantizing/inverse-quantizing unit.

For each corrected frequency coefficient, the nonlinear quantizing unit 1914 obtains the nearest quantization level among the quantization levels that have been set so that the spacing between adjacent quantization levels for corrected frequency coefficients having negative values becomes wider than the spacing between adjacent quantization levels for corrected frequency coefficients having positive values. Then, the nonlinear quantizing unit 1914 obtains the corrected quantized coefficient corresponding to that quantization level (step S508). The corrected quantized coefficient output from the nonlinear quantizing unit 1914 is supplied to the nonlinear inverse quantizing unit 1915 in the adaptive-quantizing/inverse-quantizing unit 191. The corrected quantized coefficient output from the nonlinear quantizing unit 1914 is also supplied to the multiplier 1912 where it is multiplied by the sign of the corresponding frequency coefficient of the predicted image so that the resulting sign matches the sign of the corresponding frequency coefficient of the prediction error image, thus computing each quantized coefficient. Each quantized coefficient thus computed is then supplied to the quantized coefficient encoding unit 511.

As illustrated in FIG. 28, the significant coefficient information generating unit 5111 in the quantized coefficient encoding unit 511 extracts information concerning the position, absolute value, and sign of each significant coefficient having a nonzero absolute value among the quantized coefficients (step S509). Then, the significant coefficient information generating unit 5111 passes the position information of the significant coefficient to the significant coefficient position information encoding unit 5112 in the quantized coefficient encoding unit 511. The significant coefficient information generating unit 5111 passes the absolute value information of the significant coefficient to the significant coefficient absolute value information encoding unit 5113 in the quantized coefficient encoding unit 511. The significant coefficient information generating unit 5111 passes the sign information of the significant coefficient to the significant coefficient sign information encoding unit 5114 in the quantized coefficient encoding unit 511.

The significant coefficient position information encoding unit 5112 entropy-codes the position information of the significant coefficient. The significant coefficient absolute value information encoding unit 5113 entropy-codes the absolute value information of the significant coefficient (step S510). The significant coefficient position information encoding unit 5112 and the significant coefficient absolute value information encoding unit 5113, respectively, supply the entropy-coded position information of the significant coefficient and the entropy-coded absolute value information of the significant coefficient to the consolidating unit not depicted.

On the other hand, the significant coefficient sign information encoding unit 5114 assigns a 1-bit code to the sign of each significant coefficient (step S511). The significant coefficient sign information encoding unit 5114 supplies the bit indicating the sign of the significant coefficient to the consolidating unit not depicted.

The side information encoding unit 23 encodes side information such as the motion vector, etc. (step S512). The side information encoding unit 23 supplies the encoded side information to the consolidating unit.

Further, the motion video encoding apparatus 5 generates a reference picture which is used for encoding the subsequent macroblock or picture. To that end, the nonlinear inverse quantizing unit 1915 in the frequency coefficient adaptive encoding unit 51 inverse-quantizes each corrected quantized coefficient to reconstruct the corresponding corrected frequency coefficient (step S513). Then, the reconstructed corrected frequency coefficients are each multiplied in the multiplier 1913 by the sign of the corresponding frequency coefficient of the predicted image so that the resulting sign matches the sign of the corresponding frequency coefficient of the prediction error image, and the thus reconstructed frequency coefficients are then supplied to the inverse transforming unit 20.

The inverse transforming unit 20 reconstructs the prediction error image by applying an inverse orthogonal transform to the plurality of reconstructed frequency coefficients of the prediction error image (step S514). The inverse transforming unit 20 passes the reconstructed prediction error image to the adder 21. The adder 21 adds the value of each pixel of the reconstructed prediction error image to the value of the corresponding pixel in the predicted image, thereby reconstructing the block corresponding to the predicted image and the prediction error image within the macroblock being encoded (step S515). The adder 21 combines the reconstructed blocks in accordance with a prescribed order to reconstruct the macroblock being encoded. Further, the adder 21 combines the reconstructed macroblocks in sequence in accordance with a prescribed coding order to create the reference picture. The adder 21 stores the reference picture in the image memory 22. The process of steps S502 to S515 is performed on each block in the macroblock being encoded.

After that, the motion video encoding apparatus 5 terminates the motion video encoding process. The motion video encoding apparatus 5 may interchange the order of steps S504 and S505. The motion video encoding apparatus 5 may also interchange the order of steps S510 and S511. Furthermore, the motion video encoding apparatus 5 may interchange the order of the process of steps S513 to S515 and the process of steps S509 to S512.

As has been described above, the motion video encoding apparatus according to the fifth embodiment computes, for each prediction error image in the macroblock being encoded, the corrected frequency coefficients whose probability of occurrence differs between the positive and negative values. Then, by setting the spacing between adjacent quantization levels corresponding to corrected frequency coefficients having positive values so as to differ from the spacing between adjacent quantization levels corresponding to corrected frequency coefficients having negative values, the motion video encoding apparatus can reduce the amount of information of the corrected frequency coefficients having negative values whose probability of occurrence is low. Since the amount of information needed to code the frequency coefficients of each prediction error image can be reduced, the motion video encoding apparatus can enhance the coding efficiency for coding the frequency coefficients of each prediction error image.

Next, a motion video decoding apparatus according to a sixth embodiment will be described. The motion video decoding apparatus of the sixth embodiment decodes the motion video data encoded by the motion video encoding apparatus of the fifth embodiment.

Figure 29:
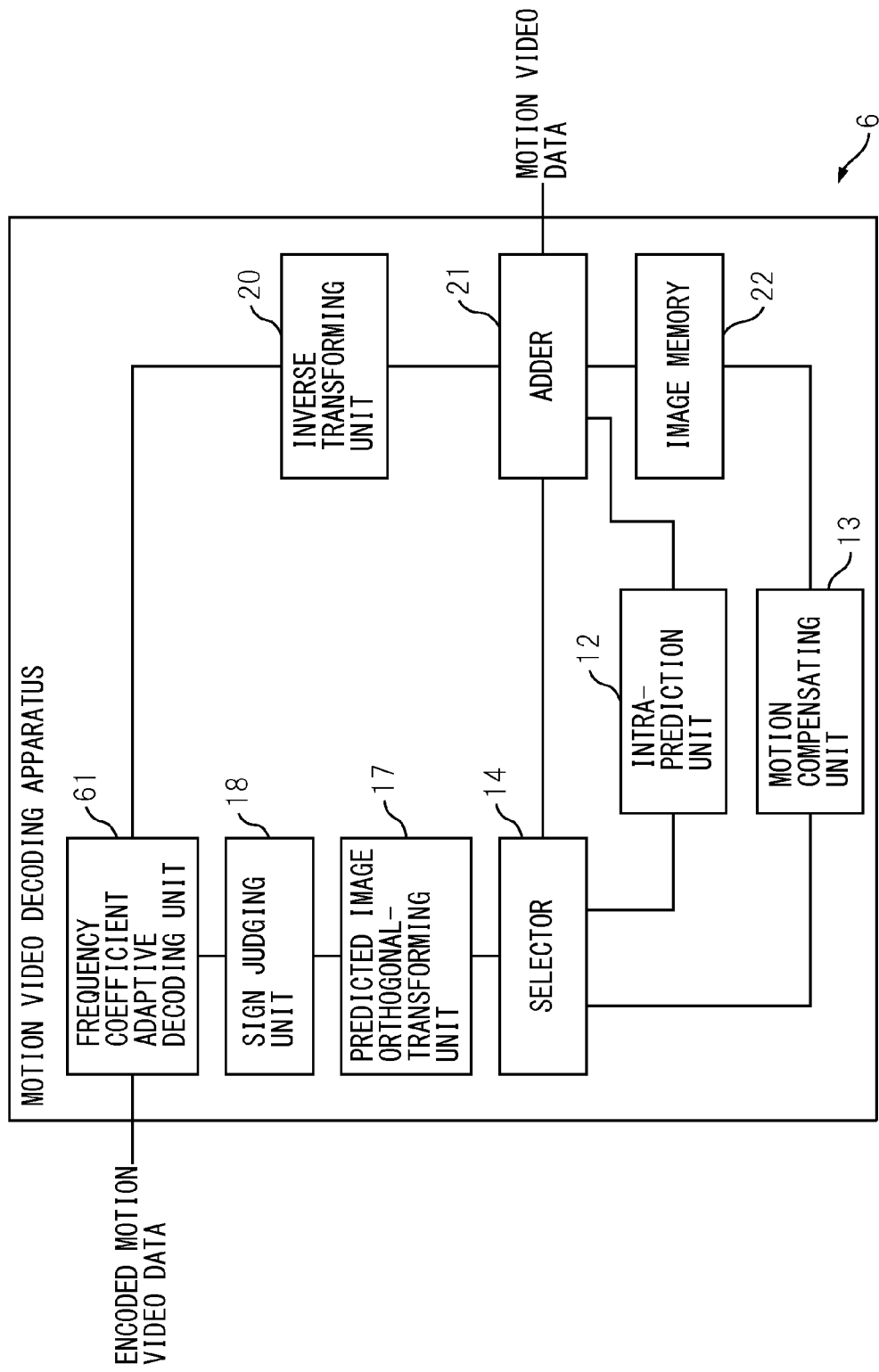
FIG. 29 is a diagram schematically illustrating the configuration of a motion video decoding apparatus according to a sixth embodiment which decodes the motion video data encoded by the motion video encoding apparatus according to the fifth embodiment.

FIG. 29 is a diagram schematically illustrating the configuration of the motion video decoding apparatus according to the sixth embodiment. As illustrated in FIG. 29, the motion video decoding apparatus 6 includes a frequency coefficient adaptive decoding unit 61, an intra-prediction unit 12, a motion compensating unit 13, a selector 14, a predicted image orthogonal-transforming unit 17, a sign judging unit 18, an inverse transforming unit 20, an adder 21, and an image memory 22. These units constituting the motion video decoding apparatus 6 are each implemented as a separate circuit. Alternatively, these units constituting the motion video decoding apparatus 6 may be implemented in the form of a single integrated circuit on which the circuits corresponding to the respective units are integrated. Further, these units constituting the motion video decoding apparatus 6 may be functional modules implemented by executing a computer program on a processor incorporated in the motion video decoding apparatus 6.

In FIG. 29, parts of the motion video decoding apparatus 6 that are identical to the corresponding parts of the motion video decoding apparatus 2 depicted in FIG. 13 are designated by the same reference numerals. The motion video decoding apparatus 6 of the sixth embodiment differs from the motion video decoding apparatus 2 of the second embodiment only in the configuration of the frequency coefficient adaptive decoding unit 61. Therefore, the following description deals only with the frequency coefficient adaptive decoding unit 61.

The frequency coefficient adaptive decoding unit 61 decodes the entropy-coded side information such as the motion vector, etc. When the macroblock is an inter-prediction coded macroblock, the frequency coefficient adaptive decoding unit 61 passes motion parameters associated with that macroblock to the motion compensating unit 13. When the macroblock is an intra-prediction coded macroblock, the frequency coefficient adaptive decoding unit 61 passes information indicating the intra-prediction coding mode of that macroblock to the intra-prediction unit 12. Further, the frequency coefficient adaptive decoding unit 61 notifies the selector 14 of the prediction coding mode associated with the macroblock being decoded. Then, when the macroblock being decoded is an intra-prediction coded macroblock, the intra-prediction unit 12 creates a predicted image from the already decoded reference block. On the other hand, when the macroblock being decoded is an inter-prediction coded macroblock, the motion compensating unit 13 creates a predicted image based on the already decoded reference block. The predicted image created by the intra-prediction unit 12 or the motion compensating unit 13 is supplied to the selector 14 which then passes the predicted image to the predicted image orthogonal-transforming unit 17 and the adder 21.

The frequency coefficient adaptive decoding unit 61 is one example of an adaptive decoding unit, and decodes the encoded motion video data to reconstruct the plurality of frequency coefficients of the prediction error image generated for each block contained in the macroblock being decoded.

Figure 30:
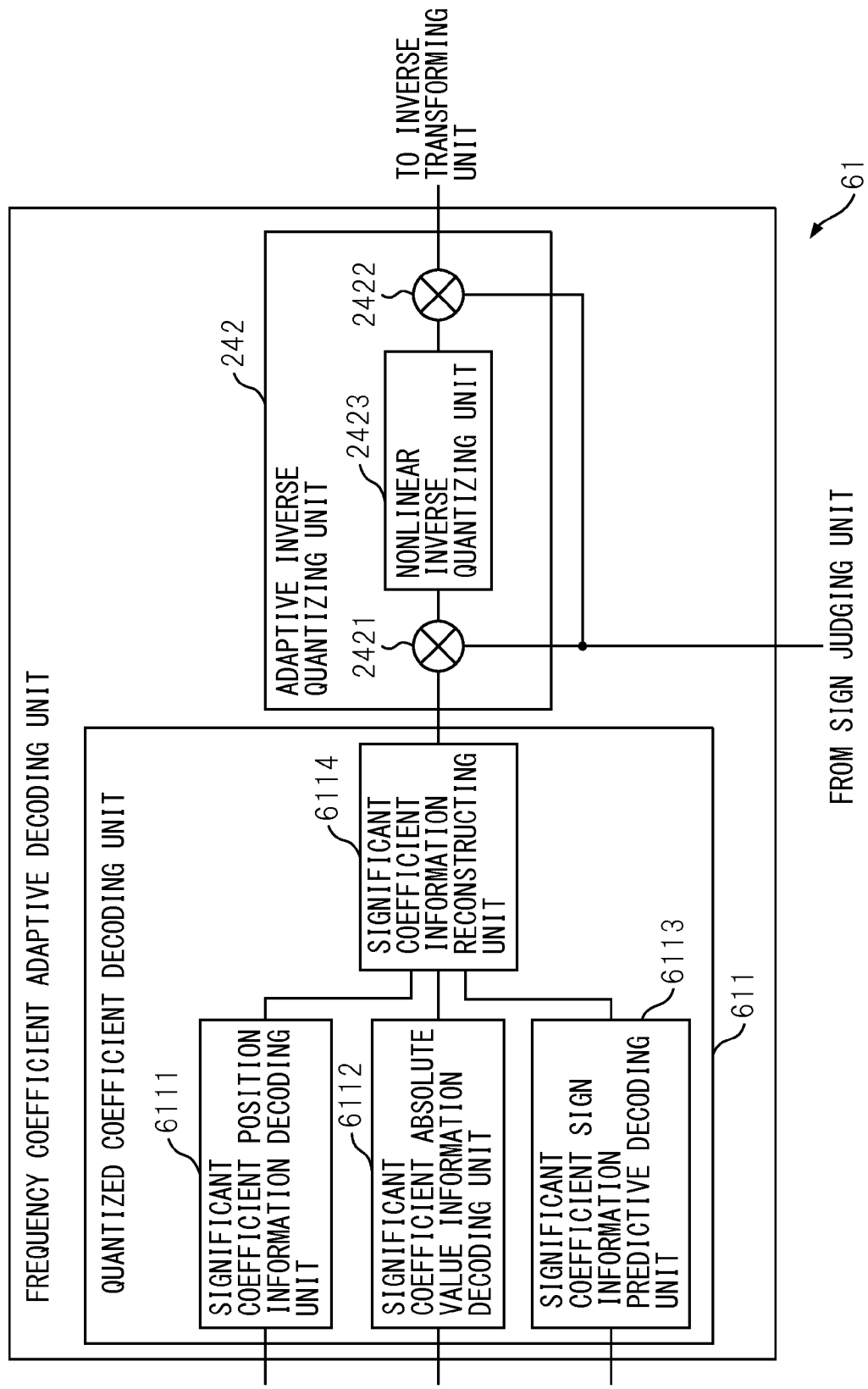
FIG. 30 is a diagram schematically illustrating the configuration of a frequency coefficient adaptive decoding unit according to the sixth embodiment.

FIG. 30 is a diagram schematically illustrating the configuration of the frequency coefficient adaptive decoding unit 61 according to the sixth embodiment which reconstructs the plurality of frequency coefficients of the prediction error image. The frequency coefficient adaptive decoding unit 61 includes a quantized coefficient decoding unit 611 and an adaptive inverse quantizing unit 242.

The quantized coefficient decoding unit 611 reconstructs each quantized coefficient of the prediction error image. For this purpose, the quantized coefficient decoding unit 611 includes a significant coefficient position information decoding unit 6111, a significant coefficient absolute value information decoding unit 6112, a significant coefficient sign information decoding unit 6113, and a significant coefficient information reconstructing unit 6114.

The significant coefficient position information decoding unit 6111 decodes the entropy-coded significant coefficient position information in accordance with the entropy coding method used by the significant coefficient position information encoding unit 5112 provided in the motion video encoding apparatus 5. The significant coefficient position information decoding unit 6111 passes the decoded significant coefficient position information to the significant coefficient information reconstructing unit 6114.

The significant coefficient absolute value information decoding unit 6112 decodes the entropy-coded significant coefficient absolute value information in accordance with the entropy coding method used by the significant coefficient absolute value information encoding unit 5113 provided in the motion video encoding apparatus 5. The significant coefficient absolute value information decoding unit 6112 passes the decoded significant coefficient absolute value information to the significant coefficient information reconstructing unit 6114.

The significant coefficient sign information decoding unit 6113 reconstructs the sign information indicating the sign of each significant coefficient by referring to the bit value indicating the sign of the significant coefficient. The significant coefficient sign information decoding unit 6113 passes the sign information to the significant coefficient information reconstructing unit 6114.

The significant coefficient information reconstructing unit 6114 reconstructs each significant coefficient by combining the absolute value information and sign information of the significant coefficient. Then, the significant coefficient information reconstructing unit 6114 reconstructs the plurality of quantized coefficients of the prediction error image by arranging the significant coefficients in accordance with the position information of the respective significant coefficients and inserting values "0" at positions other than the significant coefficients. The significant coefficient information reconstructing unit 6114 passes the plurality of reconstructed quantized coefficients of the prediction error image to the adaptive inverse quantizing unit 242.

The adaptive inverse quantizing unit 242 is identical in configuration and function to the adaptive inverse quantizing unit 242 provided in the motion video decoding apparatus 2 of the second embodiment. That is, the adaptive inverse quantizing unit 242 includes multipliers 2421 and 2422 and a nonlinear inverse quantizing unit 2423.

The adaptive inverse quantizing unit 242 reconstructs the plurality of frequency coefficients of the prediction error image, based on the set of quantized coefficients of the prediction error image. The adaptive inverse quantizing unit 242 reconstructs each corrected quantized coefficient by multiplying each quantized coefficient of the prediction error image by the sign of the corresponding frequency coefficient of the predicted image. Then, the adaptive inverse quantizing unit 242 reconstructs each corrected frequency coefficient by inverse-quantizing the corrected quantized coefficient in accordance with the previously given equation (8) using a quantization scale whose value differs depending on the sign of the corrected quantized coefficient.

When the spacing between adjacent quantization levels is set so as to vary according to the absolute value of the corrected frequency coefficient, the adaptive inverse quantizing unit 242 refers, for example, to a mapping table that provides a mapping between the corrected quantized coefficient and the quantization level. Then, the adaptive inverse quantizing unit 242 may obtain the quantization level corresponding to the corrected quantized coefficient as representing the reconstructed corrected frequency coefficient.

Further, the adaptive inverse quantizing unit 242 reconstructs each frequency coefficient of the prediction error image by multiplying each reconstructed frequency coefficient by the sign of the corresponding frequency coefficient of the predicted image. Each reconstructed frequency coefficient is supplied to the inverse transforming unit 20.

The inverse transforming unit 20 reconstructs the prediction error image by applying an inverse orthogonal transform to the reconstructed frequency coefficients, as in the case of the motion video encoding apparatus 1. Then, the adder 21 adds the value of each pixel of the predicted image to the value of the corresponding pixel in the prediction error image, thereby reconstructing the block being decoded.

The motion video decoding apparatus 6 reconstructs each picture by combining the reconstructed macroblocks in the order in which they were encoded. Then, the motion video decoding apparatus 6 reconstructs the motion video data by arranging the pictures in time order. The motion video decoding apparatus 6 outputs the reconstructed motion video data. The motion video data thus output is, for example, stored in a storage apparatus not depicted. Further, the motion video data thus output is displayed on a display apparatus (not depicted) connected to the motion video decoding apparatus 6.

Figure 31:
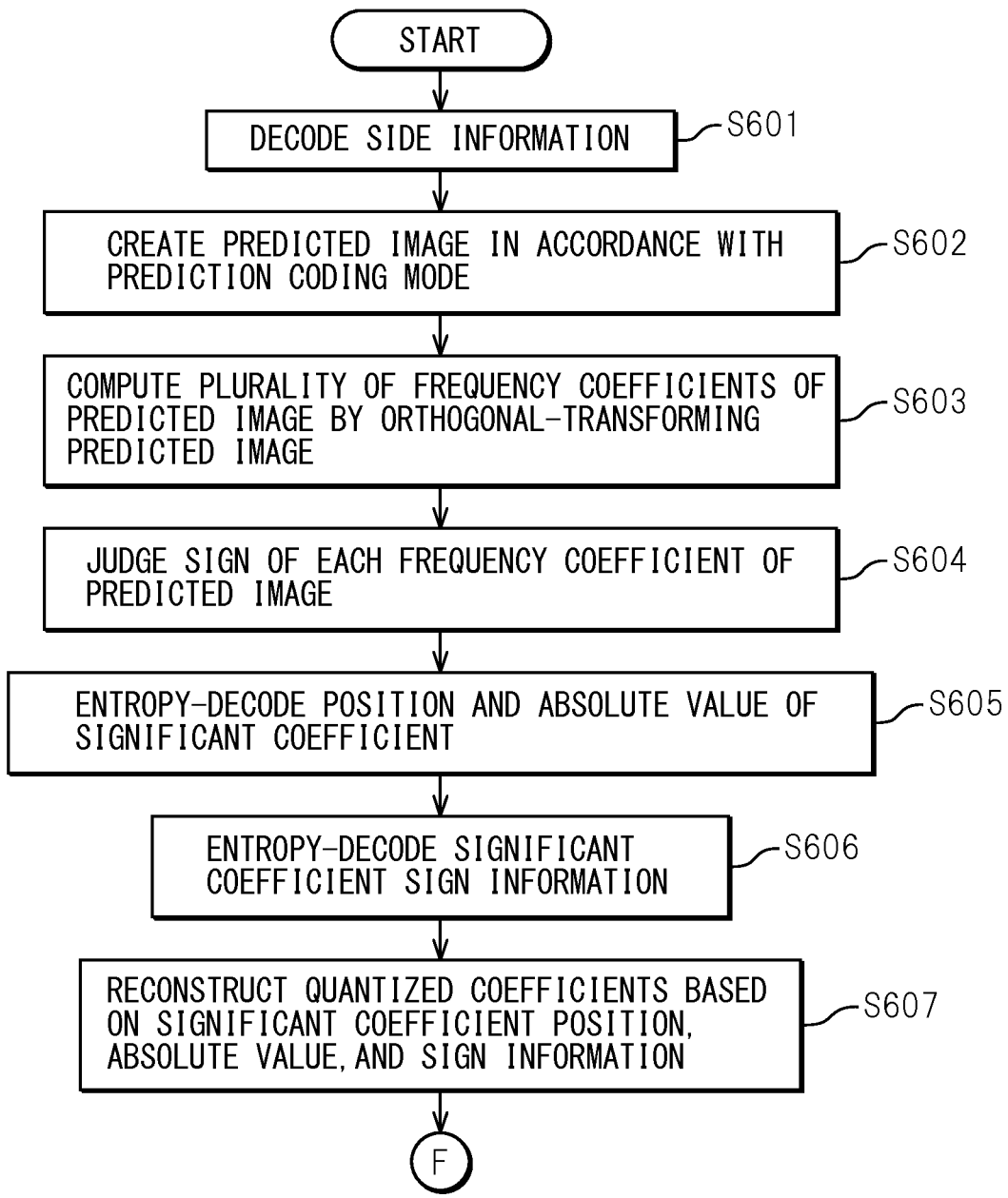
FIG. 31 is a diagram illustrating an operation flowchart of a motion video decoding process according to the sixth embodiment.
Figure 32:
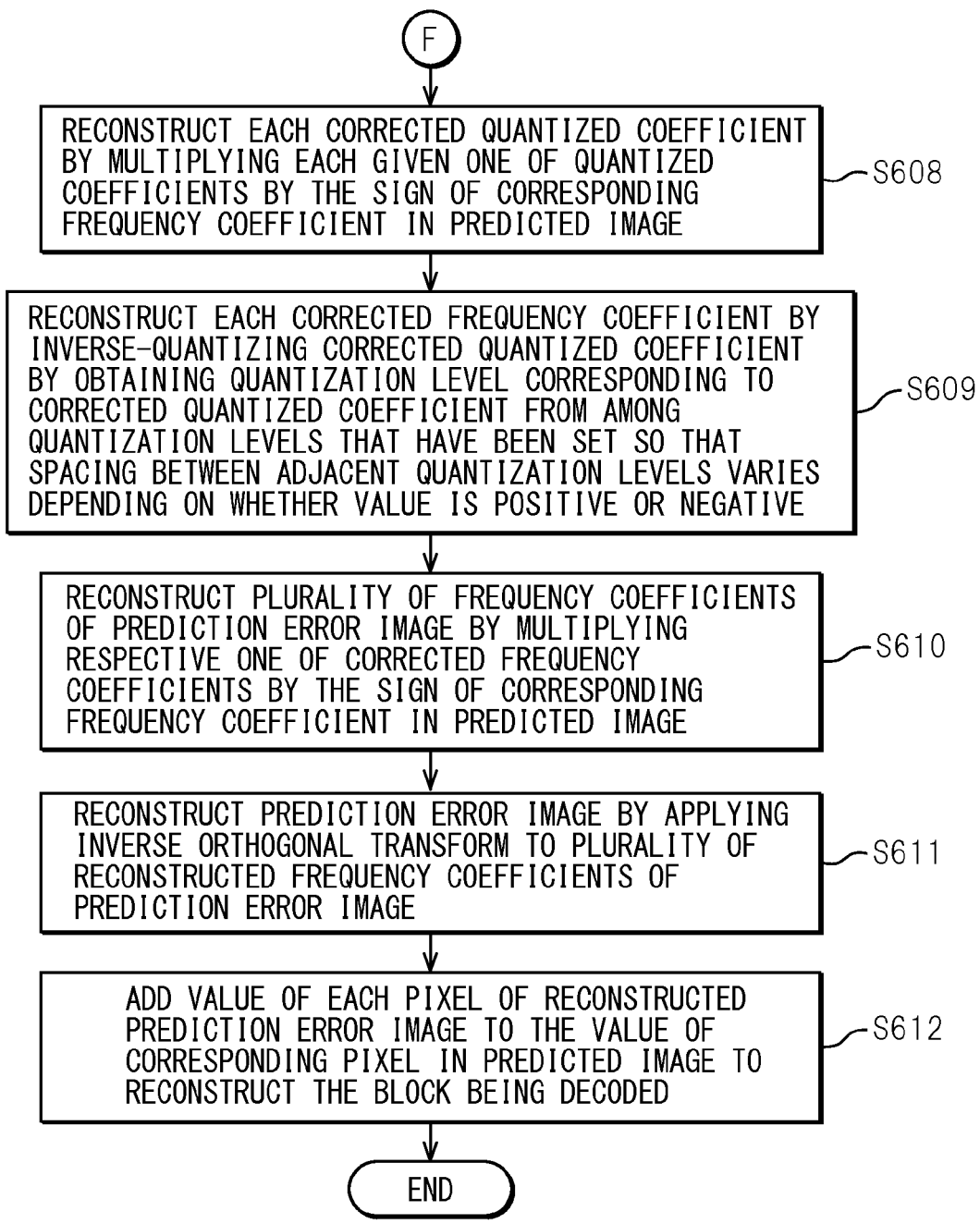
FIG. 32 is a diagram illustrating an operation flowchart of the motion video decoding process according to the sixth embodiment.

FIGS. 31 and 32 are diagrams illustrating an operation flowchart of the motion video decoding process according to the sixth embodiment. The motion video decoding apparatus 6 performs the following motion video decoding process on each macroblock to be decoded.

The frequency coefficient adaptive decoding unit 61 decodes the entropy-coded side information such as the motion vector, etc. (step S601). Then, the frequency coefficient adaptive decoding unit 61 passes information such as the prediction coding mode, motion vector, etc., contained in the side information, to the intra-prediction unit 12, the motion compensating unit 13, and the selector 14, respectively. The motion video decoding apparatus 6 creates a predicted image in accordance with the prediction coding mode for each block contained in the macroblock being decoded (step S602). More specifically, when the prediction coding mode is the intra-prediction coding mode, the intra-prediction unit 12 creates the predicted image. On the other hand, when the prediction coding mode is the inter-prediction coding mode, the motion compensating unit 13 creates the predicted image. The intra-prediction unit 12 or the motion compensating unit 13 supplies the predicted image to the selector 14. The selector 14 passes the received predicted image to the predicted image orthogonal-transforming unit 17 and the adder 21.

The predicted image orthogonal-transforming unit 17 computes the set of frequency coefficients of the predicted image by orthogonal-transforming the predicted image (step S603). The predicted image orthogonal-transforming unit 17 supplies the plurality of frequency coefficients of the predicted image to the sign judging unit 18.

The sign judging unit 18 judges the sign of each frequency coefficient of the predicted image (step S604). The sign judging unit 18 supplies the value indicating the sign of each frequency coefficient of the predicted image to the adaptive inverse quantizing unit 242 in the frequency coefficient adaptive decoding unit 61.

The significant coefficient position information decoding unit 6111 in the quantized coefficient decoding unit 611 of the frequency coefficient adaptive decoding unit 61 entropy-decodes the position information of each significant coefficient. On the other hand, the significant coefficient absolute value information decoding unit 6112 in the quantized coefficient decoding unit 611 entropy-decodes the absolute value of each significant coefficient (step S605). The significant coefficient position information decoding unit 6111 and the significant coefficient absolute value information decoding unit 6112 pass the decoded significant coefficient position information and the decoded significant coefficient absolute value information, respectively, to the significant coefficient information reconstructing unit 6114 in the quantized coefficient decoding unit 611.

The significant coefficient sign information decoding unit 6113 in the quantized coefficient decoding unit 611 obtains the sign of each significant coefficient by referring to the bit indicating the sign of the significant coefficient (step S606). The significant coefficient sign information decoding unit 6113 passes the sign of the significant coefficient to the significant coefficient information reconstructing unit 6114.

Based on the position information, absolute value information, and sign information of the significant coefficients, the significant coefficient information reconstructing unit 6114 reconstructs the plurality of quantized coefficients of the prediction error image (step S607). The significant coefficient information reconstructing unit 6114 passes the plurality of reconstructed quantized coefficients of the prediction error image to the adaptive inverse quantizing unit 242.

As illustrated in FIG. 32, the multiplier 2421 in the adaptive inverse quantizing unit 242 reconstructs each corrected quantized coefficient by multiplying each quantized coefficient of the prediction error image by the sign of the corresponding frequency coefficient of the predicted image (step S608). The multiplier 2421 passes the corrected quantized coefficient to the nonlinear inverse quantizing unit 2423 in the adaptive inverse quantizing unit 242.

The nonlinear inverse quantizing unit 2423 inverse-quantizes each corrected quantized coefficient by obtaining the quantization level corresponding to the corrected quantized coefficient from among the quantization levels that have been set so that the spacing between adjacent quantization levels varies depending on whether the value is positive or negative. The nonlinear inverse quantizing unit 2423 thus reconstructs each corrected frequency coefficient (step S609). The nonlinear inverse quantizing unit 2423 supplies each reconstructed corrected frequency coefficient to the multiplier 2422.

The multiplier 2422 reconstructs the plurality of frequency coefficients of the prediction error image by multiplying a respective one of the reconstructed corrected frequency coefficients by the sign of the corresponding frequency coefficient of the predicted image (step S610). Each reconstructed frequency coefficient output from the multiplier 2422 is supplied to the inverse transforming unit 20.

The inverse transforming unit 20 reconstructs the prediction error image by applying an inverse orthogonal transform to the plurality of reconstructed frequency coefficients of the prediction error image (step S611). The inverse transforming unit 20 passes the reconstructed prediction error image to the adder 21. The adder 21 adds the value of each pixel of the reconstructed prediction error image to the value of the corresponding pixel in the predicted image, thereby reconstructing the block being decoded (step S612). The adder 21 combines the reconstructed blocks in accordance with a prescribed order to reconstruct the macroblock being decoded. Further, the adder 21 combines the reconstructed macroblocks in sequence in accordance with a prescribed coding order to reconstruct each picture. The adder 21 outputs the reconstructed picture, while storing the reconstructed picture as the reference picture in the image memory 22. The process of steps S602 to S612 is performed on each block in the macroblock being decoded.

After that, the motion video decoding apparatus 6 terminates the motion video decoding process. The motion video decoding apparatus 6 may interchange the order of steps S605 and S606.

As has been described above, the motion video decoding apparatus according to the sixth embodiment can decode the motion video data encoded by the motion video encoding apparatus according to the fifth embodiment.

The present invention is not limited to the above embodiments. For example, the adaptive-quantizing/inverse-quantizing unit provided in the motion video encoding apparatus according to the first and fifth embodiments may include a sign match/mismatch detection unit in place of the multiplier. Then, when the sign of the frequency coefficient, corrected frequency coefficient, or quantized coefficient matches the sign of the corresponding frequency coefficient of the predicted image, the sign match/mismatch detection unit determines that the sign of the frequency coefficient, corrected frequency coefficient, or quantized coefficient is positive. Conversely, when the sign of the frequency coefficient, corrected frequency coefficient, or quantized coefficient does not match the sign of the corresponding frequency coefficient of the predicted image, the sign match/mismatch detection unit detects that the sign of the frequency coefficient, corrected frequency coefficient, or quantized coefficient is negative. Likewise, the adaptive inverse quantizing unit provided in the motion video decoding apparatus according to the second and sixth embodiments may include a sign match/mismatch detection unit such as described above in place of the multiplier.

Figure 33:
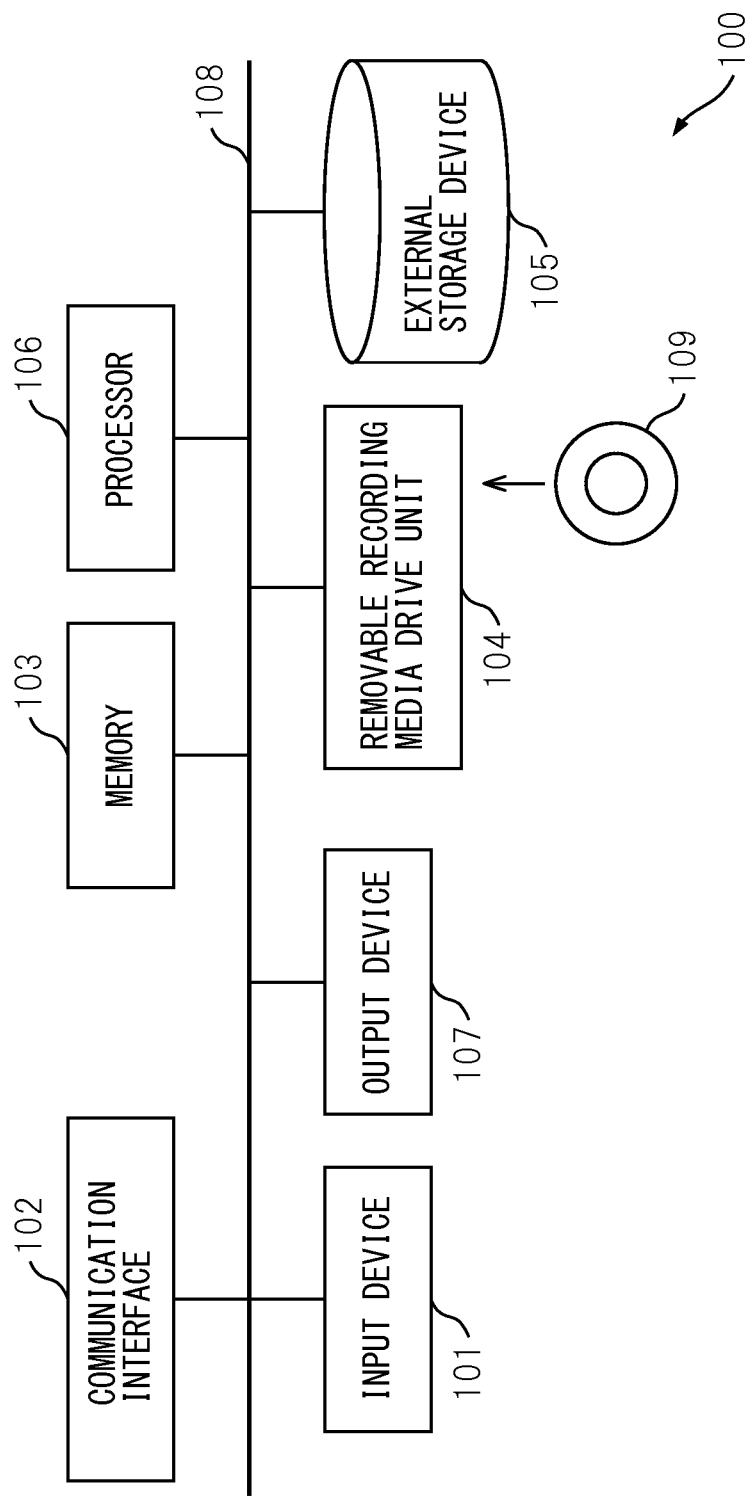
FIG. 33 is a diagram schematically illustrating the configuration of a computer for implementing a motion video encoding method or motion video decoding method according to each of the above embodiments.

FIG. 33 is a diagram schematically illustrating the configuration of a computer for implementing a motion video encoding method or motion video decoding method according to each of the above embodiments or their modified examples. The computer 100 includes an input device 101, a communication interface 102, a memory 103, a removable recording media drive unit 104, an external storage device 105, a processor 106, and an output device 107. These parts constituting the computer 100 are interconnected via a bus 108 for transferring data and control signals therebetween.

The input device 101 includes, for example, a keyboard or a pointing device such as a mouse. The input device 101 generates, in response to a user operation, a signal such as an operation signal for initiating the motion video encoding process or motion video decoding process or an operation signal for selecting motion video data to be processed by the motion video encoding process, and supplies the operation signal to the processor 106.

The communication interface 102 includes, for example, an interface circuit for connecting the computer 100 to a communication network. The communication interface 102 receives motion video data to be encoded, or encoded motion video data to be decoded, from another apparatus over the communication network (not depicted), and passes the received data to the processor 106. Alternatively, the communication interface 102 receives encoded motion video data or decoded motion video data from the processor 106, and transmits the data to another apparatus over the communication network.

The memory 103 includes, for example, a volatile or nonvolatile semiconductor memory circuit. The memory 103 provides a memory area needed during the motion video encoding process or motion video decoding process to be executed by the processor 106. For example, the memory 103 functions as the image memory in each of the above embodiments.

The removable recording media drive unit 104 is a drive unit for driving a removable recording medium 109 such as an optical recording medium or a memory card. The removable recording media drive unit 104 reads, for example, a computer program recorded on the removable recording medium 109 for causing the computer to implement the motion video encoding method or motion video decoding method according to any one of the above embodiments. The removable recording media drive unit 104 passes the computer program to the processor 106. Alternatively, the removable recording media drive unit 104 may read out the motion video data to be encoded, or the encoded motion video data to be decoded, from the removable recording medium 109 and may pass the readout data to the processor 106. Further, the removable recording media drive unit 104 may receive the encoded motion video data or decoded motion video data from the processor 106, and may write the received data to the removable recording medium 109.

The external storage device 105 is, for example, a magnetic storage device such as a hard disk. The external storage device 105 stores a computer program for causing the computer to implement the motion video encoding method or motion video decoding method according to any one of the above embodiments. The external storage device 105 may also store the motion video data to be encoded or the encoded motion video data to be decoded.

The processor 106 controls the entire operation of the computer 100. The processor 106 receives the computer program from the removable recording media drive unit 104 or the external storage device 105 for causing the computer to implement the motion video encoding method or motion video decoding method according to any one of the above embodiments, and maps the computer program into the memory 103. The processor 106 carries out the motion video encoding method or motion video decoding method in accordance with the computer program.

Further, the processor 106 receives the motion video data or the encoded motion video data from the communication interface 102 or the removable recording media drive unit 104, and temporarily stores the data in the memory 103 or stores the data on the external storage device 105.

The processor 106 passes the encoded motion video data or the decoded motion video data to the communication interface 102, the removable recording media drive unit 104, the external storage device 105, or the output device 107.

The output device 107 includes, for example, a liquid crystal display. The output device 107 receives the decoded motion video data from the processor 106 and displays each picture contained in the motion video data.

The computer program which is executed on the computer to implement the functions of the various units constituting the motion video encoding apparatus or motion video decoding apparatus according to each of the above embodiments or their modified examples may be distributed in the form stored in a semiconductor memory or in the form recorded on a recording medium such as an optical recording medium.

The motion video encoding apparatus and motion video decoding apparatus according to the above embodiments or their modified examples are used in various applications. For example, the motion video encoding apparatus and motion video decoding apparatus are incorporated in a video camera, a video transmitting apparatus, a video receiving apparatus, a video telephone system, a computer, or a mobile telephone. For example, when the motion video decoding apparatus is incorporated in the video receiving apparatus, the encoded motion video data is first generated at the video transmitting apparatus. Then, the encoded motion video data is converted, along with other signals such as a voice signal generated simultaneously with the motion video data, into a data stream conforming to a prescribed communication standard. The data stream is then transmitted via an antenna connected to the output unit of the video transmitting apparatus, or via a communication channel, to the video receiving apparatus located at a remote site. The video receiving apparatus equipped with the motion video decoding apparatus retrieves the encoded motion video data from the data stream, and passes it to the motion video decoding apparatus. The motion video decoding apparatus decodes the motion video for output.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A motion video encoding apparatus comprising:
   a processor configured to:
      create, from an already encoded picture contained in motion video data or from an already encoded region in a picture being encoded in the motion video data, creates a predicted image for a block being encoded in the picture being encoded;
      compute a difference between the predicted image and the block being encoded to generate a prediction error image for the block being encoded;
      compute a plurality of first frequency coefficients by orthogonal-transforming the prediction error image;
      compute a plurality of second frequency coefficients by orthogonal-transforming the predicted image;
      judge the positive/negative sign of each one of the plurality of second frequency coefficients; and
      encode each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient.

2. The motion video encoding apparatus according to claim 1,
   wherein the encoding of each given one of the first frequency coefficients includes:
      computing, for each given one of the plurality of first frequency coefficients, as the sign match/mismatch information, a corrected frequency coefficient whose sign is positive or negative depending on whether the sign of the given first frequency coefficient matches the sign of a corresponding one of the plurality of second frequency coefficients that represents the same frequency component as the given first frequency coefficient, and whose absolute value is the same as the absolute value of the given first frequency coefficient; and
      quantizing the corrected frequency coefficient by obtaining a one of a plurality of quantization levels that is nearest to the corrected frequency coefficient as a quantized coefficient for the corrected frequency coefficient, and wherein the plurality of quantization levels are set so that the lower is the probability of occurrence of the value of the corrected frequency coefficient to be quantized to the quantization level, the wider the spacing between adjacent quantization levels is.

3. The motion video encoding apparatus according to claim 2, wherein the encoding of each given one of the first frequency coefficients further includes entropy-coding the quantized coefficient by assigning the quantized coefficient an entropy code that matches the probability of occurrence of the quantization level corresponding to the quantized coefficient.

4. The motion video encoding apparatus according to claim 1, wherein the encoding of each given one of the first frequency coefficients includes:

computing, for each given one of the plurality of first frequency coefficients, as the sign match/mismatch information, a corrected frequency coefficient whose sign is positive or negative depending on whether the sign of the given first frequency coefficient matches the sign of a corresponding one of the plurality of second frequency coefficients that represents the same frequency component as the given first frequency coefficient, and whose absolute value is the same as the absolute value of the given first frequency coefficient; and when the sign of the given first frequency coefficient matches the sign of the corresponding second frequency coefficient, quantizing the corrected frequency coefficient by using a first quantization scale, while on the other hand, when the sign of the given first frequency coefficient does not match the sign of the corresponding second frequency coefficient, quantizing the corrected frequency coefficient by using a second quantization scale which is larger than the first quantization scale.

5. The motion video encoding apparatus according to claim 1, wherein the encoding of each given one of the first frequency coefficients includes:

computing a plurality of quantized coefficients by quantizing the plurality of first frequency coefficients, respectively, by using prescribed quantization scales;

computing as the sign match/mismatch information, sign match/mismatch prediction information that indicates a match or mismatch between the sign of each given one of significant coefficients corresponding to quantized coefficients having nonzero values among the plurality of quantized coefficients and the sign of a corresponding one of the plurality of second frequency coefficients that represents the same frequency component as the given significant coefficient; and entropy-coding the sign match/mismatch prediction information.

6. A motion video decoding apparatus comprising:
a processor configured to:

create, from an already decoded picture contained in encoded motion video data or from an already decoded region in a picture being decoded from the encoded motion video data, a predicted image for a block being decoded in the picture being decoded;

compute a plurality of second frequency coefficients by orthogonal-transforming the predicted image;

judge the positive/negative sign of each one of the plurality of second frequency coefficients;

take as input a plurality of first frequency coefficients obtained by orthogonal-transforming a prediction error image taken between the predicted image and the block being decoded, and decode each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient;

reconstruct the prediction error image by applying an inverse orthogonal transform to the plurality of first frequency coefficients; and add the value of each pixel of the prediction error image to the value of a corresponding pixel in the predicted image to reconstruct the block being decoded.

7. The motion video decoding apparatus according to claim 6, wherein the decoding of each given one of the first frequency coefficients includes:

computing, for each given one of a plurality of quantized coefficients corresponding to a respective one of the plurality of first coefficients, as the sign match/mismatch information, a corrected quantized coefficient whose sign is positive or negative depending on whether the sign of the given quantized coefficient matches the sign of a corresponding one of the plurality of second frequency coefficients that represents the same frequency component as the given quantized coefficient, and whose absolute value is the same as the absolute value of the given quantized coefficient; and inverse-quantizing the corrected quantized coefficient by obtaining from among a plurality of quantization levels a quantization level that corresponds to the corrected quantized coefficient, and wherein the plurality of quantization levels are set so that the lower is the probability of occurrence of the value of the corrected quantized coefficient to be quantized to the quantization level, the wider is the spacing between adjacent quantization levels.

8. The motion video decoding apparatus according to claim 7, wherein each given one of the plurality of quantized coefficients is encoded with an entropy code that matches the probability of occurrence of the quantization level corresponding to the given quantized coefficient, and the decoding of each given one of the first frequency coefficients further includes entropy-decoding each given quantized coefficient by obtaining the quantized coefficient corresponding to the entropy code.

9. The motion video decoding apparatus according to claim 6, wherein the decoding of each given one of the first frequency coefficients includes:

computing, for each given one of a plurality of quantized coefficients corresponding to a respective one of the plurality of first coefficients, as the sign match/mismatch information, a corrected quantized coefficient whose sign is positive or negative depending on whether the sign of the given quantized coefficient matches the sign of a corresponding one of the plurality of second frequency coefficients that represents the same frequency component as the given quantized coefficient, and whose absolute value is the same as the absolute value of the given quantized coefficient; and when the sign of the given quantized coefficient matches the sign of the corresponding second frequency coefficient, inverse-quantizing the corrected quantized coefficient by using a first quantization scale, while on the other hand, when the sign of the given quantized coefficient does not match the sign of the corresponding second frequency coefficient, inverse-quantizing the corrected quantized coefficient by using a second quantization scale which is larger than the first quantization scale, thereby decoding each corresponding one of the plurality of first coefficients.

10. The motion video decoding apparatus according to claim 6, wherein the decoding of each given one of the first frequency coefficients includes:
   entropy-decoding sign match/mismatch prediction information as the sign match/mismatch information that indicates a match or mismatch between the sign of each given one of significant coefficients corresponding to quantized coefficients having nonzero values among the plurality of quantized coefficients corresponding to the plurality of first frequency coefficients and the sign of a corresponding one of the plurality of second frequency coefficients that represents the same frequency component as the given significant coefficient;
   reconstructing the corresponding one of the plurality of quantized coefficients by obtaining the sign of the given significant coefficient based on the sign match/mismatch prediction information; and
   decoding the plurality of first frequency coefficients by inverse-quantizing the plurality of quantized coefficients, respectively, by using prescribed quantization scales.

11. The motion video decoding apparatus according to claim 6, wherein the decoding of each given one of the first frequency coefficients includes:
   entropy-decoding sign match/mismatch prediction information as the sign match/mismatch information that indicates a match or mismatch between the sign of each given one of significant coefficients corresponding to quantized coefficients having nonzero values among a plurality of quantized coefficients corresponding to the plurality of first frequency coefficients and the sign of a corresponding one of the plurality of second frequency coefficients that represents the same frequency component as the given significant coefficient;
   reconstructing the corresponding one of the plurality of quantized coefficients by obtaining the sign of the given significant coefficient based on the sign match/mismatch prediction information;
   computing, for each given one of the plurality of quantized coefficients, as the sign match/mismatch information, a corrected quantized coefficient whose sign is positive or negative depending on whether the sign of the given quantized coefficient matches the sign of a corresponding one of the plurality of second frequency coefficients that represents the same frequency component as the given quantized coefficient, and whose absolute value is the same as the absolute value of the given quantized coefficient; and
   when the sign of the given quantized coefficient matches the sign of the corresponding second frequency coefficient, inverse-quantizing the corrected quantized coefficient by using a first quantization scale, while on the other hand, when the sign of the given quantized coefficient does not match the sign of the corresponding second frequency coefficient, inverse-quantizing the corrected quantized coefficient by using a second quantization scale which is larger than the first quantization scale, thereby decoding each corresponding one of the plurality of first coefficients.

12. A motion video encoding method comprising:
   creating, from an already encoded picture contained in motion video data or from an already encoded region in a picture being encoded in the motion video data, a predicted image for a block being encoded in the picture being encoded;
   computing a difference between the predicted image and the block being encoded and thereby generating a prediction error image for the block being encoded;
   computing a plurality of first frequency coefficients by orthogonal-transforming the prediction error image;
   computing a plurality of second frequency coefficients by orthogonal-transforming the predicted image;
   judging the positive/negative sign of each one of the plurality of second frequency coefficients; and
   encoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient.

13. The motion video encoding method according to claim 12,
   wherein the encoding each given one of the plurality of first frequency coefficients includes:
      for each given one of the plurality of first frequency coefficients, computing as the sign match/mismatch information, a corrected frequency coefficient whose sign is positive or negative depending on whether the sign of the given first frequency coefficient matches the sign of a corresponding one of the plurality of second frequency coefficients that represents the same frequency component as the given first frequency coefficient, and whose absolute value is the same as the absolute value of the given first frequency coefficient, and
      quantizing the corrected frequency coefficient by obtaining one of a plurality of quantization levels that is nearest to the corrected frequency coefficient as a quantized coefficient for the corrected frequency coefficient, and
   wherein the plurality of quantization levels are set so that the lower is the probability of occurrence of the value of the corrected frequency coefficient to be quantized to the quantization level, the wider the spacing between adjacent quantization levels is.

14. The motion video encoding method according to claim 12, wherein the encoding each given one of the plurality of first frequency coefficients includes:
   for each given one of the plurality of first frequency coefficients, computing as the sign match/mismatch information, a corrected frequency coefficient whose sign is positive or negative depending on whether the sign of the given first frequency coefficient matches the sign of a corresponding one of the plurality of second frequency coefficients that represents the same frequency component as the given first frequency coefficient, and whose absolute value is the same as the absolute value of the given first frequency coefficient, wherein when the sign of the given first frequency coefficient matches the sign of the corresponding second frequency coefficient, the corrected frequency coefficient is quantized by using a first quantization scale, while on the other hand, when the sign of the given first frequency coefficient does not match the sign of the corresponding second frequency coefficient, the corrected frequency coefficient is quantized by using a second quantization scale which is larger than the first quantization scale.

15. The motion video encoding method according to claim 12, wherein the encoding each given one of the plurality of first frequency coefficients includes:
computing a plurality of quantized coefficients by quantizing the plurality of first frequency coefficients, respectively, by using prescribed quantization scales; and
computing as the sign match/mismatch information, sign match/mismatch prediction information that indicates a match or mismatch between the sign of each given one of significant coefficients corresponding to quantized coefficients having nonzero values among the plurality of quantized coefficients and the sign of a corresponding one of the plurality of second frequency coefficients that represents the same frequency component as the given significant coefficient, and which entropy-codes the sign match/mismatch prediction information.

16. A motion video decoding method comprising:
creating, from an already decoded picture contained in encoded motion video data or from an already decoded region in a picture being decoded from the encoded motion video data, a predicted image for a block being decoded in the picture being decoded;
computing a plurality of second frequency coefficients by orthogonal-transforming the predicted image;
judging the positive/negative sign of each one of the plurality of second frequency coefficients;
taking as input a plurality of first frequency coefficients obtained by orthogonal-transforming a prediction error image taken between the predicted image and the block being decoded, and decoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient;
reconstructing the prediction error image by applying an inverse orthogonal transform to the plurality of first frequency coefficients; and
adding the value of each pixel of the prediction error image to the value of a corresponding pixel in the predicted image and thereby reconstructing the block being decoded.

17. The motion video decoding method according to claim 16, wherein the decoding each given one of the plurality of first frequency coefficients includes:
for each given one of a plurality of quantized coefficients corresponding to a respective one of the plurality of first coefficients, computing as the sign match/mismatch information, a corrected quantized coefficient whose sign is positive or negative depending on whether the sign of the given quantized coefficient matches the sign of a corresponding one of the plurality of second frequency coefficients that represents the same frequency component as the given quantized coefficient, and whose absolute value is the same as the absolute value of the given quantized coefficient, and
inverse-quantizing the corrected quantized coefficient by obtaining from among a plurality of quantization levels a quantization level that corresponds to the corrected quantized coefficient, and wherein the plurality of quantization levels are set so that the lower is the probability of occurrence of the value of the corrected quantized coefficient to be quantized to the quantization level, the wider is the spacing between adjacent quantization levels.

18. The motion video decoding method according to claim 16, wherein the decoding each given one of the plurality of first frequency coefficients includes:
for each given one of a plurality of quantized coefficients corresponding to a respective one of the plurality of first coefficients, computing as the sign match/mismatch information, a corrected quantized coefficient whose sign is positive or negative depending on whether the sign of the given quantized coefficient matches the sign of a corresponding one of the plurality of second frequency coefficients that represents the same frequency component as the given quantized coefficient, and whose absolute value is the same as the absolute value of the given quantized coefficient, wherein when the sign of the given quantized coefficient matches the sign of the corresponding second frequency coefficient, the corrected quantized coefficient is inverse-quantized by using a first quantization scale, while on the other hand, when the sign of the given quantized coefficient does not match the sign of the corresponding second frequency coefficient, the corrected quantized coefficient is inverse-quantized by using a second quantization scale which is larger than the first quantization scale, thereby decoding each corresponding one of the plurality of first coefficients.

19. A non-transitory computer-readable storage medium storing a computer program for encoding a motion video to cause a computer to execute:
creating, from an already encoded picture contained in motion video data or from an already encoded region in a picture being encoded in the motion video data, a predicted image for a block being encoded in the picture being encoded;
computing a difference between the predicted image and the block being encoded and thereby generating a prediction error image for the block being encoded;
computing a plurality of first frequency coefficients by orthogonal-transforming the prediction error image;
computing a plurality of second frequency coefficients by orthogonal-transforming the predicted image;
judging the positive/negative sign of each one of the plurality of second frequency coefficients; and
encoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient.

20. A non-transitory computer-readable storage medium storing a computer program for decoding a motion video to cause a computer to execute:
creating, from an already decoded picture contained in encoded motion video data or from an already decoded region in a picture being decoded from the encoded motion video data, a predicted image for a block being decoded in the picture being decoded;
computing a plurality of second frequency coefficients by orthogonal-transforming the predicted image;
judging the positive/negative sign of each one of the plurality of second frequency coefficients;
taking as input a plurality of first frequency coefficients obtained by orthogonal-transforming a prediction error image taken between the predicted image and the block being decoded, and decoding each given one of the plurality of first frequency coefficients by using sign match/mismatch information that indicates a match or mismatch between the sign of the given first frequency coefficient and the sign of a corresponding one of the plurality of second frequency coefficients that represents the same frequency component as the given first frequency coefficient;

reconstructing the prediction error image by applying an inverse orthogonal transform to the plurality of first frequency coefficients; and adding the value of each pixel of the prediction error image to the value of a corresponding pixel in the predicted image and thereby reconstructing the block being decoded.

21. The motion video decoding apparatus according to claim 1, wherein the computing of the plurality of second frequency coefficients computes the plurality of second frequency coefficients by orthogonal-transforming the predicted image regard less of whether the predicted image is created from the already encoded picture or the already encoded region.

* * * * *